United States Patent [19]

Maekawa et al.

[11] Patent Number: 5,446,550
[45] Date of Patent: Aug. 29, 1995

[54] IMAGE FORMING APPARATUS WITH RANDOM DENSITY PATTERN GROWTH

[75] Inventors: Shinichiro Maekawa, Kawasaki; Kaoru Seto, Chigasaki; Takashi Kawana, Yokohama; Toru Kosaka, Machida, all of Japan

[73] Assignee: Canon Kabushiki Kaisha, Tokyo, Japan

[21] Appl. No.: 25,800

[22] Filed: Mar. 3, 1993

[30] Foreign Application Priority Data

Mar. 5, 1992 [JP] Japan ................................. 4-048511

[51] Int. Cl.⁶ .............................................. H04N 1/21
[52] U.S. Cl. ..................... 358/298; 358/456; 358/457; 347/131
[58] Field of Search ............... 358/400, 298, 456, 457; 346/153.1

[56] References Cited

U.S. PATENT DOCUMENTS 4,447,831  5/1984  Adsett ................................. 358/283
5,276,531  1/1994  Chen et al. .......................... 358/443

Primary Examiner—Mark J. Reinhart
Assistant Examiner—Randy W. Gibson
Attorney, Agent, or Firm—Fitzpatrick, Cella, Harper & Scinto

[57] ABSTRACT

An image processing apparatus in which a density pattern is generated which corresponds to input image data. Growth direction of the density pattern is controlled by generating a density pattern in a prescribed direction, and generating a density pattern in a direction based on a random signal. As a result, when printing the image data based on the generated density patterns, there is no joining between adjacent pixels and a high-quality image is produced.

23 Claims, 75 Drawing Sheets

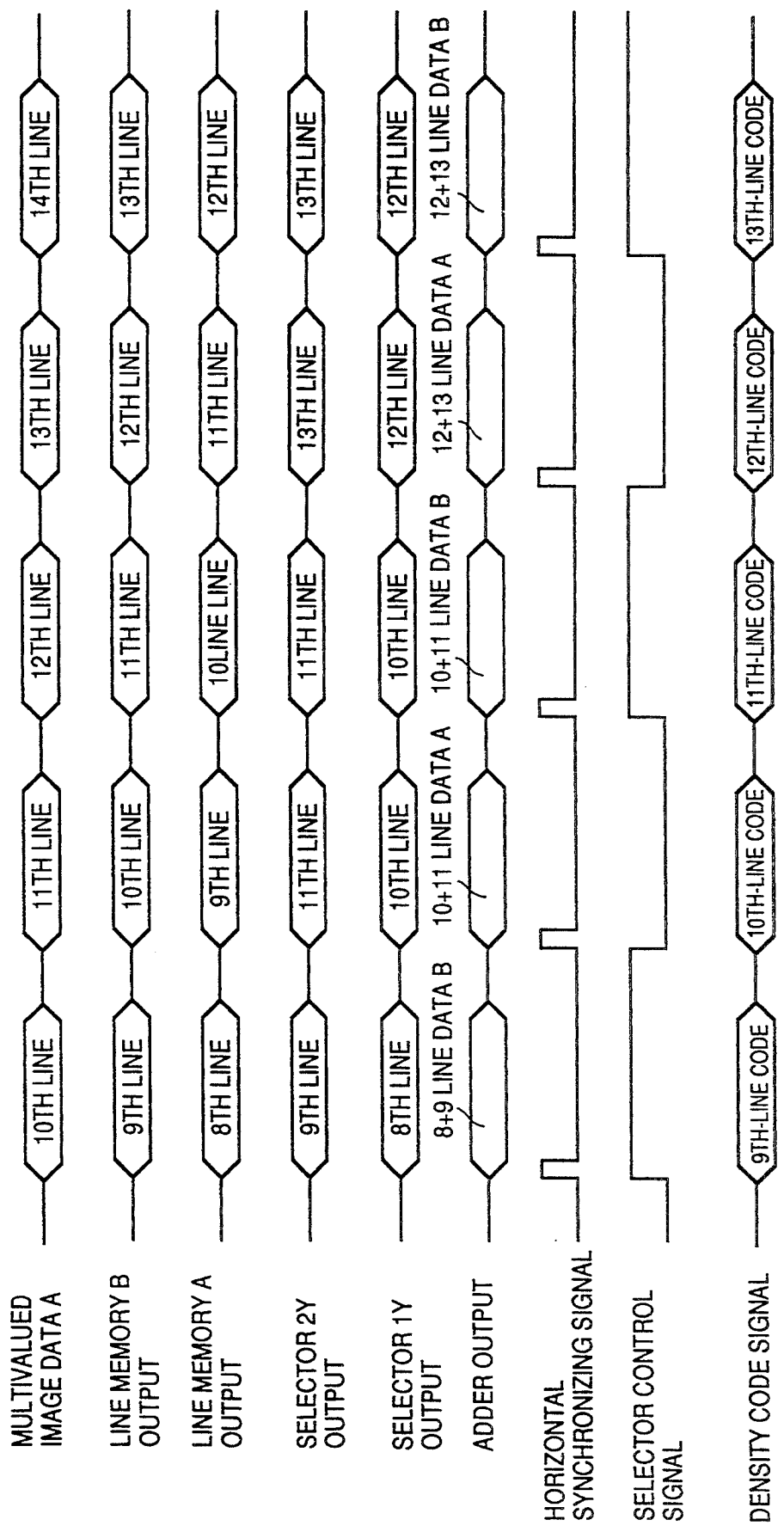

PATTERN GENERATING CODE

| A10 A8 A6 A4 A2 A0<br>A9 A7 A5 A3 A1 | D7 D6 D5 D4 D3 D2 D1 D0 |
|---|---|
| 0 0 0 0 0 0 0 0 0 0 0<br>∫ | A-PATTERN ON GENERATING CODE |
| 0 0 0 1 0 0 0 0 0 0 0<br>∫ | A-PATTERN OFF GENERATING CODE |
| 0 0 1 0 0 0 0 0 0 0 0<br>∫ | B-PATTERN ON GENERATING CODE |
| 0 0 1 1 0 0 0 0 0 0 0<br>∫ | B-PATTERN OFF GENERATING CODE |
| 0 1 0 0 0 0 0 0 0 0 0<br>∫ | C-PATTERN ON GENERATING CODE |
| 0 1 0 1 0 0 0 0 0 0 0<br>∫ | C-PATTERN OFF GENERATING CODE |
| 0 1 1 0 0 0 0 0 0 0 0<br>∫ | UNUSED |

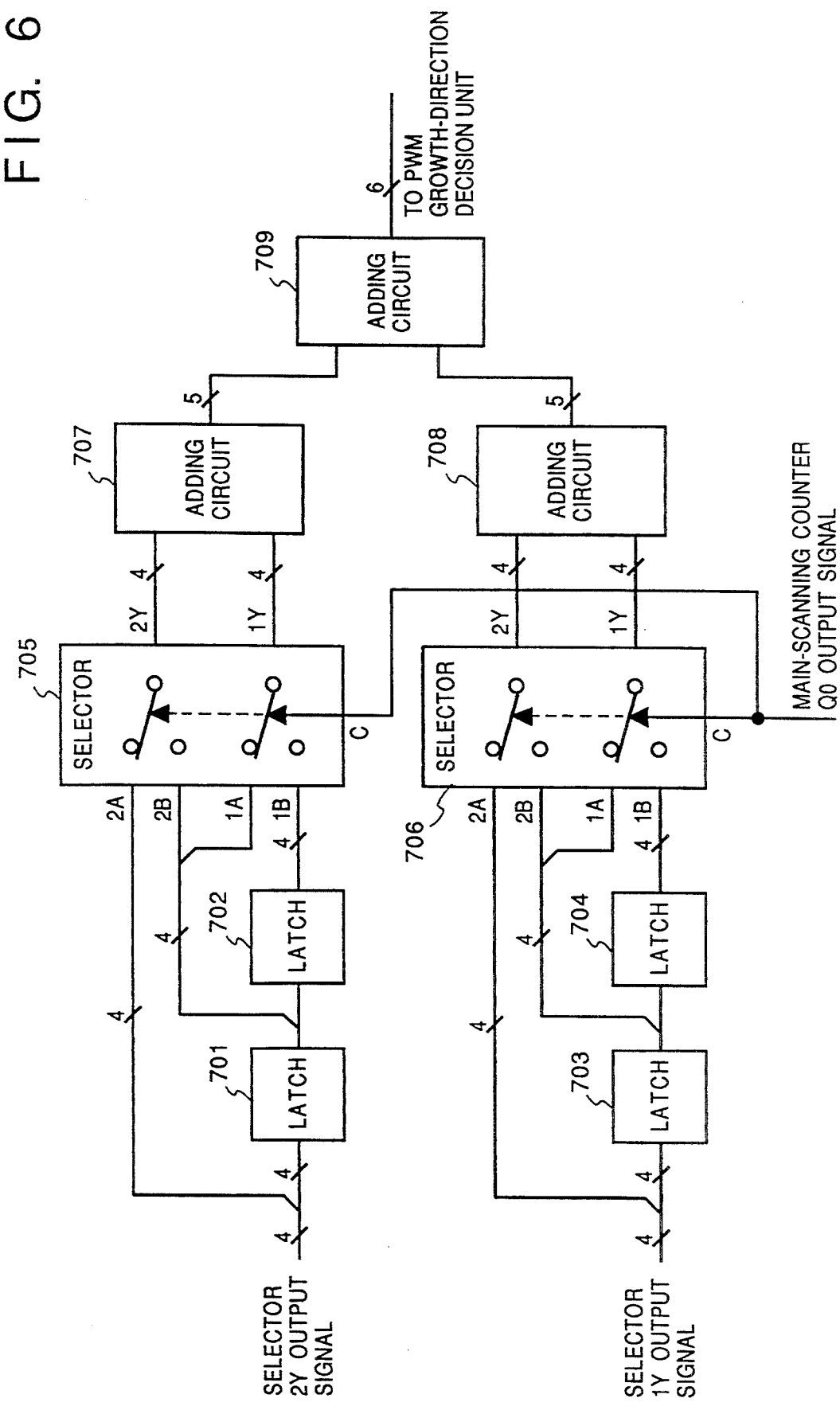

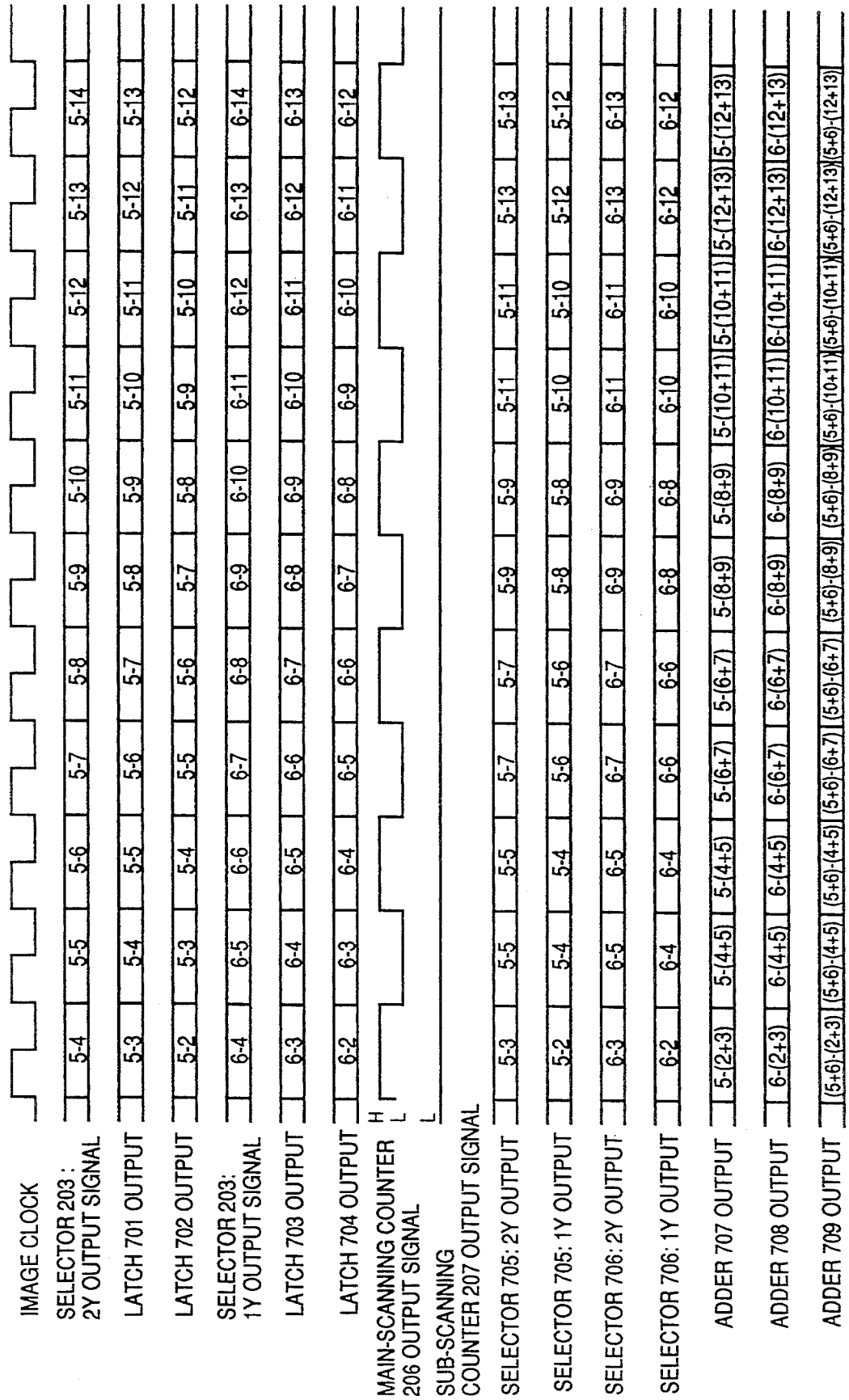

F I G. 11(A)  F I G. 11(B)  F I G. 11(C)
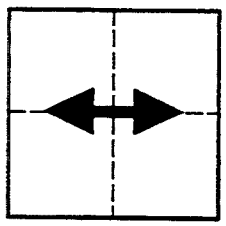 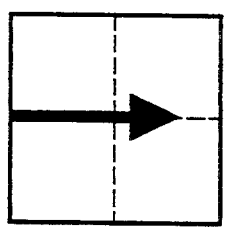 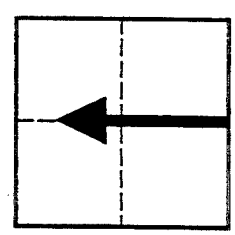
F I G. 11(D)
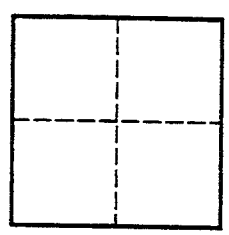
ONE PIXEL OF 300 dpi
F I G. 11(E)
ONE PIXEL OF
600 dpi

FIG. 15

| E | C2 | C1 | C0 | OUTPUT |
|---|----|----|----|--------|
| 0 | 0  | 0  | 0  | A |
| 0 | 0  | 0  | 1  | B |
| 0 | 0  | 1  | 0  | C |
| 0 | 0  | 1  | 1  | D |
| 0 | 1  | 0  | 0  | E |
| 0 | 1  | 0  | 1  | F |
| 0 | 1  | 1  | 0  | G |
| 0 | 1  | 1  | 1  | H |
| 1 | *  | *  | *  | "Low" OUTPUT |

FIG. 16

| C2 | C1 | C0 | DELAY TIME |
|----|----|----|------------|
| 0  | 0  | 0  | 0/64 OF PULSE WIDTH OF ONE DOT |
| 0  | 0  | 1  | 1/64 OF PULSE WIDTH OF ONE DOT |
| 0  | 1  | 0  | 2/64 OF PULSE WIDTH OF ONE DOT |
| 0  | 1  | 1  | 3/64 OF PULSE WIDTH OF ONE DOT |
| 1  | 0  | 0  | 4/64 OF PULSE WIDTH OF ONE DOT |
| 1  | 0  | 1  | 5/64 OF PULSE WIDTH OF ONE DOT |
| 1  | 1  | 0  | 6/64 OF PULSE WIDTH OF ONE DOT |
| 1  | 1  | 1  | 7/64 OF PULSE WIDTH OF ONE DOT |

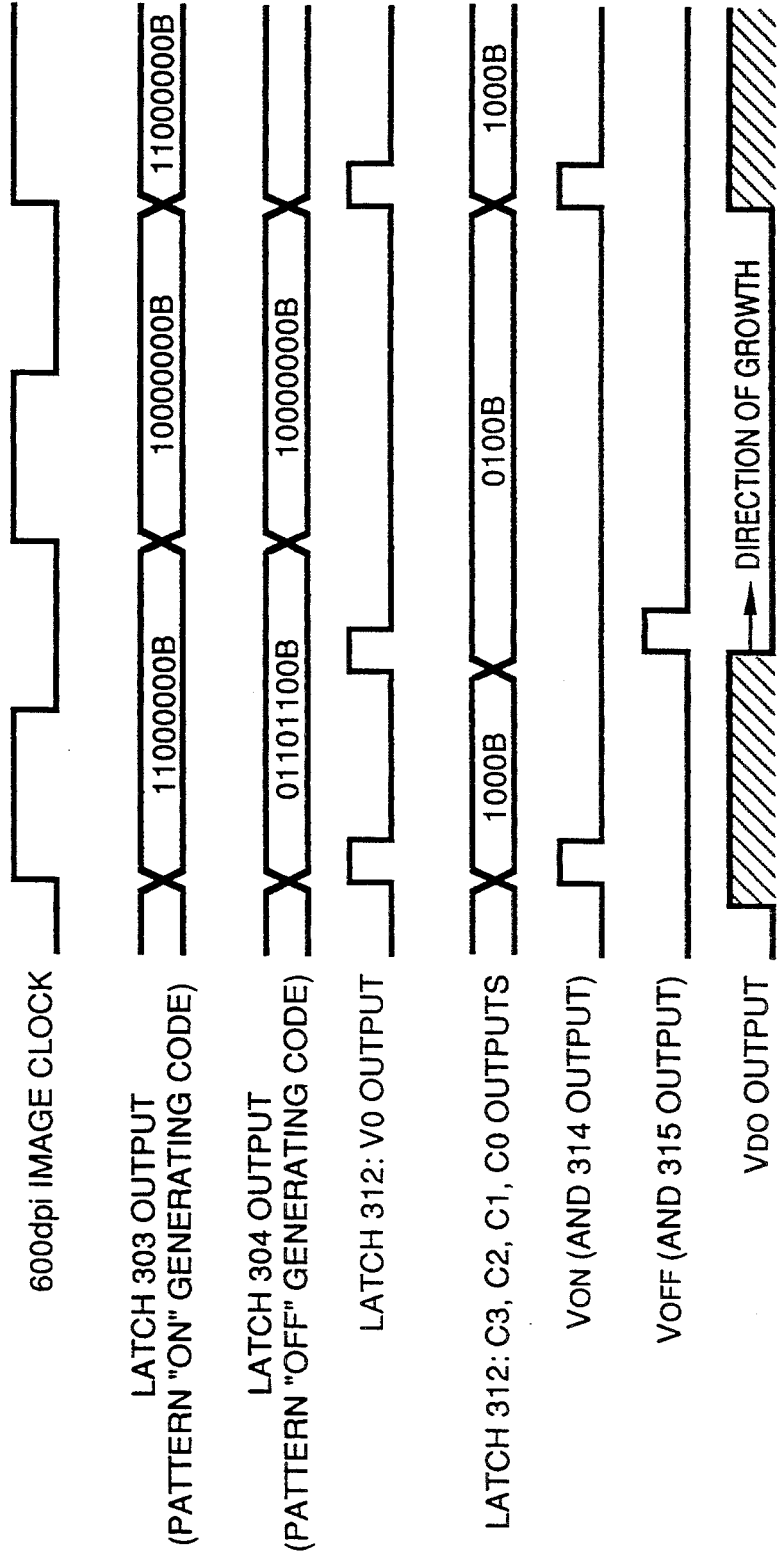

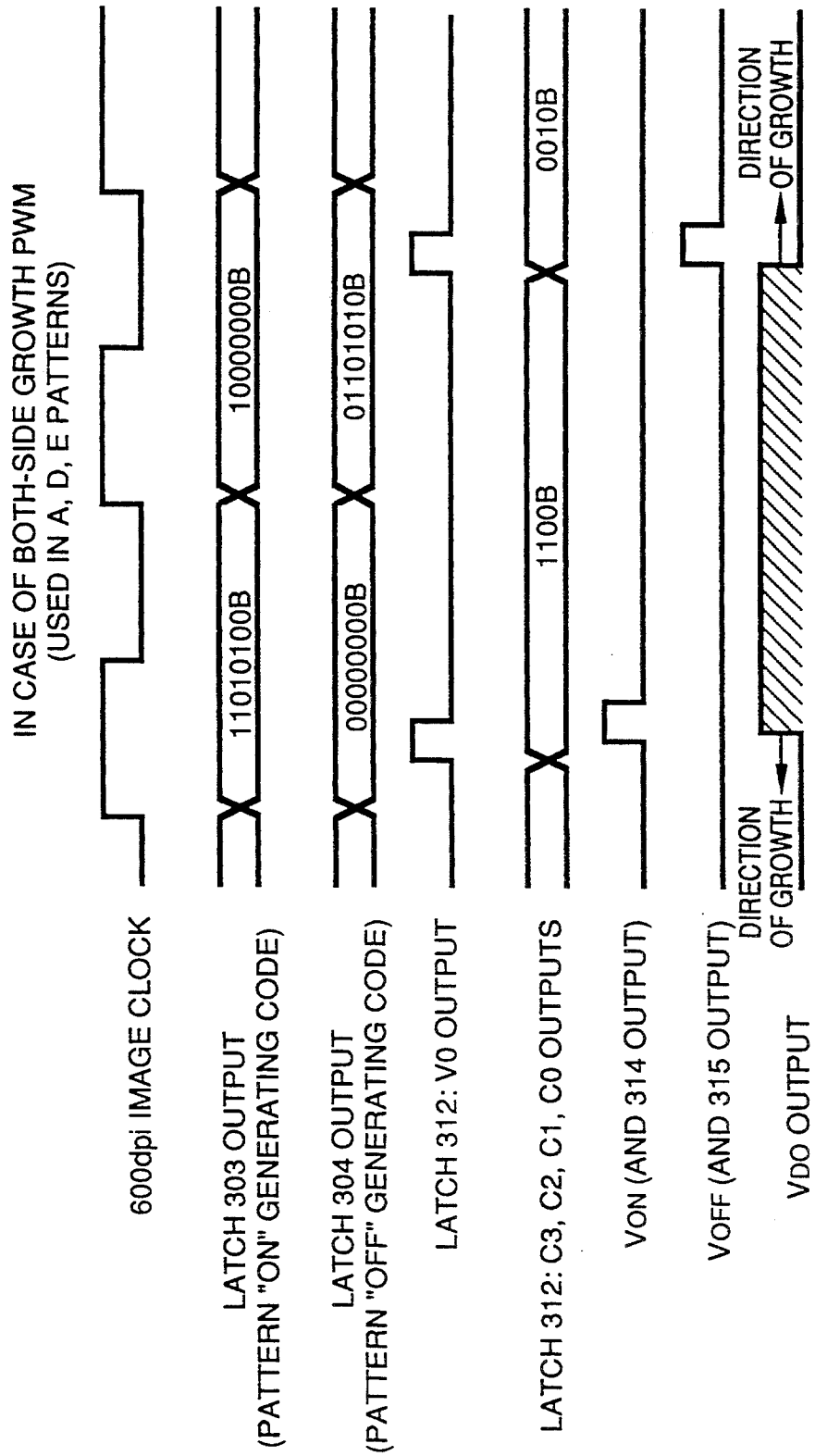

FIG. 20

| ENCODER INPUT SIGNAL "HIGH" SIGNAL | CONTROL SIGNAL | | | | | | | OUTPUT SIGNAL | | | | | | | |
|---|---|---|---|---|---|---|---|---|---|---|---|---|---|---|---|
| | B6 | B5 | B4 | B3 | B2 | B1 | B0 | P0 | P1 | P2 | P3 | P4 | P5 | P6 | P7 |
| C8 | 0 | 0 | 0 | 1 | 0 | 0 | 0 | S0 | S1 | S2 | S3 | S4 | S5 | S6 | S7 |
| C9 | 0 | 0 | 0 | 1 | 0 | 0 | 1 | S0 | S1 | S2 | S3 | S4 | S5 | S6 | S8 |
| ⋮ | ⋮ | | | | | | | ⋮ | | | | | | | |
| C55 | 0 | 1 | 1 | 0 | 1 | 1 | 1 | S0 | S7 | S14 | S21 | S28 | S35 | S41 | S49 |
| C56 | 0 | 1 | 1 | 1 | 0 | 0 | 0 | S0 | S7 | S14 | S21 | S28 | S35 | S42 | S49 |
| C57 | 0 | 1 | 1 | 1 | 0 | 0 | 1 | S0 | S8 | S15 | S22 | S29 | S36 | S43 | S50 |
| C58 | 0 | 1 | 1 | 1 | 0 | 1 | 0 | S0 | S8 | S15 | S22 | S29 | S36 | S44 | S51 |
| C59 | 0 | 1 | 1 | 1 | 0 | 1 | 1 | S0 | S8 | S15 | S22 | S30 | S37 | S44 | S52 |
| C60 | 0 | 1 | 1 | 1 | 1 | 0 | 0 | S0 | S8 | S15 | S23 | S30 | S38 | S45 | S53 |
| C61 | 0 | 1 | 1 | 1 | 1 | 0 | 1 | S0 | S8 | S16 | S23 | S31 | S38 | S46 | S54 |
| C62 | 0 | 1 | 1 | 1 | 1 | 1 | 0 | S0 | S8 | S16 | S24 | S31 | S39 | S46 | S55 |
| C63 | 0 | 1 | 1 | 1 | 1 | 1 | 1 | S0 | S8 | S16 | S24 | S32 | S40 | S47 | S56 |
| C64 | 1 | 0 | 0 | 0 | 0 | 0 | 0 | S0 | S8 | S16 | S24 | S32 | S40 | S48 | S56 |
| C65 | 1 | 0 | 0 | 0 | 0 | 0 | 1 | S0 | S9 | S17 | S25 | S33 | S41 | S49 | S57 |
| C66 | 1 | 0 | 0 | 0 | 0 | 1 | 0 | S0 | S9 | S17 | S25 | S33 | S41 | S50 | S58 |
| C67 | 1 | 0 | 0 | 0 | 0 | 1 | 1 | S0 | S9 | S17 | S25 | S34 | S42 | S50 | S59 |
| C68 | 1 | 0 | 0 | 0 | 1 | 0 | 0 | S0 | S9 | S17 | S26 | S34 | S43 | S51 | S60 |
| C69 | 1 | 0 | 0 | 0 | 1 | 0 | 1 | S0 | S9 | S18 | S26 | S35 | S43 | S52 | S61 |
| C70 | 1 | 0 | 0 | 0 | 1 | 1 | 0 | S0 | S9 | S18 | S27 | S35 | S44 | S52 | S62 |
| C71 | 1 | 0 | 0 | 0 | 1 | 1 | 1 | S0 | S9 | S18 | S27 | S36 | S45 | S53 | S63 |
| C72 | 1 | 0 | 0 | 1 | 0 | 0 | 0 | S0 | S9 | S18 | S27 | S36 | S45 | S54 | S63 |
| C73 | 1 | 0 | 0 | 1 | 0 | 0 | 1 | S0 | S10 | S19 | S28 | S37 | S46 | S55 | S64 |
| C74 | 1 | 0 | 0 | 1 | 0 | 1 | 0 | S0 | S10 | S19 | S28 | S37 | S46 | S56 | S65 |
| C75 | 1 | 0 | 0 | 1 | 0 | 1 | 1 | S0 | S10 | S19 | S28 | S38 | S47 | S57 | S66 |
| C76 | 1 | 0 | 0 | 1 | 1 | 0 | 0 | S0 | S10 | S19 | S29 | S38 | S48 | S57 | S67 |
| C77 | 1 | 0 | 0 | 1 | 1 | 0 | 1 | S0 | S10 | S20 | S29 | S39 | S48 | S58 | S68 |
| C78 | 1 | 0 | 0 | 1 | 1 | 1 | 0 | S0 | S10 | S20 | S30 | S39 | S49 | S59 | S69 |
| C79 | 1 | 0 | 0 | 1 | 1 | 1 | 1 | S0 | S10 | S20 | S30 | S40 | S50 | S60 | S70 |

A: 0~15 [ /256] TONES
B: 16~31 [ /256] TONES
C: 32~47 [ /256] TONES
D: 48~60 [ /256] TONES

FIG. 28A
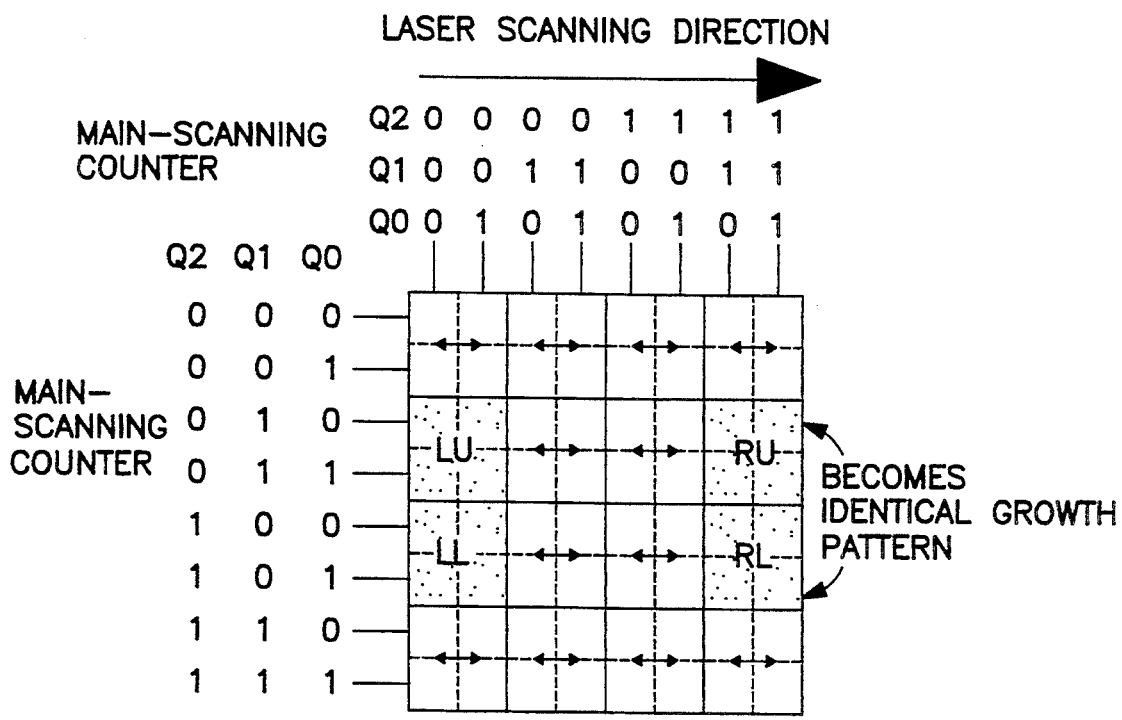
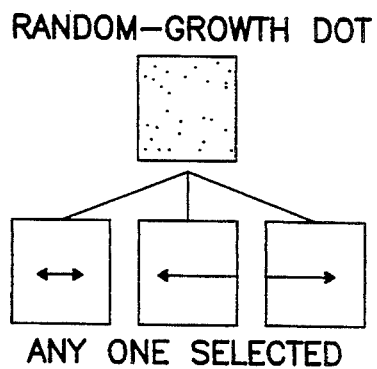
FIG. 28B

FIG. 40A
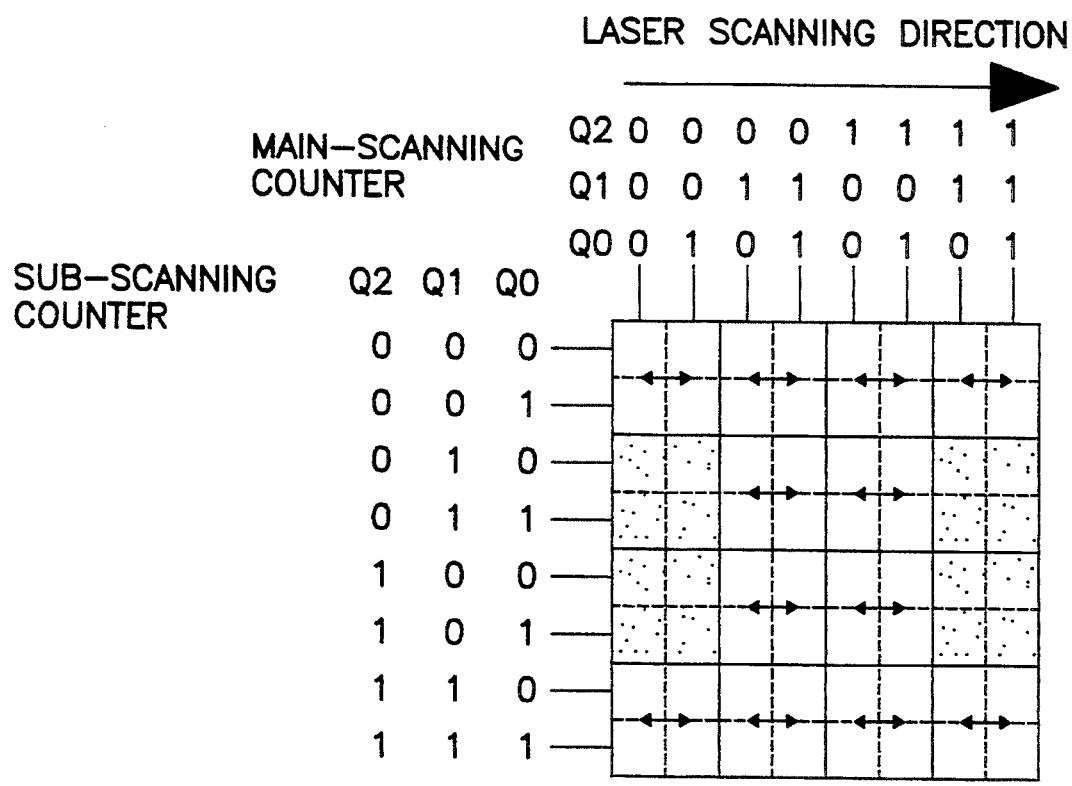
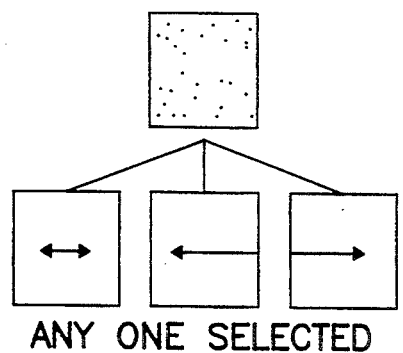
FIG. 40B

FIG. 46

| M5, M4 | L5, L4 | N5, N4 |
|---|---|---|
| O5, O4 | P5, P4 | Q5, Q4 |
| R5, R4 | S5, S4 | T5, T4 |

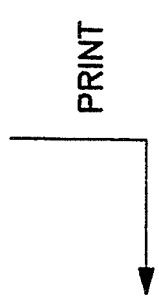
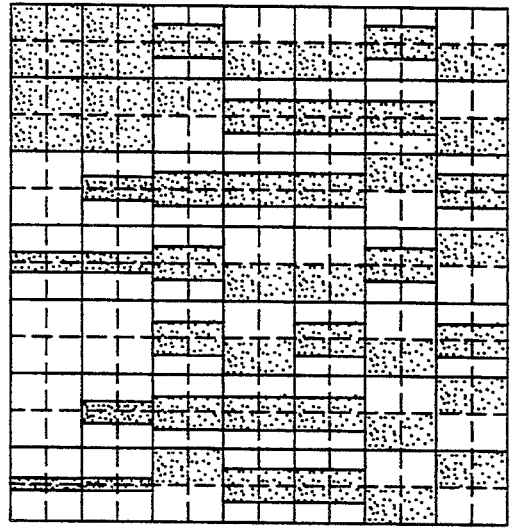
FIG. 47

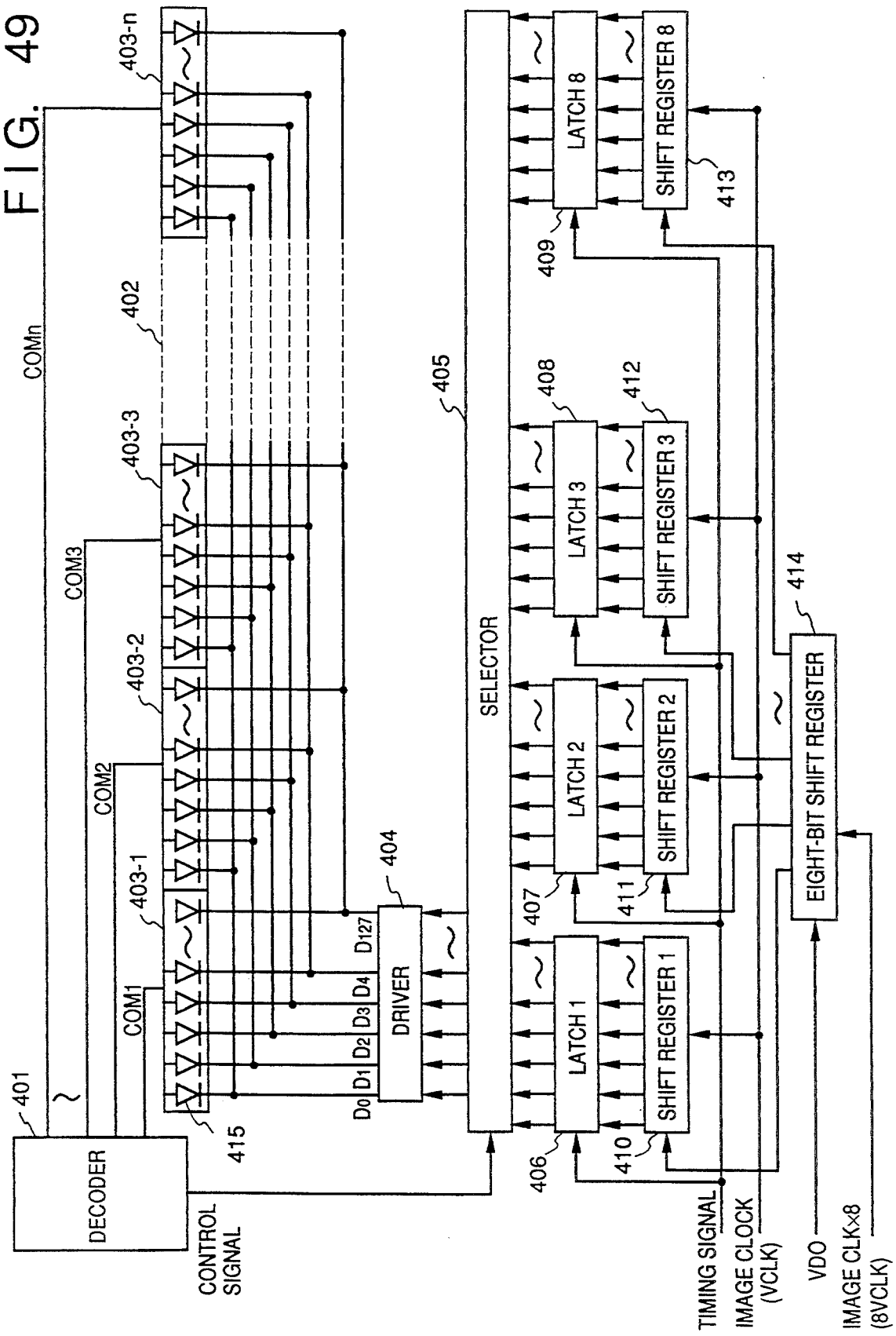

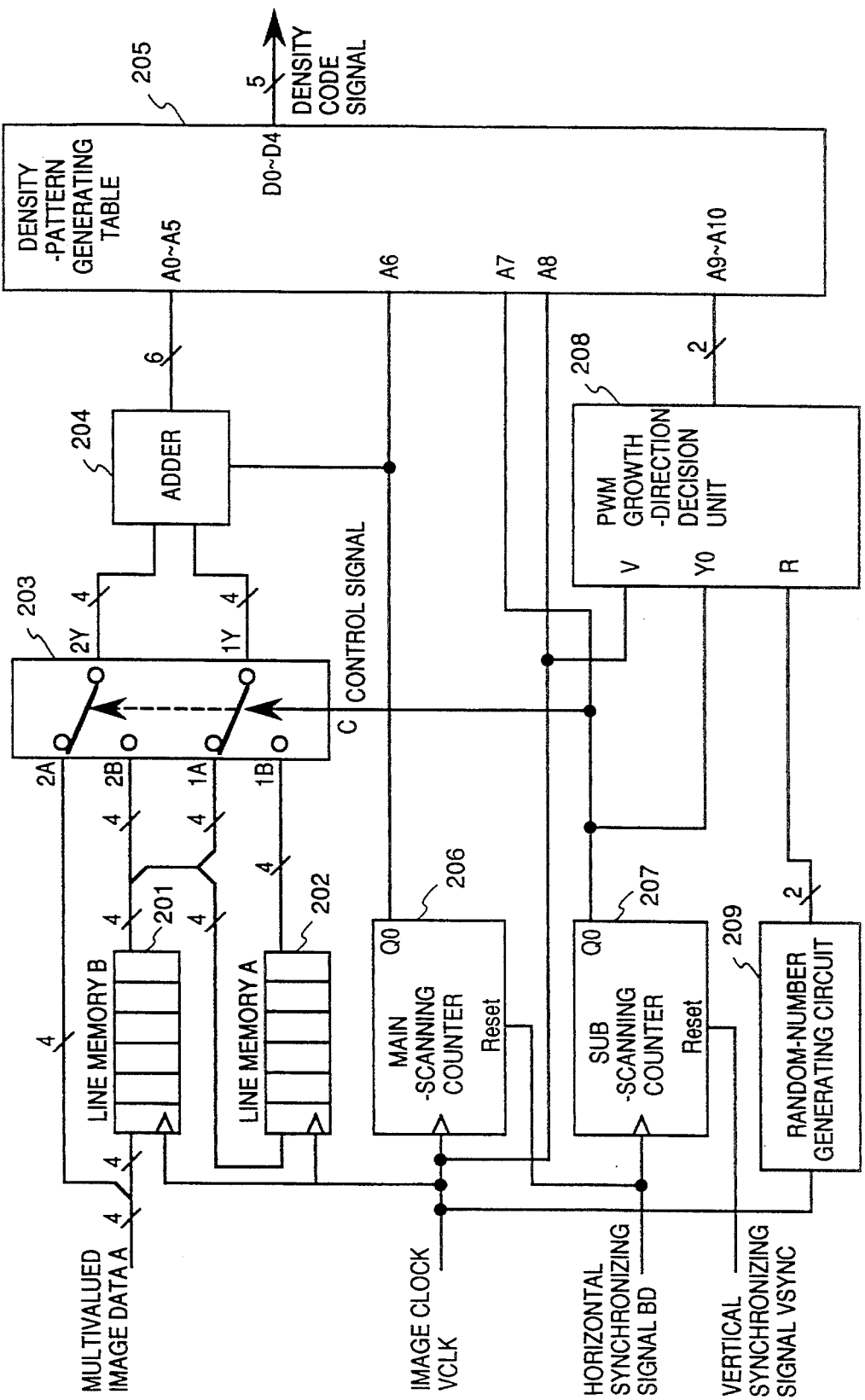

FIG. 51(A)  FIG. 51(B)  FIG. 51(C)
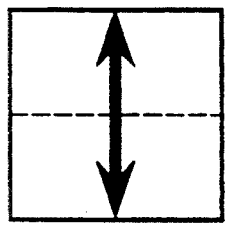 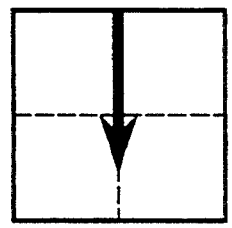 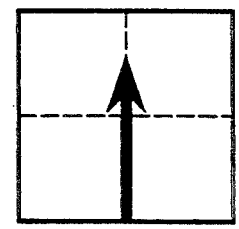
FIG. 51(D)
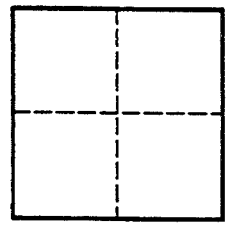
ONE PIXEL OF 300 dpi
FIG. 51(E)
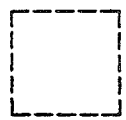
ONE PIXEL OF
600 dpi

PATTERN GENERATING CODE

| A10 A8 A6 A4 A2 A0 | |
|---|---|
| A9 A7 A5 A3 A1 | D4 D3 D2 D1 D0 |
| 0 0 0 0 0 0 0 0 0 0 0 ⁄ | A-PATTERN ON GENERATING CODE |
| 0 0 1 0 0 0 0 0 0 0 0 ⁄ | A-PATTERN OFF GENERATING CODE |
| 0 1 0 0 0 0 0 0 0 0 0 ⁄ | B-PATTERN ON GENERATING CODE |
| 0 1 1 0 0 0 0 0 0 0 0 ⁄ | B-PATTERN OFF GENERATING CODE |
| 1 0 0 0 0 0 0 0 0 0 0 ⁄ | C-PATTERN ON GENERATING CODE |
| 1 0 1 0 0 0 0 0 0 0 0 ⁄ | C-PATTERN OFF GENERATING CODE |
| 1 1 0 0 0 0 0 0 0 0 0 ⁄ | UNUSED |

F I G. 60

|  |  |  |
|---|---|---|
| M5, M4 | L5, L4 | N5, N4 |
| O5, O4 | P5, P4 | Q5, Q4 |
| R5, R4 | S5, S4 | T5, T4 |

IMAGE FORMING APPARATUS WITH RANDOM DENSITY PATTERN GROWTH

BACKGROUND OF THE INVENTION

This invention relates to an image forming apparatus such as a laser-beam printer or LED printer.

A known method of printing multivalued image data by a laser-beam printer or LED printer is an area tone method [hereinafter referred to as pulse-width modulation (PWM)] which, as shown in FIG. 69, involves further subdividing the smallest dot possessed by the printer, combining several of these to obtain the smallest unit (pixel) that represents density, and expressing tone in one pixel by the painted pattern.

FIG. 70 is a block diagram showing the configuration of a laser-beam printer for printing multivalued image data according to the prior art, and FIG. 71 is a block diagram showing the configuration of an LED printer according to the prior art.

In FIGS. 70 and 71, a printer controller 2603 within a printer 2602 receives image data (inclusive of photographic images and character images) output by a host computer 2601, which is an external device. The printer controller 2603 converts a character image into a prescribed bit-map signal (e.g., 3F[h] if black and 00[h] if white, where h represents a hexadecimal number). With regard to a photographic image, the printer controller 2603 sends six-bit image data to an image processor 2604 as a code signal indicative of density (white is 00[h], and the numerical value is enlarged as density increases, with 1F[h] representing black).

In the laser-beam printer, a laser driver 2605 shown in FIG. 70 controls the flashing of a semiconductor laser 2606 in dependence upon an output signal from the image processor 2604. In the case of the LED printer illustrated in FIG. 71, and LED driver 2605' causes an LED 2606' to flash in dependence upon an output signal from the image processor 2604.

FIG. 72 is a block diagram showing the image processor 2604 of the above-mentioned printer, which prints a half-tone image. Numeral 2701 denotes a γ-correction table, which is constituted by a ROM or the like. Numeral 2702 denotes a two-bit main-scanning counter, 2703 a sub-scanning counter and 2704 a density-pattern generating table constituted by a ROM or RAM. Numeral 2705 denotes a parallel/serial converter which, in accordance with a clock having a frequency that is eight times that of an image clock VCLK, delivers eight-bit data output by the density-pattern generating table 2704.

The operation of the image processor constructed as set forth above will now be described. It will be assumed that the printer has a resolution of 600 dpi.

The printer controller (not shown in FIG. 72) sends the image clock VCLK, which is transmitted every dot of the 600 dpi, as well as five-bit multivalued image data transmitted in synchronization with the clock VCLK. The multivalued image data is subjected to an γ correction by the γ-correction table 2701 and is converted to five-bit image data, which enters addresses A0~A4 of the density-pattern generating table 2704. Meanwhile, the image clock VCLK is counted by the main-scanning counter 2702, the one-bit output thereof enters address A5 of the table 2704. Further, a horizontal synchronizing signal BD, which is sent from a printer engine whenever the semiconductor laser 2606 or LED 2606' makes a single scan, is counted by the sub-scanning counter 2703, the one-bit output whereof enters address A6 of the table 2704.

When the above-mentioned address enters the density-pattern generating table 2704, data of eight bits D0~D7, which have been loaded at this address in advance, are delivered by the table and then successively output starting from the MSB, by the parallel/serial converter 2705 in accordance with a clock VCLK×8, which has a frequency eight times that of the image clock VCLK. As a result, this operation forms the smallest or minimum unit, in which a total of four dots, namely two dots in the main scan and two dots in the sub-scan, represent density, with each dot being one dot of 600 dpi. Furthermore, one pixel has 32 subdivisions since one dot of 600 dpi is partitioned into eight parts. In other words, density is expressed by painting a certain number of the 32 subdivisions of one pixel in black.

FIG. 73 is an example of a density pattern. This is for a case in which multivalued image data indicates a density of 9/32.

In the conventional printer described above, however, a dot of 480 dpi is actually the smallest dot. If a half-tone image is printed by forming a pixel of dots having a resolution higher than this, a density irregularity in the main-scanning direction of the image becomes very conspicuous. The density irregularity is caused by a speed irregularity (hereinafter referred to as "pitch irregularity") in the paper conveyance system and drive system of the photosensitive drum in the printer.

In particular, since the spacing between LED's in an LED array is not perfectly uniform, density irregularity becomes conspicuous in the main-scanning direction. In case of 300 lines and 32 tones, the capabilities of the printer engine cannot be realized fully.

Density irregularity caused by pitch irregularity will be described.

FIG. 74 is a diagram illustrating a printing state for a case in which laser irradiation time is 50% in PWM performed in units of 300 dpi using the conventional printer. If the intervals between scanning lines of the laser are reduced owing to pitch irregularity in the printer, there is a rise in the energy distribution, which is obtained by combining the irradiation energy at each dot. At the same time, the energy that exceeds a development threshold value (namely the energy at which toner is capable of being affixed) spreads over a wider range, thereby broadening the area to which the toner is affixed and producing an increase in density. As a result, mutually adjacent pixels become connected in the main-scanning direction, as shown at portion A in FIG. 74, thereby causing a further increase in density.

If the intervals between scanning lines of the laser are increased owing to pitch irregularity in the printer, on the other hand, gaps are produced in the energy, as shown at portion B in FIG. 74, and the area to which the toner is affixed is reduced, thereby producing a decrease in density.

FIG. 75 is a diagram illustrating a printing state for a case in which laser irradiation time is 50% in PWM performed in units of 150 dpi. This diagram illustrates that an irregularity in printing density does not readily occur in PWM in units of 150 dpi even if the intervals between the laser scanning lines changes owing to pitch irregularity in the printer.

Further, in half-tone processing by modulation of laser luminous intensity a case in which laser luminous intensity is low so as to produce a low laser energy distribution and result in a reduced area of toner fixation per pixel is the equivalent of a reduction in the laser irradiation length w.

Thus, in a case where 150 dpi is adopted as one pixel, there tends to be little influence from pitch irregularity. However, resolution is low and character images do not appear sharp. If 300 dpi is adopted as one pixel, on the other hand, resolution is improved and character images are sharpened but the effects of pitch irregularity become a problem.

SUMMARY OF THE INVENTION

An object of the present invention is to provide an image forming apparatus in which density irregularity that occurs in printing owing to pitch irregularity in the printing unit is reduced so that a high-quality image can be obtained without sacrificing sharpness in character images.

According to the present invention, the foregoing object is attained by providing an image forming apparatus for performing area modulation of a black area of a pixel, which is an aggregate of subdivisions obtained by subdivision based upon multivalued dot information, forming an electrostatic latent image on a recording medium by deflecting a light beam using a signal obtained by the area modulation, and developing the electrostatic latent image, comprising pattern generating means for generating density patterns that possess a plurality of different growth directions, information generating means for generating information for the purpose of changing the growth direction of the density patterns, and changeover means for changing over the information, recording of an image being performed by a density pattern having a growth direction based upon the information changed over by the changeover means.

In a preferred embodiment, the information generating means includes means for generating a first growth-direction designating signal based upon a growth direction within an aggregate area of a predetermined pixel, and means for generating a second growth-direction designating signal based upon a random signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a time chart showing the operation of the data generator in the first embodiment of the invention;

FIG. 6 is a circuit diagram showing the configuration of the adder in the first embodiment of the invention;

FIG. 7 is a time chart associated with the adder in the first embodiment of the invention;

FIGS. 11A–11E are diagrams for describing the growth directions of a density pattern in the first embodiment of the invention;

FIG. 15 is a diagram showing select logic of selectors in FIG. 13;

FIG. 16 is a diagram illustrating amounts of delay in a variable delay circuit in FIG. 13;

FIGS. 17A and 17B are time charts associated with the PWM processor of FIG. 13;

FIG. 20 is a diagram showing the logic table of a delay setting selector in FIG. 18;

FIGS. 22 through 28 are diagrams for describing a first modification of the first embodiment;

FIGS. 37 through 41 are diagrams for describing a first modification of the second embodiment;

FIGS. 42 through 47 are diagrams for describing a second modification of the second embodiment;

FIGS. 48 through 54 are diagrams for describing a third embodiment of the present invention;

FIGS. 59 through 62 are diagrams for describing a fourth embodiment of the present invention;

DESCRIPTION OF THE PREFERRED EMBODIMENTS

Preferred embodiments of the present invention will now be described in detail with reference to the drawings.

[First Embodiment]

Figure 1:
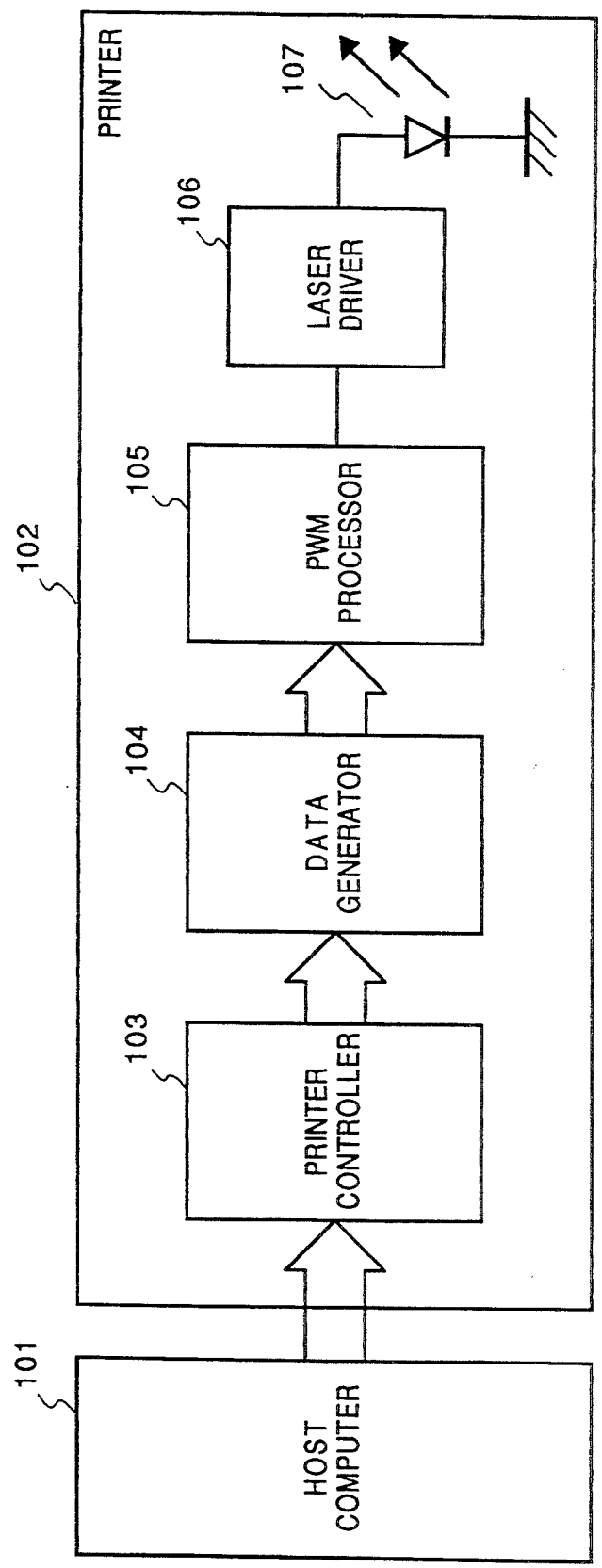
FIG. 1 is a block diagram illustrating the configuration of a laser-beam printer according to a first embodiment of the present-invention.

FIG. 1 is a block diagram showing the overall configuration of laser beam printer according to a first embodiment of the present invention. Numeral 101 denotes a host computer that transmits multivalued image data to a printer 102. The printer 102 includes a printer controller 103 that receives the multivalued image data, subjects it to predetermined processing and then delivers the processed multivalued image data to a data generator 104, described later. A PWM processor 105 generates a pulse-width modulated signal (hereinafter referred to as a "PWM signal") based upon the density of the multivalued image data. A semiconductor laser 107 is caused to flash by the PWM signal. The semiconductor laser 107 irradiates a photosensitive drum (not shown), thereby performing printing by electrophotography.

The data generator 104 and PWM processor 105, which are the principal components of a laser-beam printer in accordance with this embodiment, will be described in order. It will be assumed in the description that the printer engine performs printing at a printing density of 600 dpi.

The printer controller 103 transmits four-bit multivalued image data A in 600 dpi units. Let F[H] (where H represents a hexadecimal number) indicate black, and let 0[H]~E[H] indicate half-tone printing. In 300 dpi units, which is an aggregate of four dots in 600 dpi units in which 16 tones of 0[H]~F[H] are capable of being expressed, it is possible to express 61 tones of 0[H]~3C[H] (F[H]+F[H]+F[H]+F[H]=3C[H]) in 300 dpi units.

Figure 10A:
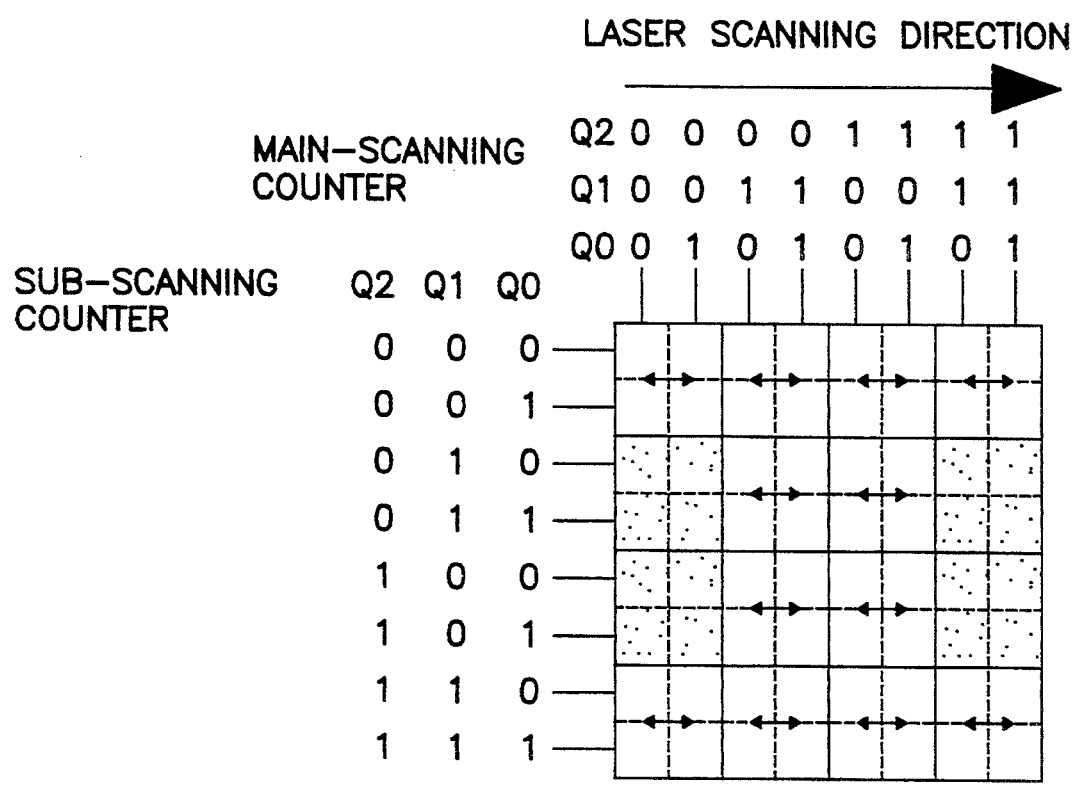
FIGS. 10A–10B are diagrams for describing a random-growth portion in the first embodiment of the invention.
Figure 10B:
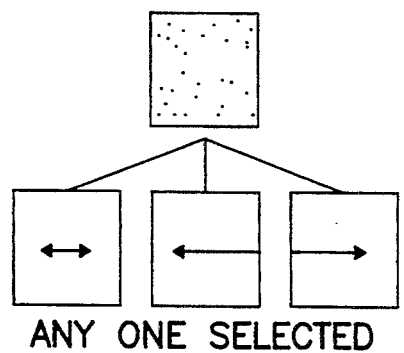

The data generator 104 is adapted to add two dots of the multivalued image data, which is sent from the printer controller 103, in the main-scanning direction and two dots of the multivalued image data in the sub-scanning, for a total of four dots, and generate multivalued data (seven bits), which represents the density pattern, based upon the results of addition. In the printer according to this embodiment, a random growth portion is provided, as shown in FIG. 10, for every unit consisting of an aggregate of 16 dots, namely four dots in the main-scanning direction × four dots in the sub-scanning direction, where the dots are in units of 300 dpi.

Figure 2:
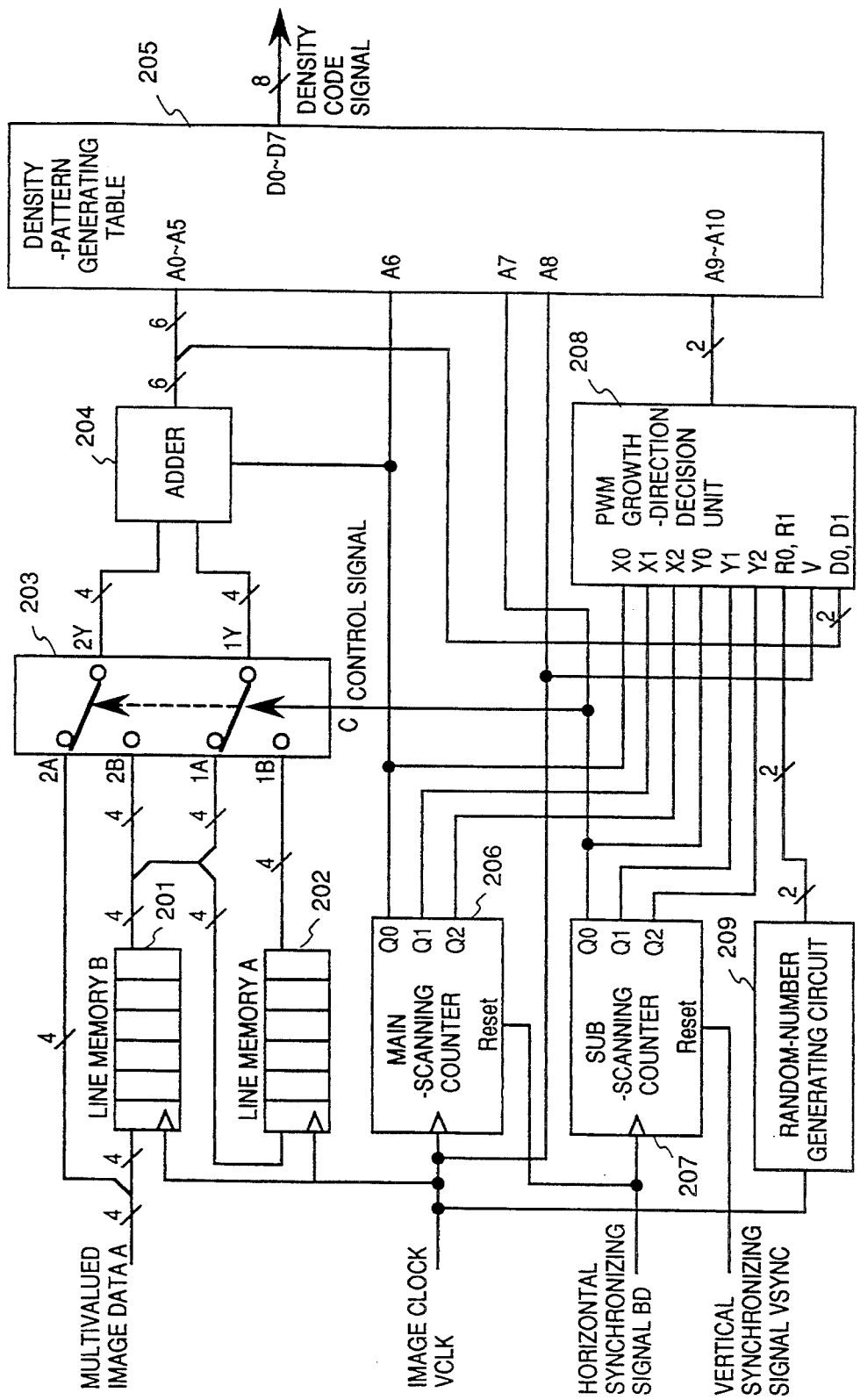
FIG. 2 is a block diagram showing the configuration of a data generator in a first embodiment.

FIG. 2 is a block diagram showing the construction of the data generator 104, and FIG. 3 is a time chart illustrating the operation of the data generator shown in FIG. 2.

The arrangement shown in FIG. 2 includes a line memory (B) 201, a line memory (A) 202, a selector 203, an adder 204, a PWM growth-direction decision unit 208, a random-number generating circuit 209, main- and sub-scanning counters 206, 207, respectively, each of which is constituted by a frequency divider, and a density-pattern generating table 205. The main-scanning counter 206 and the sub-scanning counter 207 respectively receive an image clock VCLK and a horizontal synchronizing signal BD as input signals and output signals Q0, Q1, Q2 obtained by frequency division by two, four and eight, respectively. The image clock is input to the random-number generating circuit 209, which outputs a two-bit random number (0[H]~3[H]).

The operation of the data generator 104 will now be described.

As illustrated in (a)~(e) of FIG. 3, the memory (B) 201 receives the multivalued image data A from the controller 103, and the line memory (B) 201 transmits the accumulated data to the line memory (A) 202 at the same time that the next line of data is accepted. In other words, one line of the immediately preceding data is always stored in the line memory (A) 202. On the basis of the signal Q0, which is the result of the horizontal synchronizing signal BD being frequency-divided by two, the selector 203 selects and outputs either a set of input signals 1A, 2A or a set of input signals 1B, 2B.

Figure 4A:
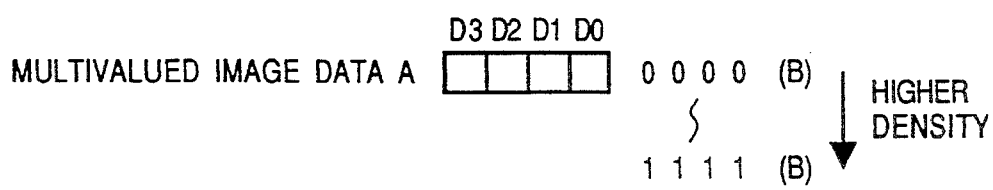
FIGS. 4A and 4B are diagrams showing multivalued image data and an output signal from an adder in the first embodiment of the invention.
Figure 4B:
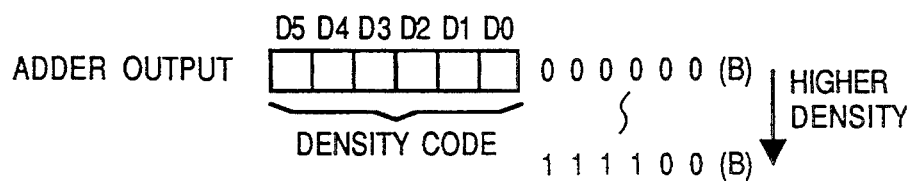

Outputs 1Y, 2Y of the selector 203 are accepted by the adder 204, within which two dots are added also in the main scanning direction so that items of four-bit image data of a total of four dots are added to produce six-bit image data. FIG. 4B illustrates the six-bit output signal from the adder 204. The details of the adder 204 will be described later.

In this embodiment, the inputs to the PWM growth-direction decision unit 208 are three bits from the main-scanning counter 206, three bits from the sub-scanning counter 207 and the two-bit signal from the random-number generating circuit 209, as illustrated in FIG. 2. The decision unit 208 outputs a two-bit pattern-select signal for selecting one of the three patterns (A) through (C) shown in FIG. 11. The two-bit data from the adder 204 is used in other embodiments. The details of the PWM growth-direction decision unit 208 will be described later in greater detail.

The inputs to the density-pattern generating table 205 are multivalued data of six bits, the two-bit pattern-select signal, the image clock, the Q0 output of the main-scanning counter 206, which signal is the result of frequency-dividing the image clock by two, and the Q0 output of the sub-scanning counter 207, for a total of 11 bits. The table 205 outputs a density code signal based upon a look-up table, which is constituted by a ROM or the like, having an address map shown in FIG. 5. It should be noted that the density code generated by the density-pattern generating table 205 is assumed to be a code that takes into consideration a correction of the $\gamma$ characteristic of the printer.

Figures 5A, 5B:
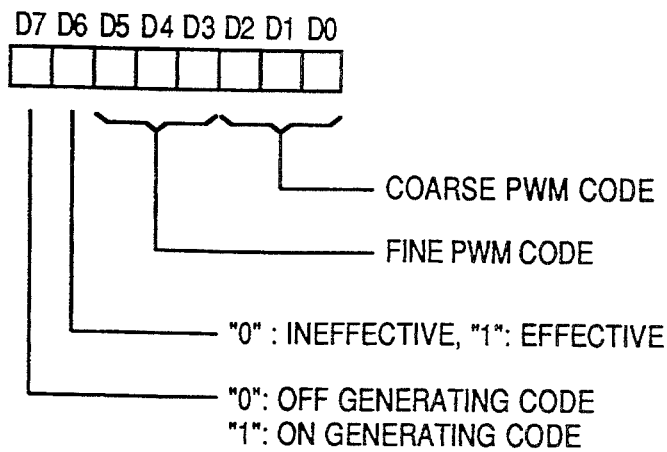
FIGS. 5A and 5B are address maps in the first embodiment of the invention.

As illustrated in FIG. 2, the address A8 of the pattern-density generating table 205 is a 600 dpi image clock VCLK. An ON generation code and an OFF generation code are output with respect to one dot of 600 dpi. Pulse-width modulation is carried out by the PWM processor 105, the details of which will be described later. The PWM processor 105 monitors the MSB of the density code and recognizes the ON generation code if this bit is "1" and the OFF generation code if this bit is "0", as shown in FIG. 5A. One dot is subjected to PWM in units of $\frac{1}{8}$ by the density code of D5~D3 and in units of 1/64 by D2~D0.

FIG. 6 is a block diagram showing the circuit arrangement of the adder circuit 204 illustrated in FIG. 2, and FIG. 7 is a timing chart showing the operation of the adder circuit 204.

As shown in FIG. 6, the adder circuit 204 includes latches 701~704 for latching data in synchronization with the 600 dpi image clock (not shown), selectors 705, 706 and adding circuits 707~709.

In the time chart of FIG. 7, "5−4" means the fourth dot of data on the fifth line, and "5−(6+7)" means data obtained by adding the sixth and seventh dots on the fifth line, by way of example. Similarly, "(5+6)−(6+7)" signifies data obtained by adding the sixth and seventh dots on the fifth line and the sixth and seventh dots on the sixth line.

A 1Y output signal from the selector 203 shown in FIG. 2 enters as data on the (2n−1)th line, and a 2Y output signal from the selector 203 enters as data on the 2n−th line. The adder 709 further adds the two signals from the adding circuits 707, 708, thereby obtaining a six-bit signal as the result of addition.

Figure 8:
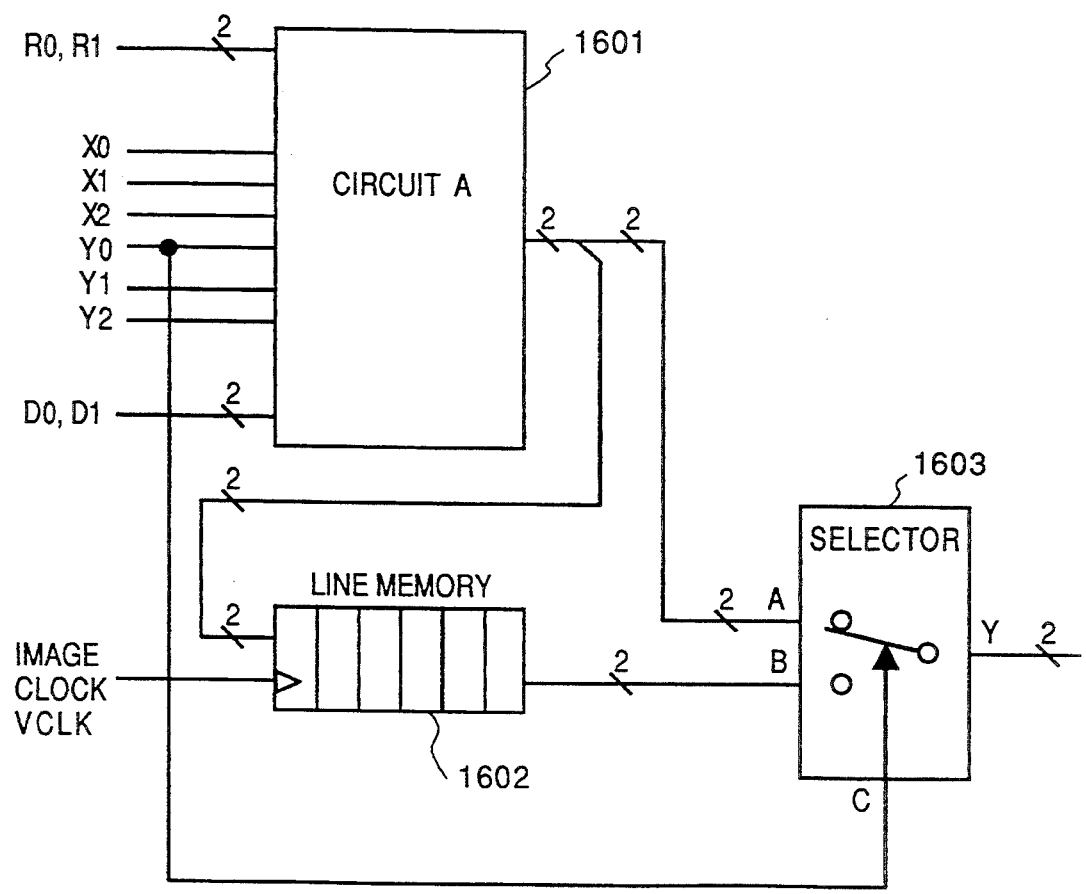
FIG. 8 is a diagram showing a PWM growth-direction decision unit in the first embodiment of the invention.
Figure 9:
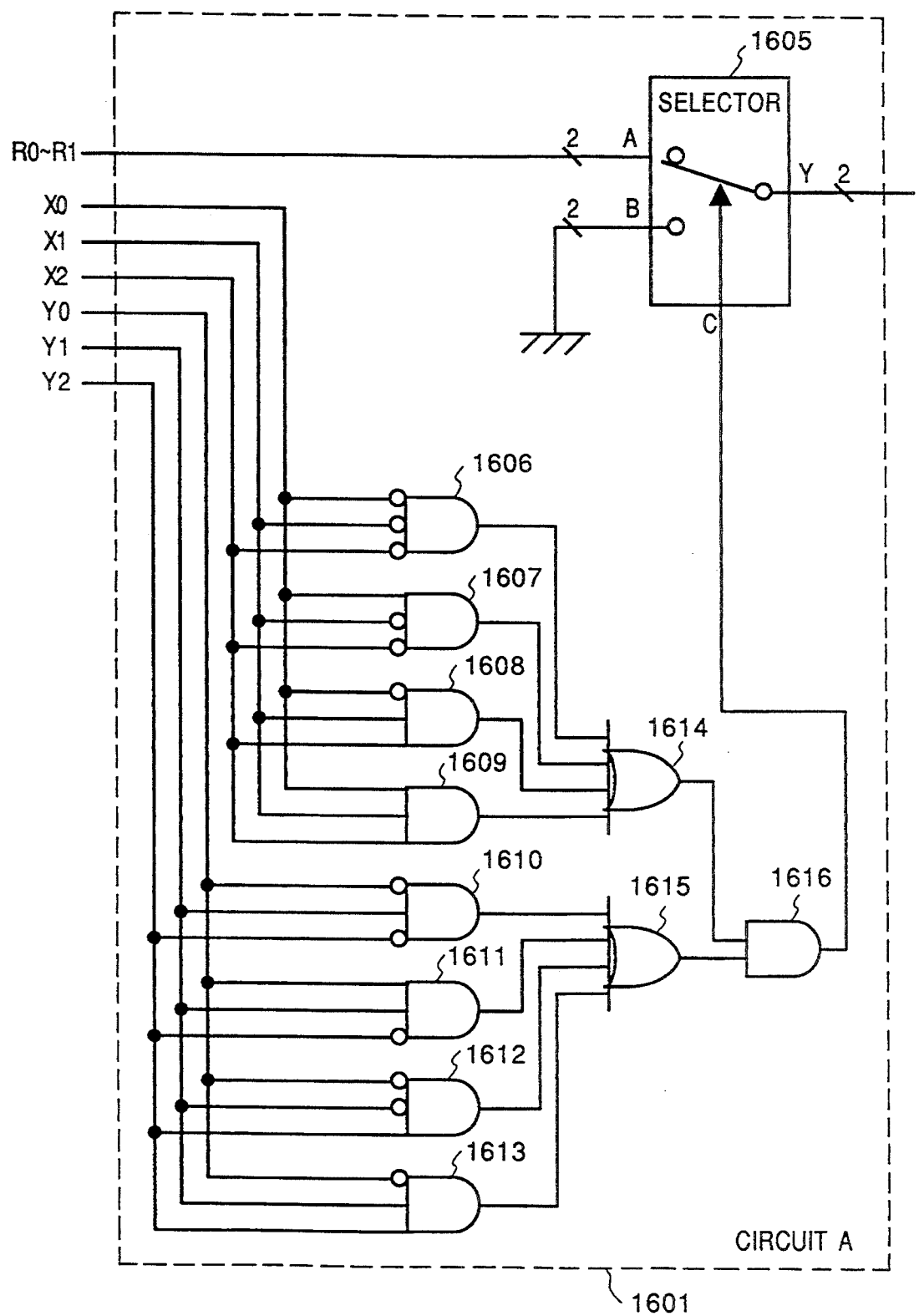
FIG. 9 is a block diagram showing a circuit A of the PWM growth-direction decision unit in the first embodiment of the invention.

FIG. 8 is a circuit block diagram of the PWM growth-direction decision unit 208. The decision unit 208 includes a line memory 1602, a selector 1603 and a circuit A. FIG. 9 is a block diagram of the circuit A.

In FIGS. 8 and 9, X0∼X2 respectively denote the outputs Q0∼Q2 from the main-scanning counter 206, and Y0∼Y2 respectively denote the outputs Q0∼Q2 from the sub-scanning counter 207. The two bits R0, R1 are the outputs from the random-number generating circuit 209.

As shown in FIG. 9, the circuit A 1601 includes a selector 1605, OR gates 1614, 1615 and AND gates 1606∼1613, 1616. In the printer according to this embodiment, as set forth above, a random-growth portion is provided, as shown in FIG. 10, for every unit consisting of an aggregate of 16 dots, namely four dots in the main-scanning direction × four dots in the sub-scanning direction, where the dots are in units of 300 dpi. The PWM growth-direction decision unit 208 transmits the pattern-select signal in order to achieve this.

As shown in FIG. 10, the dots of the random-growth portions are defined as follows in 600 dpi units:

(X2,X1,X0)=(0,0,0) and (Y2,Y1,Y0)=(0,1,0)
(X2,X1,X0)=(0,0,0) and (Y2,Y1,Y0)=(0,1,1)
(X2,X1,X0)=(0,0,0) and (Y2,Y1,Y0)=(1,0,0)
(X2,X1,X0)=(0,0,0) and (Y2,Y1,Y0)=(1,0,1)
(X2,X1,X0)=(0,0,1) and (Y2,Y1,Y0)=(0,1,0)
(X2,X1,X0)=(0,0,0) and (Y2,Y1,Y0)=(0,1,1)
(X2,X1,X0)=(0,0,0) and (Y2,Y1,Y0)=(1,0,0)
(X2,X1,X0)=(0,0,0) and (Y2,Y1,Y0)=(1,0,1)
(X2,X1,X0)=(1,1,0) and (Y2,Y1,Y0)=(0,1,0)
(X2,X1,X0)=(0,0,0) and (Y2,Y1,Y0)=(0,1,1)
(X2,X1,X0)=(0,0,0) and (Y2,Y1,Y0)=(1,0,0)
(X2,X1,X0)=(0,0,0) and (Y2,Y1,Y0)=(0,0,1)
(X2,X1,X0)=(1,1,1) and (Y2,Y1,Y0)=(0,1,0)
(X2,X1,X0)=(0,0,0) and (Y2,Y1,Y0)=(0,1,1)
(X2,X1,X0)=(0,0,0) and (Y2,Y1,Y0)=(1,0,0)
(X2,X1,X0)=(0,0,0) and (Y2,Y1,Y0)=(1,0,1)
(X2,X1,X0)=(0,0,0) and (Y2,Y1,Y0)=(0,1,0)

The circuit A 1601 performs the following operation in 600 dpi units:

When the relationships shown above are established by the AND gates 1606∼1613, OR gates 1614, 1615 and AND gate 1616, the select signal applied to the selector becomes logical "1" and two bits from the random-number generating circuit 209 are transmitted intact as the pattern-select signal. When the above-mentioned relationships do not hold, the selector 1605 selects the B side and two bits (0,0) at the circuit ground level are transmitted. Since the data of pattern (A), namely the central growth pattern shown in FIG. 11, has been stored in the bank area indicated by addresses A10, A9 when bits (A10, A9) of the density-pattern generating table 205 are (0,0), and the pattern (A) is selected.

Figure 12:
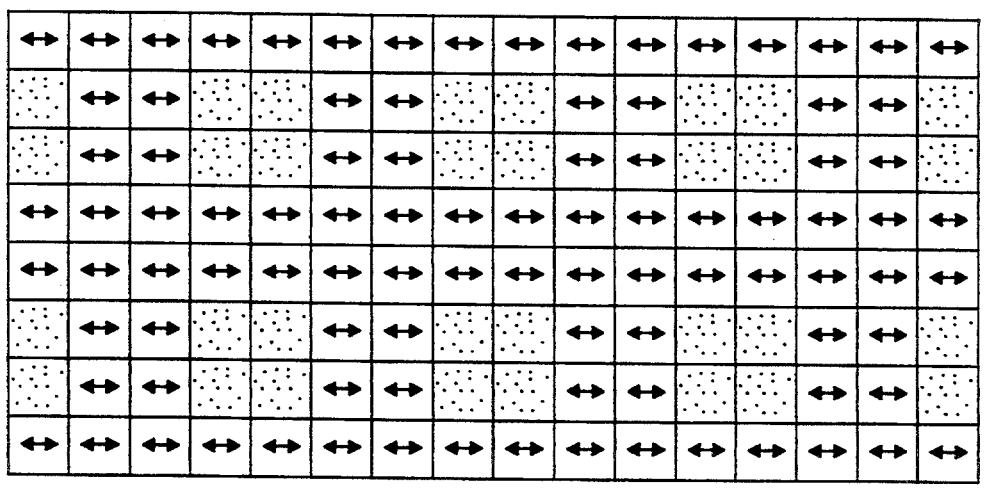
FIG. 12 is a diagram illustrating an example of growth of a density pattern in the first embodiment of the invention.

In the printer of this embodiment, growth is in units of 300 dpi and therefore the odd-numbered lines in 600 dpi units must have a growth direction that is the same as that of the even-numbered lines. Accordingly, as shown in FIG. 8, the output of the circuit A 1601 is transmitted simultaneously to the selector 1603 and line memory 1602 and the outputs of the circuit A and line memory 1602 are sent to the selector 1603. The selector 1603 selects the output of the circuit A when Y0 (the signal whose frequency is half that of the horizontal synchronizing signal) is logical "1" and the output of the line memory 1602 when Y0 is logical "0". As a result, the final output of the PWM growth-direction decision unit 208 is growth in units of 300 dpi and a growth pattern of the kind shown in FIG. 12 is realized overall.

The operation of the PWM processor 105 will be described next.

The PWM processor performs coarse PWM (in which one dot at 600 dpi is pulse-width modulated in units of ⅛ dot) and fine PWM (in which one dot at 600 dpi is pulse-width modulated in units of 1/64 dot). As mentioned above, the PWM processor 105 monitors the MSB of each density from the data generator 104, recognizes the ON generation code when the MSB is "1" and the OFF generation code when the MSB is "0". One dot is subjected to PWM in ⅛ units by the density code D5∼D3 an din 1/64 subdivided units by the density code D2∼D0.

Figure 13:
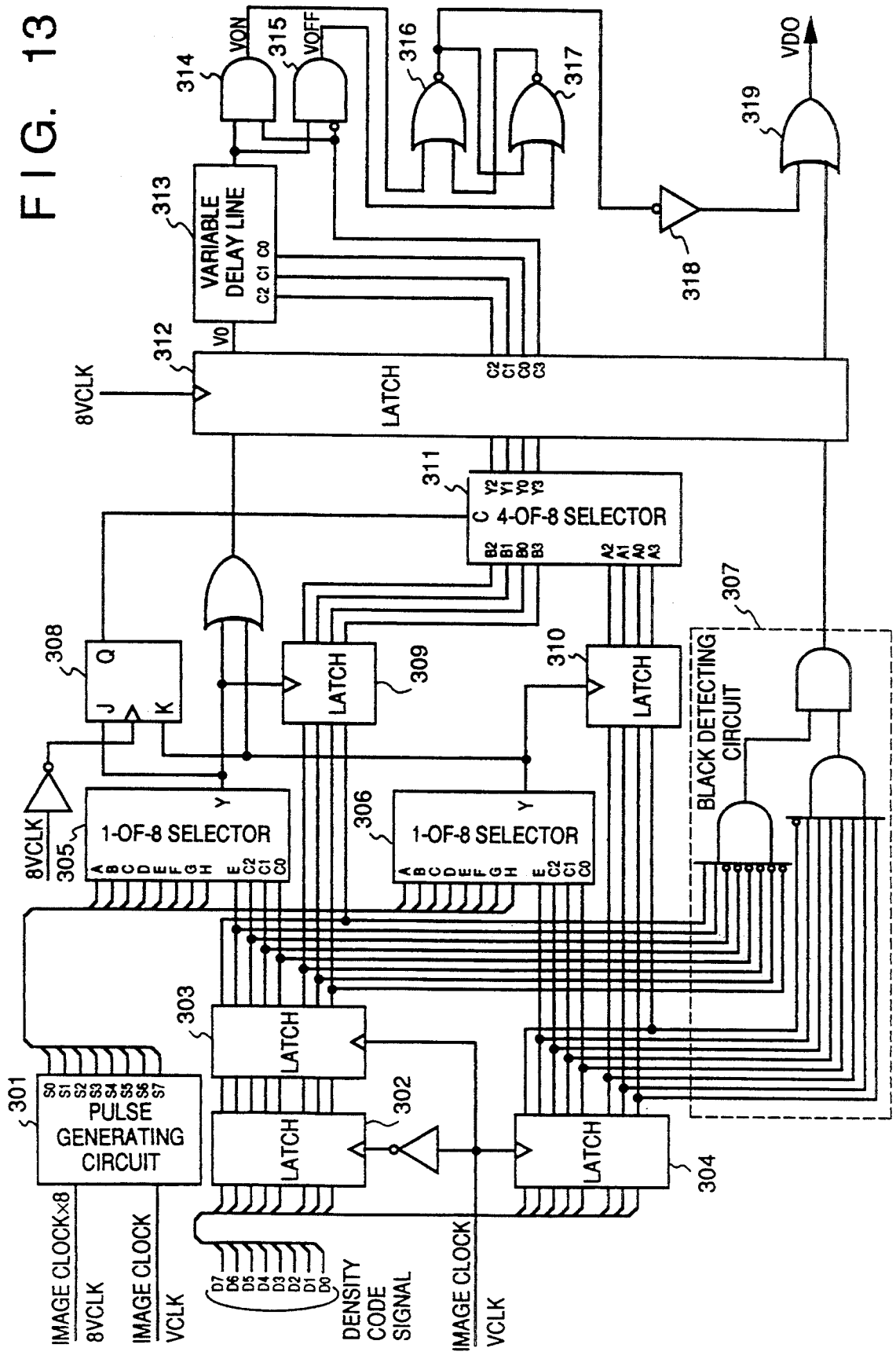
FIG. 13 is a diagram showing a PWM processor in the first embodiment of the invention.

FIG. 13 is a block diagram of the PWM processor 105. The arrangement of FIG. 13 includes a pulse generating circuit 301, latches 302, 303, 304, 309, 310 and 312, one-of-eight selectors 305, 306, a variable delay circuit 313, a black detecting circuit 307, a four-of-eight selector 311 and NOR gates 316, 317, which construct an RS latch.

Figure 14:
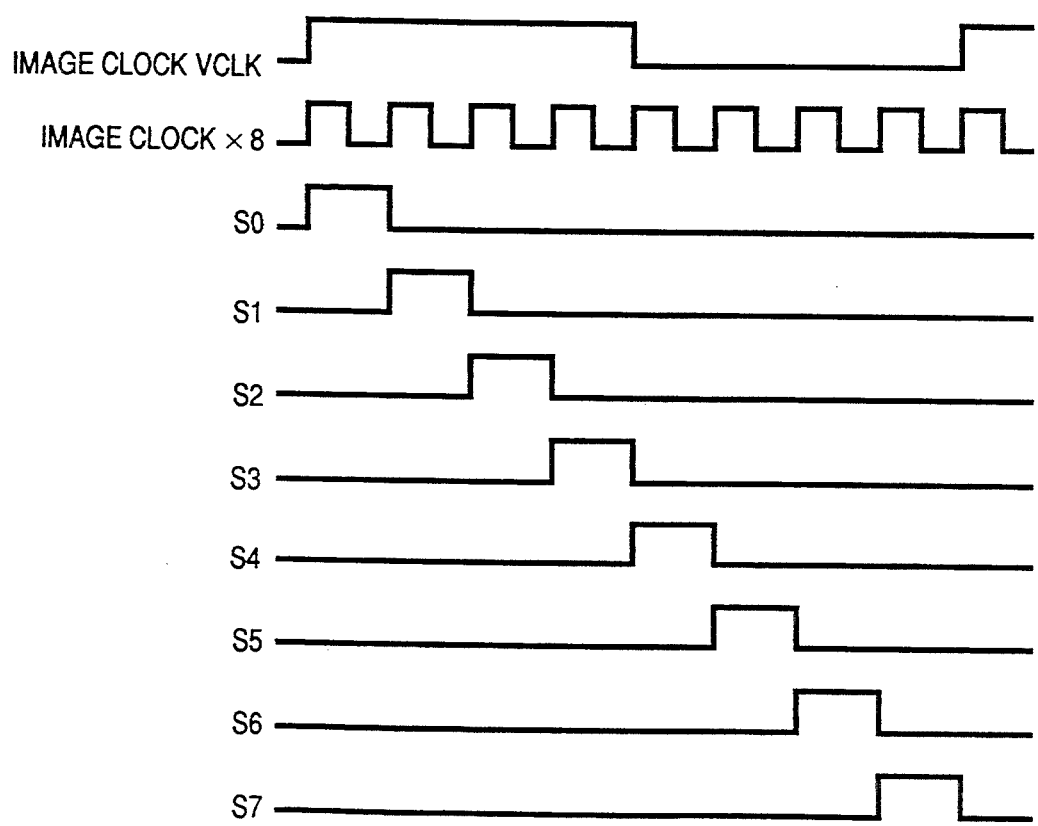
FIG. 14 is a diagram showing pulses from a pulse generating circuit in FIG. 13.

The pulse generating circuit 301 generates eight pulses, shown in FIG. 14, based upon the image clock VCLK and a clock 8VCLK having a frequency eight times that of the image clock. Each of these pulses enters the selectors 305, 306, which decide to select and output, or to disable, one pulse from among pulses S0∼S7 in FIG. 14 based upon the density code signals D6, D5, D4, D3 among density code signals D0∼D7 output by the data generator 104.

FIG. 15 illustrates the select logic of the selectors 305, 306. When a predetermined input is applied to the black detecting circuit 307, the dot is judged to be a black dot and logical "1" is output. When "1" is output, the VDO signal is forcibly outputted as "1" by an OR gate 319, which is the last stage. The VDO signal at logical "1" is a signal that fires a laser (not shown), and the VDO signal at logical "0" is a signal that extinguishes the laser. In all other cases, namely when a dot is a half-tone printing dot and not a black dot, a VDO signal of the kind shown in FIG. 17 is generated.

The operation of the PWM processor 105 shown in FIG. 13 will now be described in accordance with the VDO generation timing of PWM shown in FIG. 17. The description will be given taking as an example a case in which right-side growth PWM of FIG. 17A is performed.

The density code signal output by the density-pattern generating table 205 is composed of eight bits of the ON generation code and eight bits of the OFF generation code within one dot at 600 dpi. These are synchronized to the leading edges of the image clock of 600 dpi. The latch 303 outputs the pattern ON generation code, and the latch 304 outputs the pattern OFF generation code.

In each generation code, four bits (D6, D5, D4, D3) enter as control signals E, C2, C1, C0 of the one-of-eight selectors 305, 306. One of the pulses from among S0~S7 output by the pulse generating circuit is selected. The ON and OFF pulses output by the selectors 305, 306 are OR-ed by an OR gate, the output of which is applied to the latch 312.

Meanwhile, in the generation code output by the latches 303, 304, four bits (D7, D2, D1, D0) enter each of the latches 309, 310 and are output in synchronization with the leading edges of the above-mentioned ON and OFF pulses. The ON generation code D7, D2, D1, D0 is output by the four-of-eight selector 311 and J-K flip-flop 308 from the leading edge of the ON pulse to the leading edge of the OFF pulse, and the OFF generation code D7, D2, D1, D0 is output from the leading edge of the OFF pulse to the leading edge of the next ON pulse.

The latch 312 outputs a recognition signal C3 of the ON and OFF pulses, both of which are then delayed by a delay time of less than ⅛ of a dot by the variable delay circuit 313. The amounts of delay are decided by the signals C2~C0 and are shown in FIG. 16.

The output signal from the variable delay circuit 313 it split into a VDO-on signal VON and a VDO-off signal VOFF by the C3 output of the latch 312, a PWM signal is produced by the RS latch (composed of the NOR gates 316, 317) and this signal is output as the image signal VDO via the OR gate 319.

Figure 18:
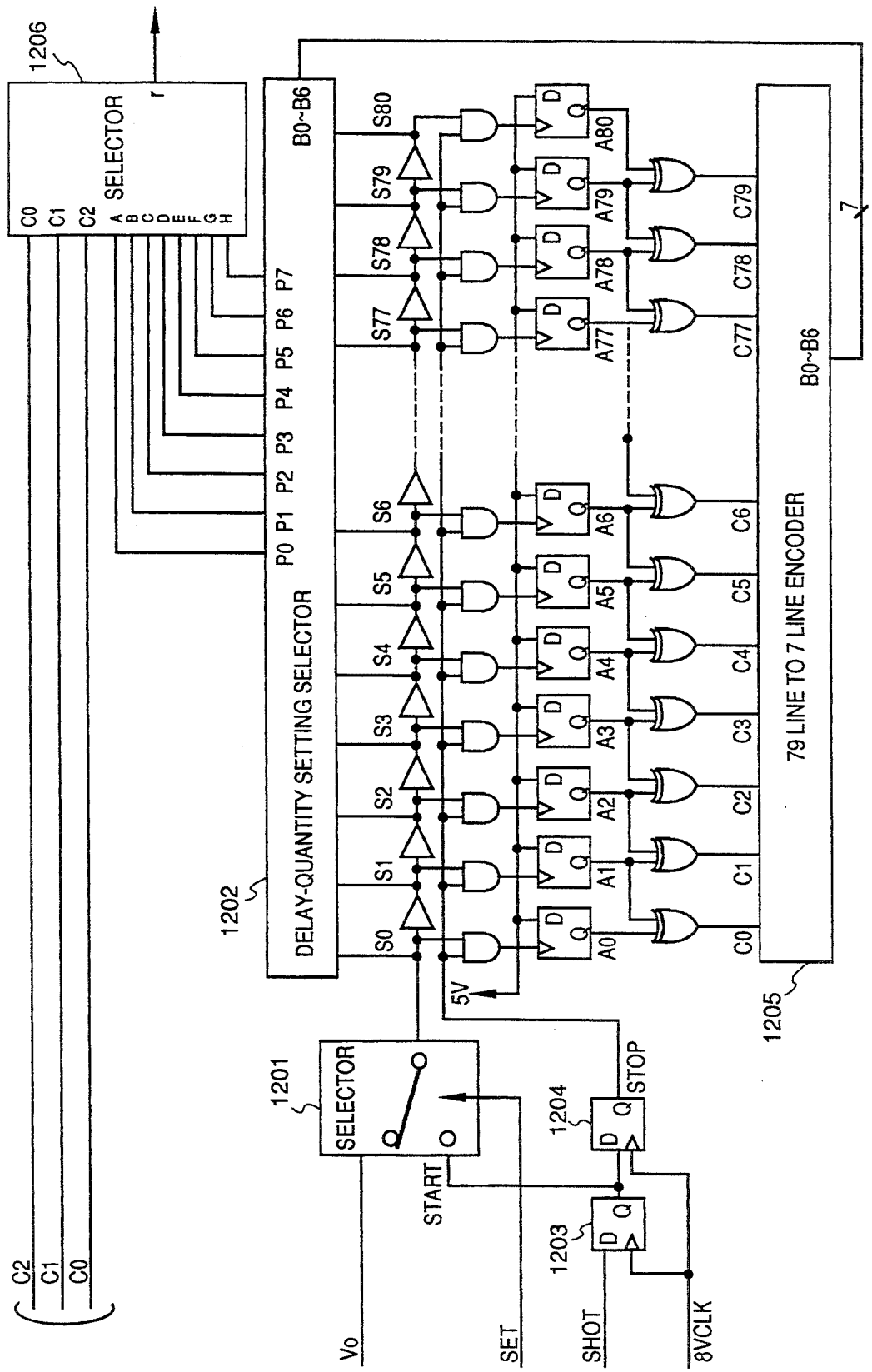
FIG. 18 is a diagram showing an example of the variable delay circuit of FIG. 13.
Figure 19:
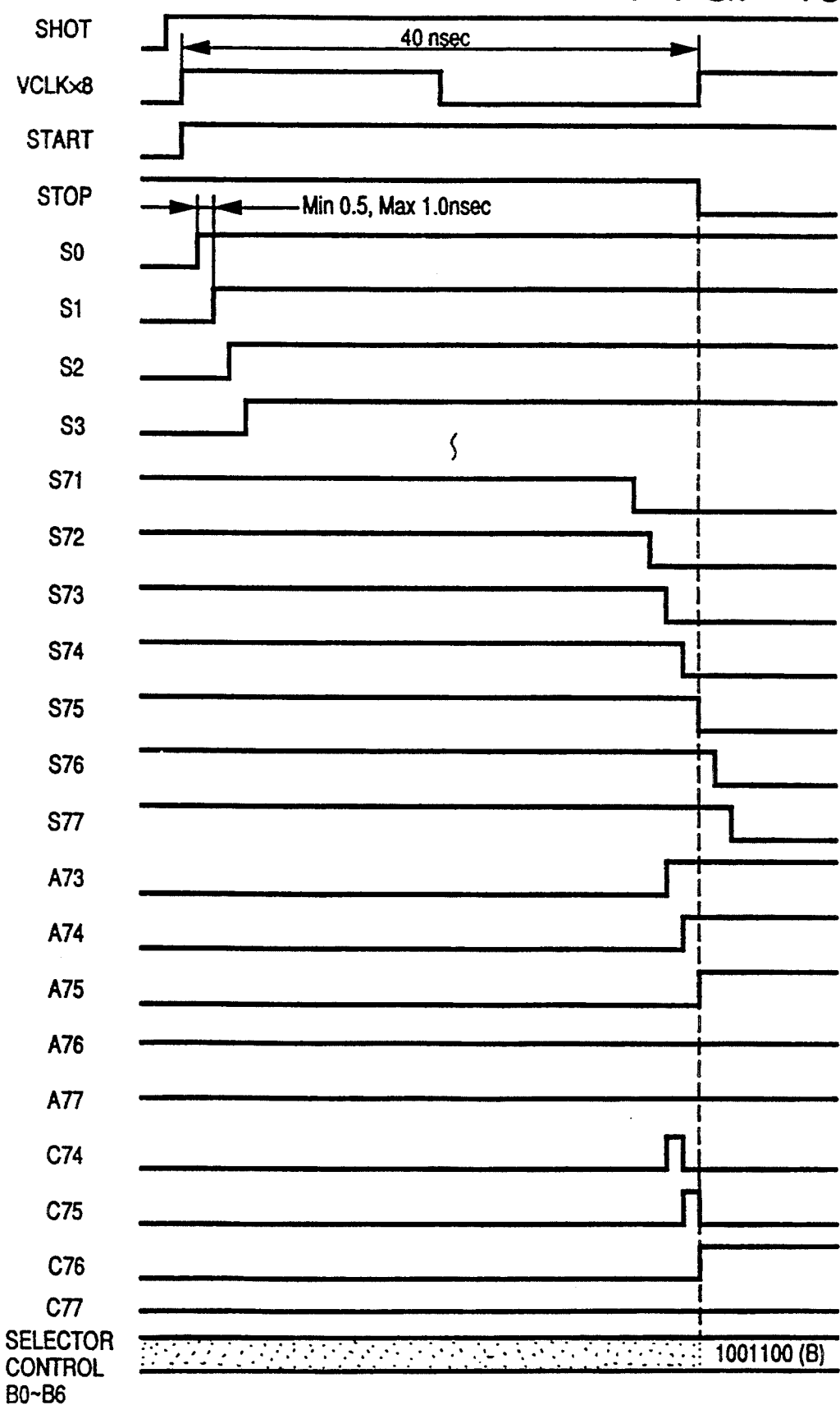
FIG. 19 is a time chart associated with the variable delay circuit of FIG. 13.

FIG. 18 is a circuit diagram showing the configuration of the variable delay circuit 313, and FIG. 19 is a time chart associated with the circuit 313.

The variable delay circuit shown in FIG. 18 sets the above-mentioned delay quantities before the printing operation is carried out. More specifically, a setting signal SET in FIG. 18 is rendered active so that a selector 1201 will select a start signal START for a setting operation. A one-shot pulse is input to a D-type flip-flop 1203 as a SHOT signal, and a Q output synchronized to 8VCLK is input as a START signal to a circuit composed of 80 serially connected buffers. A STOP signal, which is the $\overline{Q}$ output of a D-type flip-flop 1204, decays following a time delay of one period (e.g., 40 ns) of the 8VCLK signal, which delay is measured from the leading edge of the START signal.

In other words, each of the delay signals S0~S80 changes from "low" to "high" while being delayed successively, starting from S0, by the gate delay time. Thus, when a delay signal changes from "high" to "low", the Q output of the flip-flop connected ahead of it changes from "low" to "high". The Q outputs of the flip-flops connected to those buffers among the 80 buffer gates to which the START signal has been applied within the period of 40 ns from the leading edge of the START signal to the trailing edge of the STOP signal attain the "high" level.

If, by way of example, the START signal is "high" up to S75, as illustrated in FIG. 19, then A0~A75 go "high" and A76~A80 remain "low". C75, which is the output of the subsequent exclusive-OR operation, goes "high" and the other outputs C0~C74 and C76~C79 remain "low". Output signals B0~B6 are coded into seven bits, namely 1001100B (where B represents a binary number), by a 79 line to 7 line encoder 95 and these outputs are input as the control signals of the delay-quantity setting selector 1202.

Eight delay signals are selected from the delay signals S0~S80 by the control signals B0~B6 in the delay-quantity selector 1202, and these are delivered as P0~P7. FIG. 20 is a logic table showing the relationship between the control signals B0~B6 and the eight signals P0~P7 selected from the S0~S80 in the delay-quantity setting selector 1202.

According to the time chart of FIG. 19, the control signals B0~B6 are indicative of the code 1001100B [see 25) in FIG. 19], and therefore S0 is selected for P0, S10 for P1, S57 for P6, S28 and S67 for P7. The signals P0~P7 are each delayed about 5[ns] at a time. The variable delay circuit preferably is composed of a gate array. If the circuit is constructed on the same chip, the buffer delay times will be approximately equal.

In this variable delay circuit, the case described is one in which buffer gate delay is a minimum of 0.5 [ns] and a maximum of 1.0 [ns]. Design is such that 40 [ns]/0.5 [ns]=80 gates so that operation is possible at the minimum delay time of 0.5 [ns].

When the above-described operation ends and the printing operation begins, the selector 1201 of FIG. 18 selects the output V0 of the latch 312 shown in FIG. 13. One of the output signals D0~D7, which have delay quantities that differ from one another, is output from the Y output of the selector 1206 by the density code signals D0~D2, which are the outputs C2, C1, C0 of the latch 312 at the time of the printing operation. It should be noted that the above-mentioned SET signal and SHOT signal may be generated by a CPU or the like, not shown.

Next, the process through which 600 dpi four-bit multivalued image data sent from the printer controller is converted into 300 dpi six-bit multivalued data by the addition operation, the PWM growth direction is decided and printing is carried out as described below.

Figure 21:
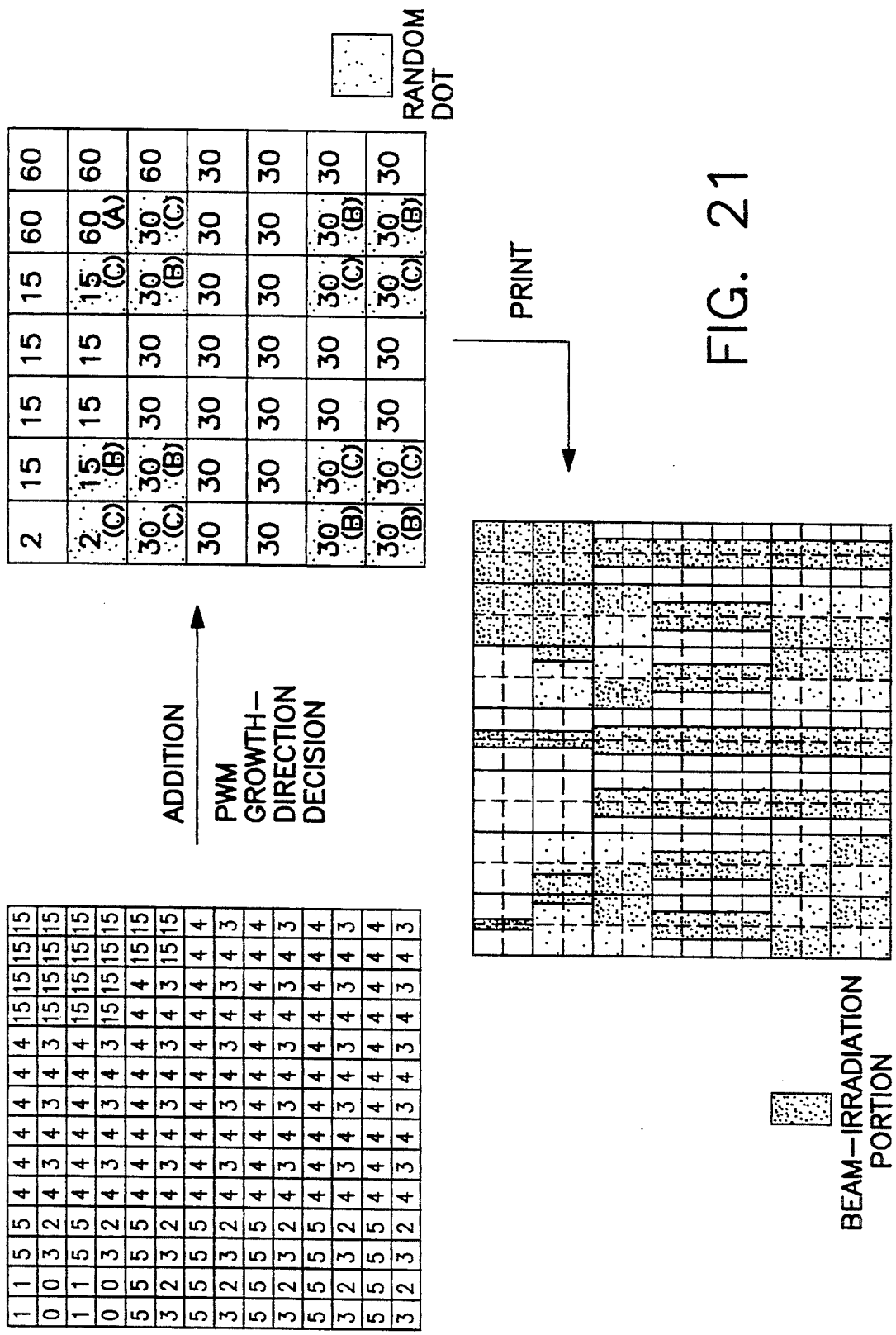
FIG. 21 is a diagram showing a printing process in the first embodiment of the invention.

As shown in FIG. 21, a pattern that is not the ordinary 300-line central growth appears at a certain fixed interval. At times this pattern is grown in 150 dpi units as a result of the joining of two pixels of 300 dpi, and at times this pattern is grown such that two pixels of 300 dpi are dispersed more than usual. Thus, the pattern changes in form in a random fashion.

In accordance with this embodiment, as described above, a portion in which a plurality of growth patterns are generated in the form of random numbers and a portion in which a plurality of growth patterns are generated in a regular fashion are combined, whereby a portion in which resolution declines in pseudo-fashion is generated randomly. As a result, it is possible to obtain a half-tone image in which printing density irregularity due to pitch error in the printer is reduced, and in which there is no conspicuous image density irregularity caused by an irregularity in the speed of the paper conveyance system and drive system of the photosensitive drum in the printer.

Modifications of the first embodiment will now be described.

<Modification 1>

The circuit A of the PWM growth-direction decision unit 208 is constructed, as set forth below, as a modification of the first embodiment. In this modification, the two-bit signal from the adder 204 is employed.

Figure 22:
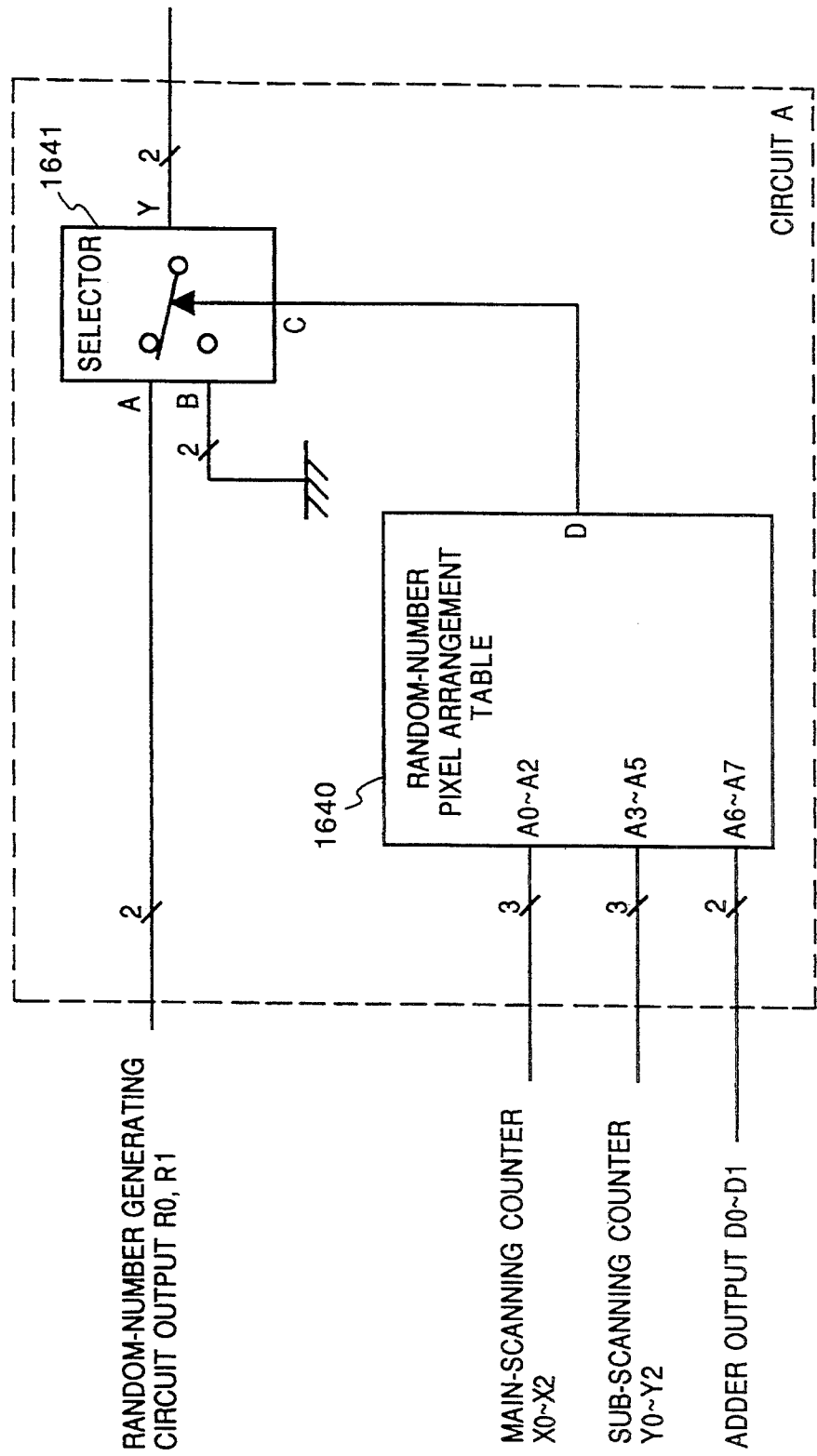

As shown in FIG. 22, X0~X2 in circuit A respectively denote the outputs Q0~Q2 from the main-scanning counter 206, and Y0~Y2 respectively denote the outputs Q0~Q2 from the sub-scanning counter 207. Further, D0, D1 denote the two higher order bits among the six bits of the multivalued image data. The two bits R0, R1 are the outputs from the random-number generating circuit 209.

Figure 23:
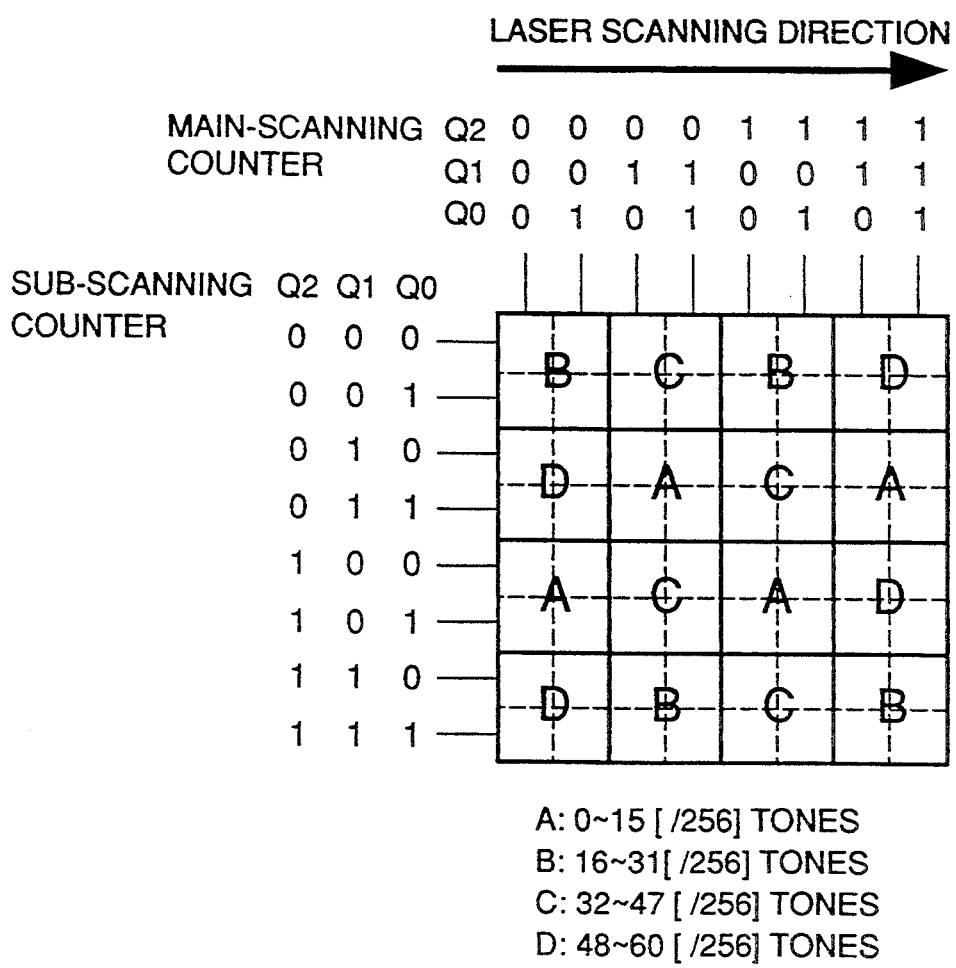
Figure 24A:
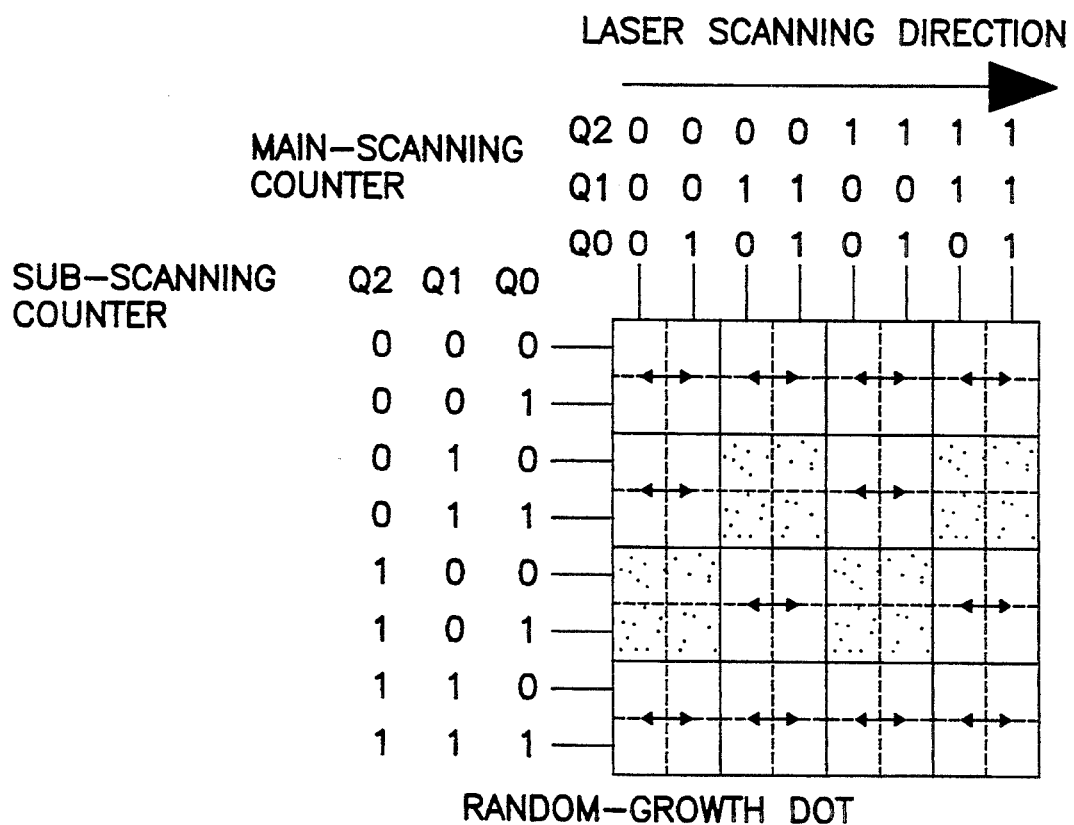
Figure 24B:
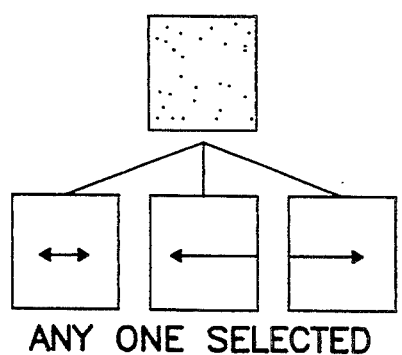
Figure 25:
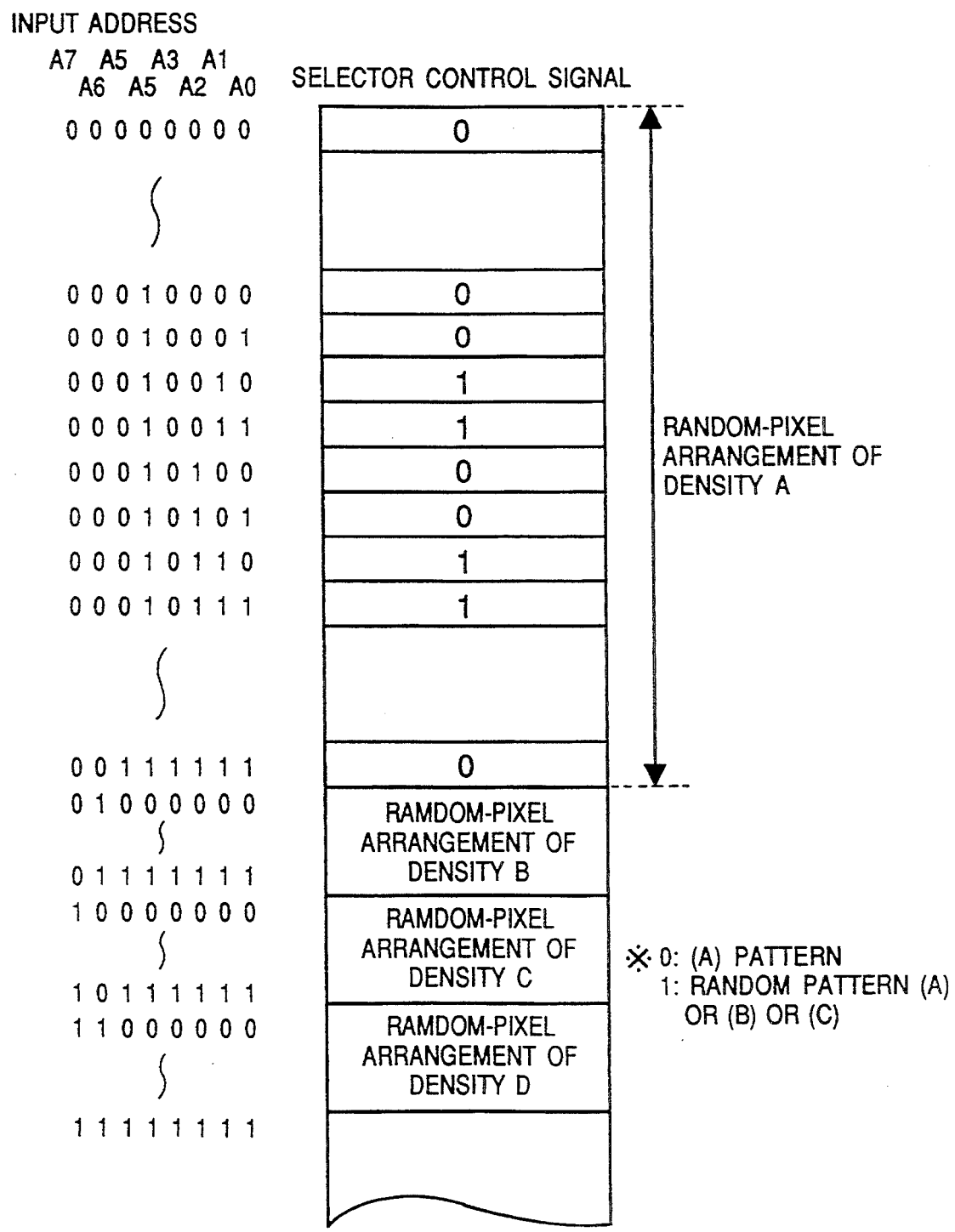

Here the influence of random numbers is reduced at low density and increased at high density. Thus, the influence of random numbers is decided by density. More specifically, as shown in FIG. 23, 16 dots, namely four dots in the main scanning direction × four dots in the sub-scanning direction, in which dots are in units of 300 dpi, are adopted as a single unit of a pixel aggregate. The density of a pixel to be printed (a pixel of interest) is monitored, and whether growth is to be random or fixed is decided, based upon a threshold-value table shown in FIG. 25, for each and every pixel in the pixel aggregate unit. The random pixel mentioned in FIG. 25 refers to a pixel selected and decided, from the patterns (A) through (C) in FIG. 11, based upon a random number every pixel of 300 dpi. This is performed in the same manner as in the embodiment described above. The PWM growth-direction decision unit transmits the pattern-select signal for realizing this.

The operation performed by the circuit A of FIG. 22 will be described in terms of 600 dpi units. The inputs to a random-number pixel arrangement table 1640 are the three-bit output from the main-scanning counter 206, the three-bit output from the sub-scanning counter 207 and the two higher order bits of the six bits from the adder 204, for a total of eight bits. A control signal applied to a selector 1641 is output by a look-up table, constituted by a ROM or the like, having the address map shown in FIG. 25.

The following results are obtained when the two higher order bits P5, P4 of the multivalued data of the pixel of interest are as indicated:
a) the adder output is 110000[B]~111100[B], i.e., 48~60 tones, if P5, P4 are (1,1);
b) the adder output is 100000[B]~101111[B], i.e., 32~47 tones, if P5, P4 are (1,0);
c) the adder output is 010000[B]~011111[B], i.e., 16~31 tones, if P5, P4 are (0,1); and
d) the adder output is 000000[B]~001111[B], i.e., 0~15 tones, if P5, P4 are (0,0).

The two bits R0, R1 from the random-generating circuit 209 and two bits (0,0) of the circuit ground level enter the selector 1641. A control signal is stored in advance in such a manner that the selector 1641 will deliver the output of the random-number generating circuit 209 if the pixel of interest is a random dot, and the two bits (0,0) of the circuit ground level in all other cases, in accordance with the threshold values shown in FIG. 23.

Since the data of pattern (A), namely the central-growth pattern shown in FIG. 11, has been stored in the bank area indicated by addresses A10, A9 when bits (A10, A9) of the density-pattern generating table 205 are (0,0), and the pattern (A) is selected.

Figure 26:
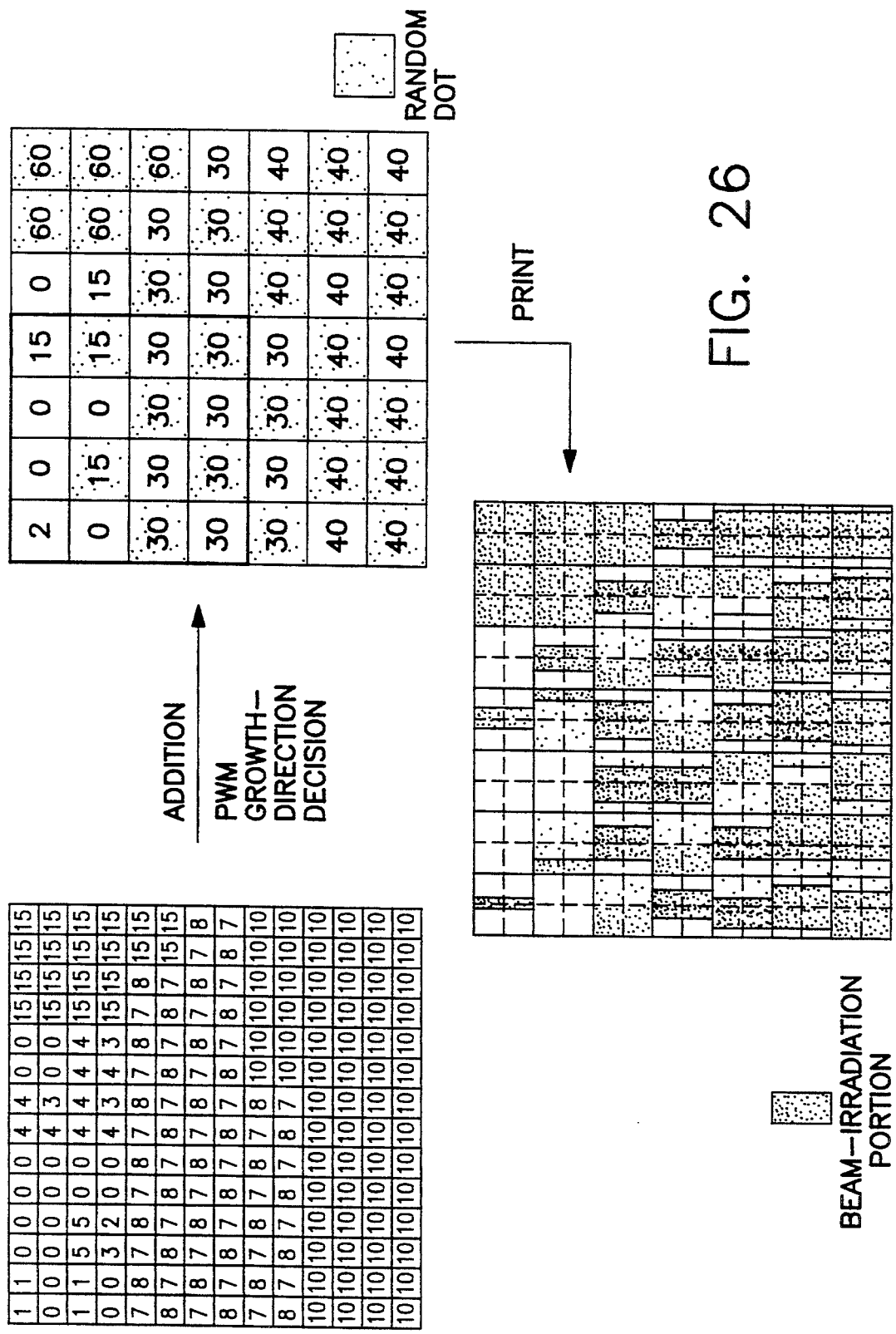

FIG. 26 illustrates the process through which 600 dpi four-bit multivalued data sent from the printer controller is converted into 300 dpi six-bit multivalued data by the addition operation, the PWM growth direction is decided by the above-described PWM growth-direction decision unit and printing is carried out. As will be evident from FIG. 26, a random dot that is not the ordinary 300-line central growth appears at a certain fixed interval. The ratio of the total that this dot occupies is small at low density and large at high density.

Thus, the higher the density (at high density, the influence of pitch irregularity is comparatively conspicuous but the characteristic coarse of an image caused by random numbers is not prominent), the greater the influence of random numbers. At low density, where the influence of pitch irregularity is comparatively inconspicuous but the characteristic coarseness of an image caused by random numbers is readily noticeable, the influence of random numbers diminishes. As a consequence, a half-tone image having high tonality can be obtained without conspicuous density irregularity of the image caused by an irregularity in the speed of the paper conveyance system and drive system of the photosensitive drum in the printer.

Further, since resolution actually is not reduced, a high-quality image can be obtained without sacrificing the sharpness of character images.

<Modification 2>

A second modification according to the first embodiment will now be described. With the exception of the PWM growth-direction decision unit, the printer in this modification has circuit components similar to those of the printer according to the first embodiment. The similar components need not be described again.

Figure 27:
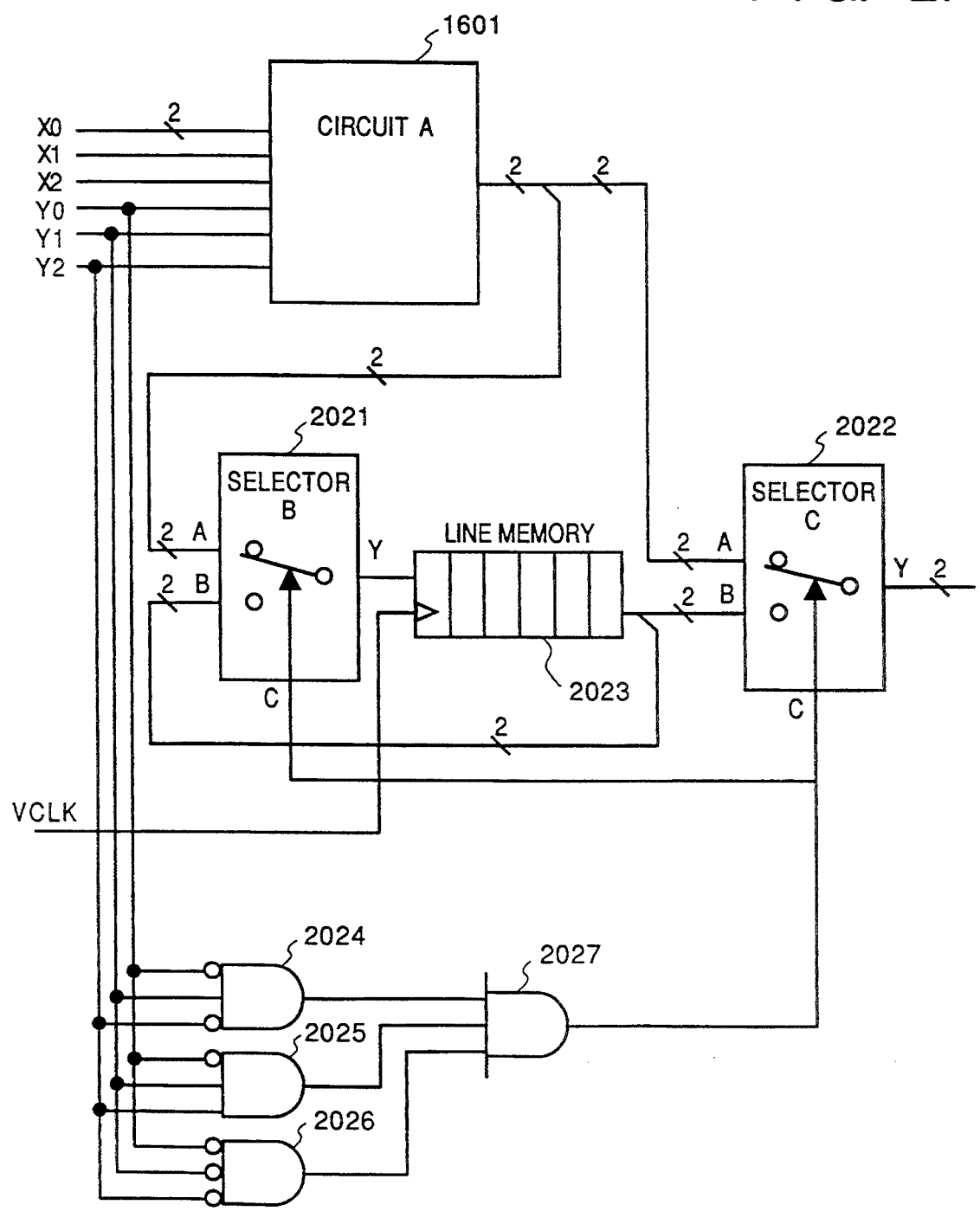

FIG. 27 is a block diagram showing the construction of the PWM growth-direction decision unit according to this modification. A random-growth portion is provided, as shown in FIG. 28, for every unit consisting of an aggregate of 16 dots, namely four dots in the main-scanning direction × four dots in the sub-scanning direction, where the dots are in units of 300 dpi. It is so arranged that dots LU and LL in 300 dpi units, as well as dots RU, RL in 300 dpi units, become identical growth patterns.

The PWM growth-direction decision unit shown in FIG. 27 includes a selector (B) 2021, a selector (C) 2022, and a line memory 2023. Numerals 2024~2027 denote AND gates. The circuit A 1601 is the same as that in the first embodiment.

In this modification, growth is in units of 300 dpi, and it is so arranged that dots LU and LL in 300 dpi units, as well as dots RU, RL in 300 dpi units, become identical growth patterns. Accordingly, at 600 dpi,
(0,0,0) and (0,0,1),
(0,1,0) and (0,1,0) (0,1,1) (1,0,0) (1,0,1),
(1,1,0) and (1,1,1)
must be in the same growth direction in the sub-scanning direction.

The output from the circuit A, which produces the pattern-select signal in units of 600 dpi, as described above, here is sent to the selectors 2021 and 2022. The selector 2021 controls updating of the line memory by the select signal. The selector 2022 performs control in such a manner that the final output is made the output of the circuit A, namely a pattern generated anew on this line, or the output of the line memory, namely a pattern identical with the previous pattern. The select signal to the selector 2021 is the same as that to the selector 2022. This signal becomes logical "1" in the following cases owing to the action of the AND gates 2024~2027:
(Y2,Y1,Y0)=(0,0,0)
(Y2,Y1,Y0)=(0,1,0)
(Y2,Y1,Y0)=(1,1,0)

FIG. 28 shows an actual example of a PWM growth pattern according to this modification.

Figure 29:
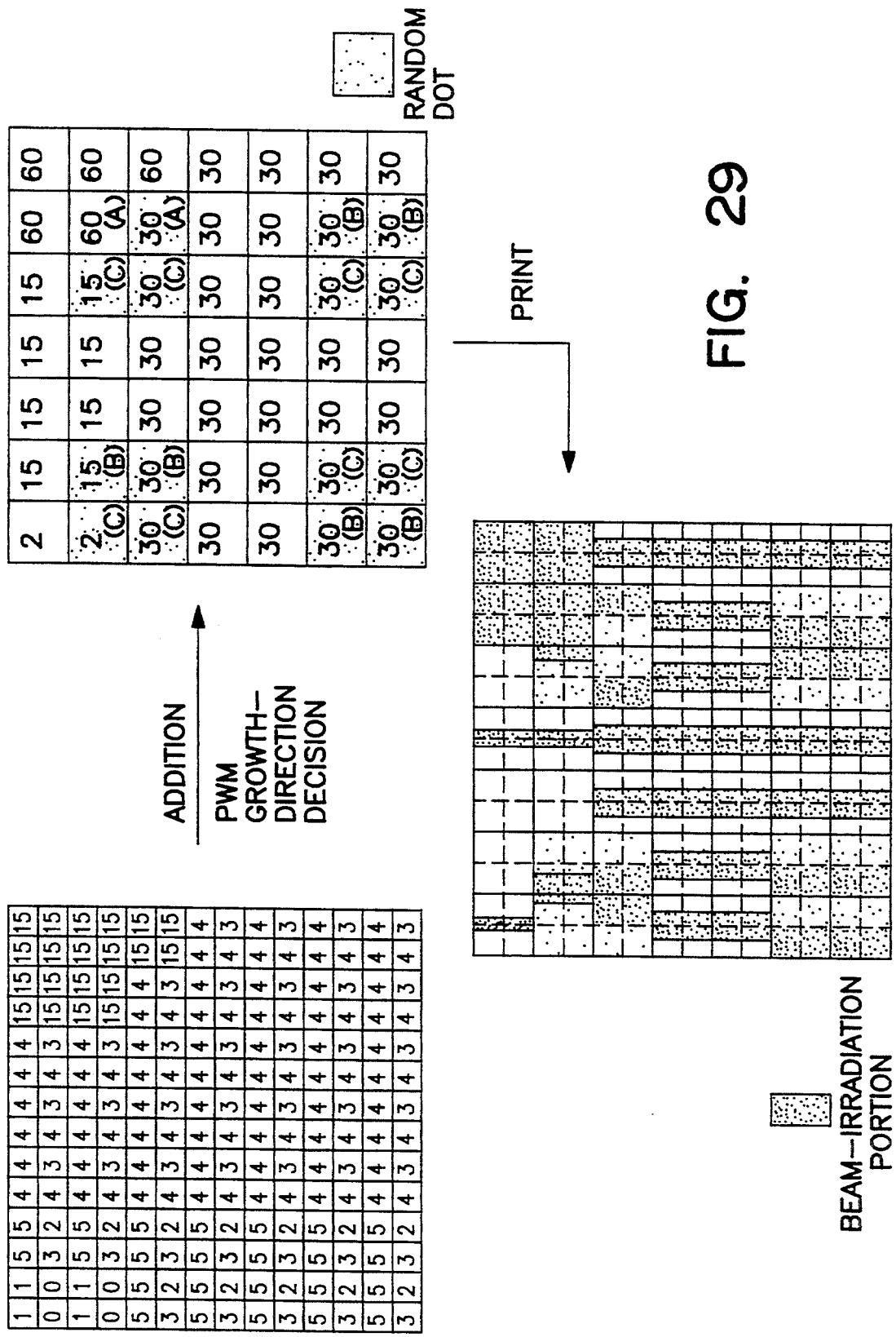
FIG. 29 is a diagram for describing a second modification of the first embodiment.

FIG. 29 illustrates the process through which 600 dpi four-bit multivalued image data sent from the printer controller is converted into 300 dpi six-bit multivalued data by the addition operation, the PWM growth direction is decided and printing is carried out. As will be evident from FIG. 29, a pattern that is not the ordinary 300-line central growth appears at a certain fixed interval. At times this pattern is grown in 150 dpi units as a result of the joining of two pixels of 300 dpi, and at times this pattern is grown such has two pixels of 300 dpi are dispersed more than usual. Thus, the pattern changes in form in random fashion.

In accordance with this modification, as described above, the random-growth portion has an identical growth direction on two lines of 300 dpi units at all times, and therefore dots always connected are obtained with regard to the sub-scanning direction. As a result, it is possible to obtain a half-tone image, of improved stability and higher tonality, in which there is no conspicuous image density irregularity caused by an irregularity in the speed of the paper conveyance system and drive system of the photosensitive drum in the printer.

<Modification 3>

A third modification of the first embodiment will be described next. With the exception of the PWM growth-direction decision unit, the printer in this modification has circuit components similar to those of the printer according to the first embodiment. With regard to the PWM growth-direction decision unit, the circuit components, except for the circuit A, are similar to those of the PWM growth-direction decision unit in the second modification. Similar components need not be described again.

Figure 30A:
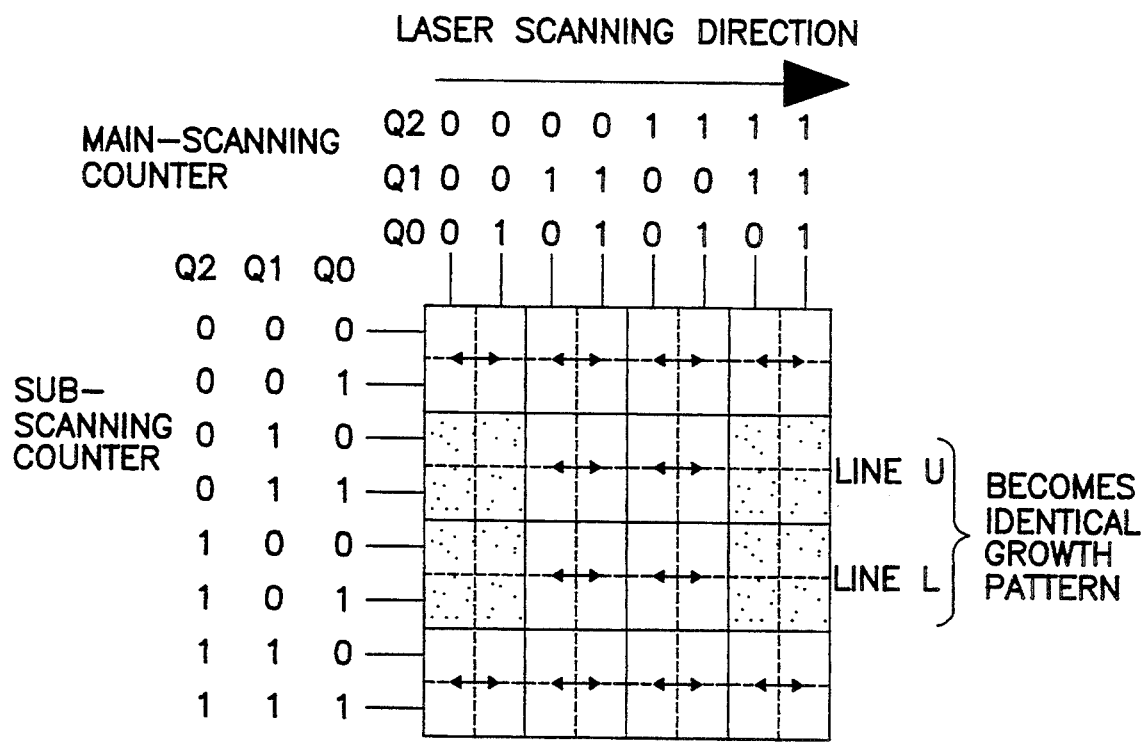
FIGS. 30 through 32 are diagrams for describing a third modification of the first embodiment.
Figure 30B:
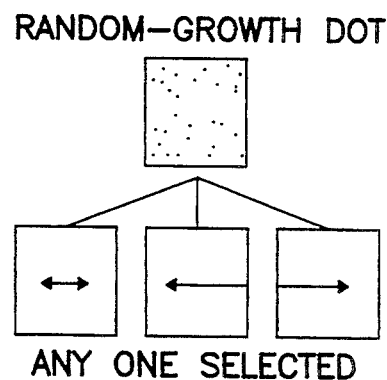

A random-growth portion is provided, as shown in FIG. 30, for every unit consisting of an aggregate of 16 dots, namely four dots in the main-scanning direction×four dots in the sub-scanning direction, where the dots are in units of 300 dpi. It is so arranged that line U and line D in 300 dpi units become identical growth patterns. The dots of the random-growth dot portions are defined as follows in 600 dpi units:

(Y2,Y1,Y0)=(0,1,0)
(Y2,Y1,Y0)=(0,1,1)
(Y2,Y1,Y0)=(1,0,0)
(Y2,Y1,Y0)=(1,0,1)

Figure 31:
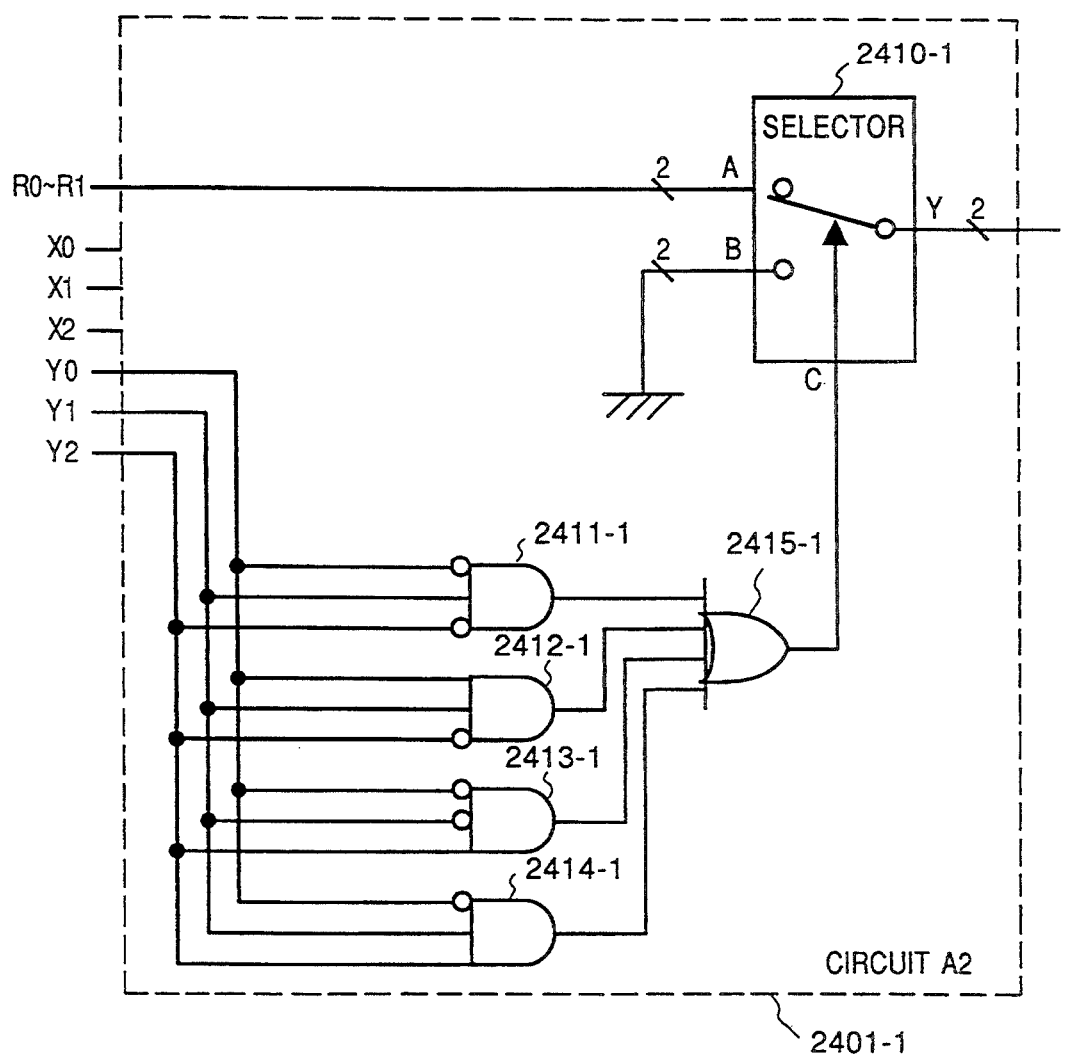

FIG. 31 is a block diagram illustrating the construction of a circuit A2 in the PWM growth-direction decision unit according to this modification. The circuit A2 performs the following operation in units of 600 dpi: Specifically, when the relationships shown above are established by AND gates 2411-1~2414-1 and OR gate 2415-1, the select signal to selector 2410-1 becomes logical "1" and the two bits from the random-number generating circuit 209 are sent intact as the pattern-select signal. When the above-mentioned relationships do not hold, the selector transmits the two bits (0,0) of the circuit ground level.

As in the first embodiment, the data of pattern (A), namely the central-growth pattern shown in FIG. 11, has been stored in the bank area indicated by addresses A10, A9 when bits (A10, A9) of the density-pattern generating table 205 are (0,0), and the pattern (A) is selected.

In this modification, growth is in units of 300 dpi, and it is so arranged that lines U and L in 300 dpi units become identical growth patterns. Accordingly, at 600 dpi, (0,0,0) and (0,0,1),
(0,1,0) and (0,1,0) (0,1,1) (1,0,0) (1,0,1),
(1,1,0) and (1,1,1)

must be in the same growth direction in the sub-scanning direction. Accordingly, the PWM growth-direction decision unit (not shown) controls the pattern-select signal from the circuit A2 so as to realize this. This operation is the same as in the PWM growth-direction decision unit of the second modification.

Figure 32:
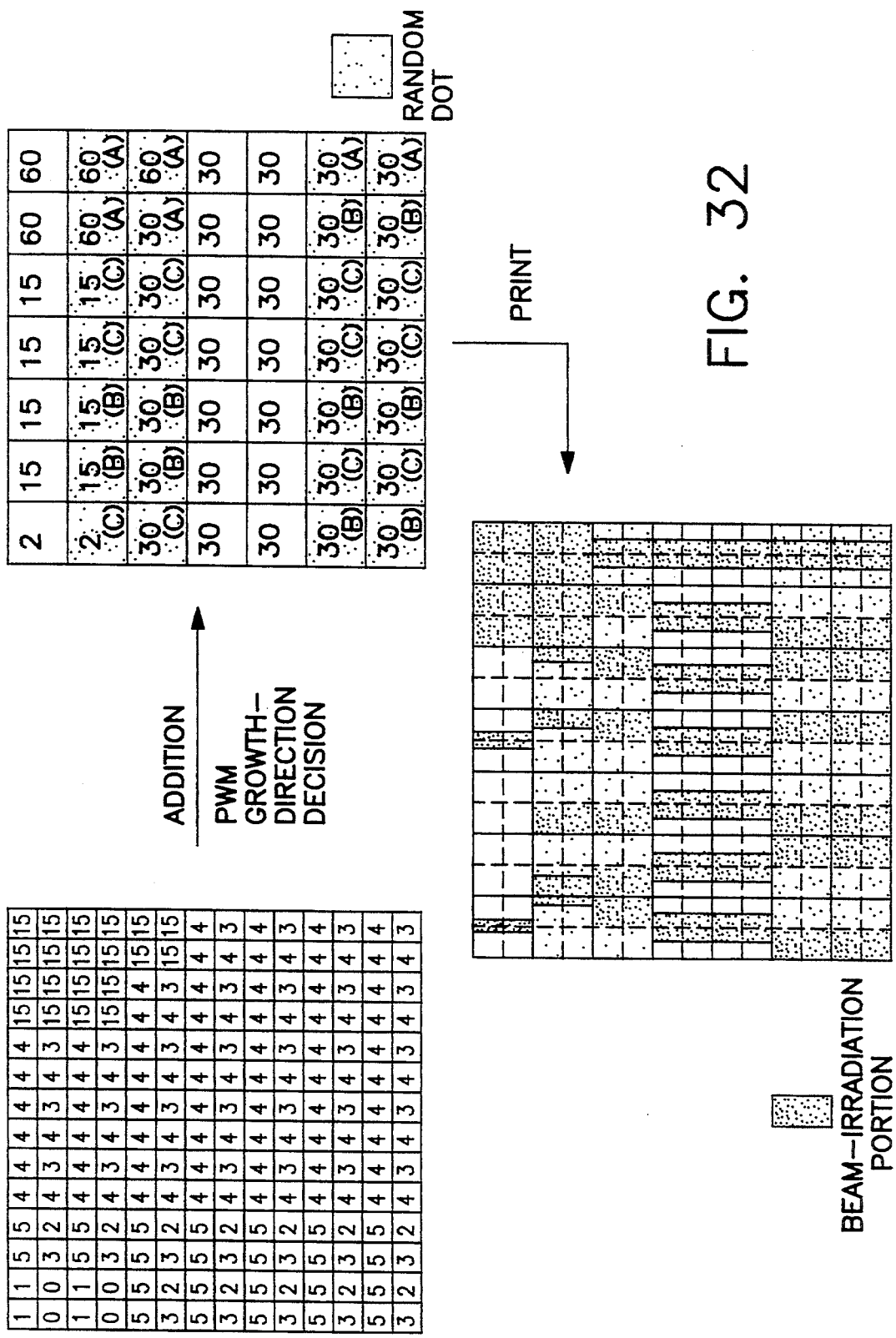

FIG. 32 illustrates the process through which 600 dpi four-bit multivalued image data sent from the printer controller is converted into 300 dpi six-bit multivalued data by the addition operation, the PWM growth direction is decided and printing is carried out. As will be evident from FIG. 32, two lines of a pattern that is not the ordinary 300-line central growth appear every two lines in units of 300 dpi. At times this pattern is grown in 150 dpi units as a result of the joining of two pixels of 300 dpi, and at times this pattern is grown such that two pixels of 300 dpi are dispersed more than usual. Thus, the pattern changes in form in a random fashion.

In accordance with this modification also, the random-growth portion has an identical growth direction on two lines of 300 dpi units at all times, and therefore dots always connected are obtained with regard to the sub-scanning direction. As a result, it is possible to obtain a half-tone image, of improved stability and higher tonality, in which there is no conspicuous image density irregularity caused by an irregularity in the speed of the paper conveyance system and drive system of the photosensitive drum in the printer.

[Second Embodiment]

A second embodiment of the present invention will now be described.

Figure 33:
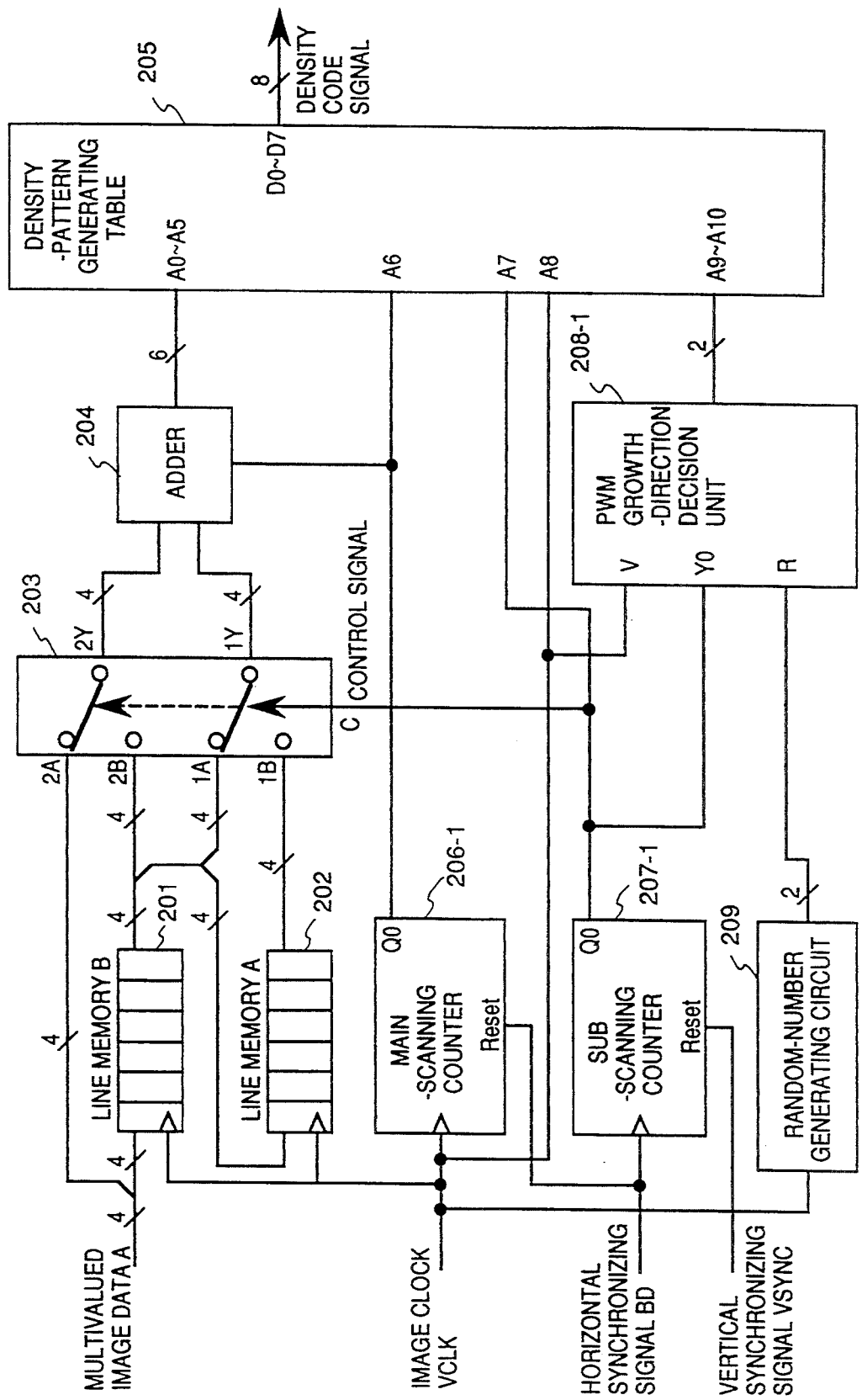
FIGS. 33 through 36 are diagrams for describing a second embodiment of the present invention.

FIG. 33 is a block diagram showing the configuration of a data generating unit in a laser beam printer according to a second embodiment of the present invention. The overall configuration of the printer according to this embodiment is the same as that of the printer in the first embodiment. Further, in the data generating unit shown in FIG. 33, components identical with those in the data generating unit of the first embodiment shown in FIG. 2 are designated by like reference numerals and need not be described again.

In FIG. 33, the inputs to a main-scanning counter 206-1 and sub-scanning counter 207-1 are the image clock and the horizontal synchronizing signal, and the outputs thereof are the Q0 signals, which are the result of frequency division by two. The inputs to a PWM growth-direction decision unit 208-1 are the image clock VCLK, one bit from the sub-scanning counter 207-1 and two dots from the random-number generating circuit 209.

Figure 34:
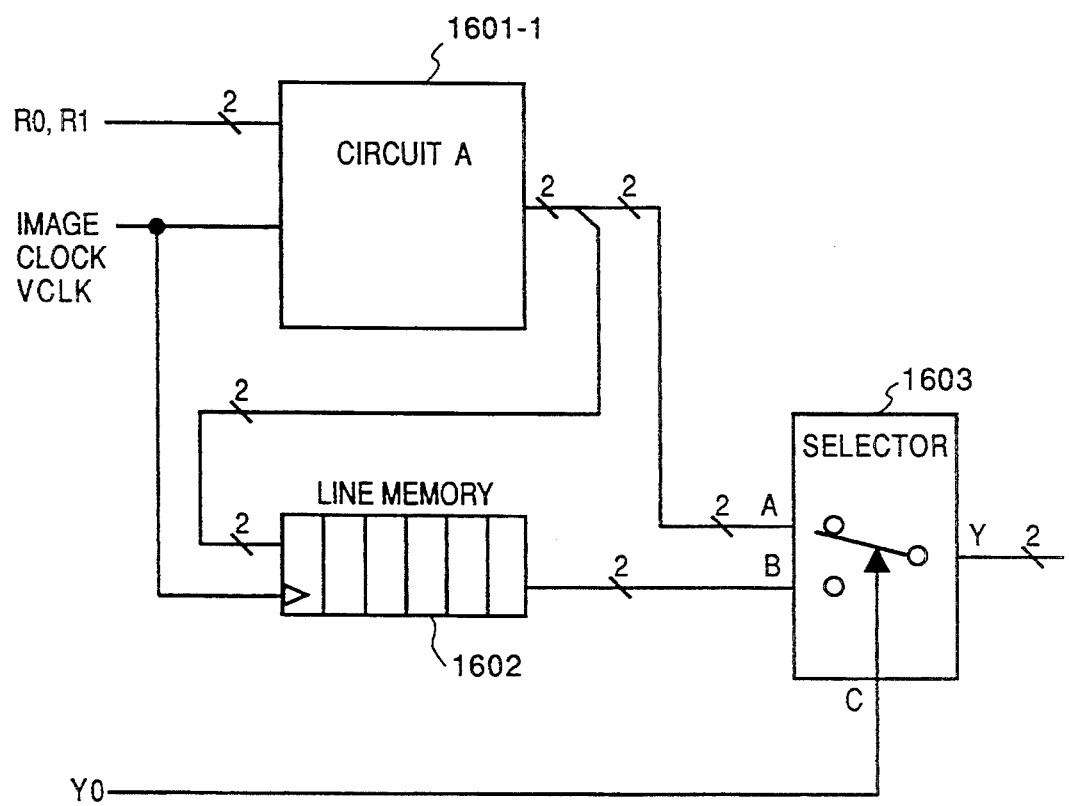
Figure 35:
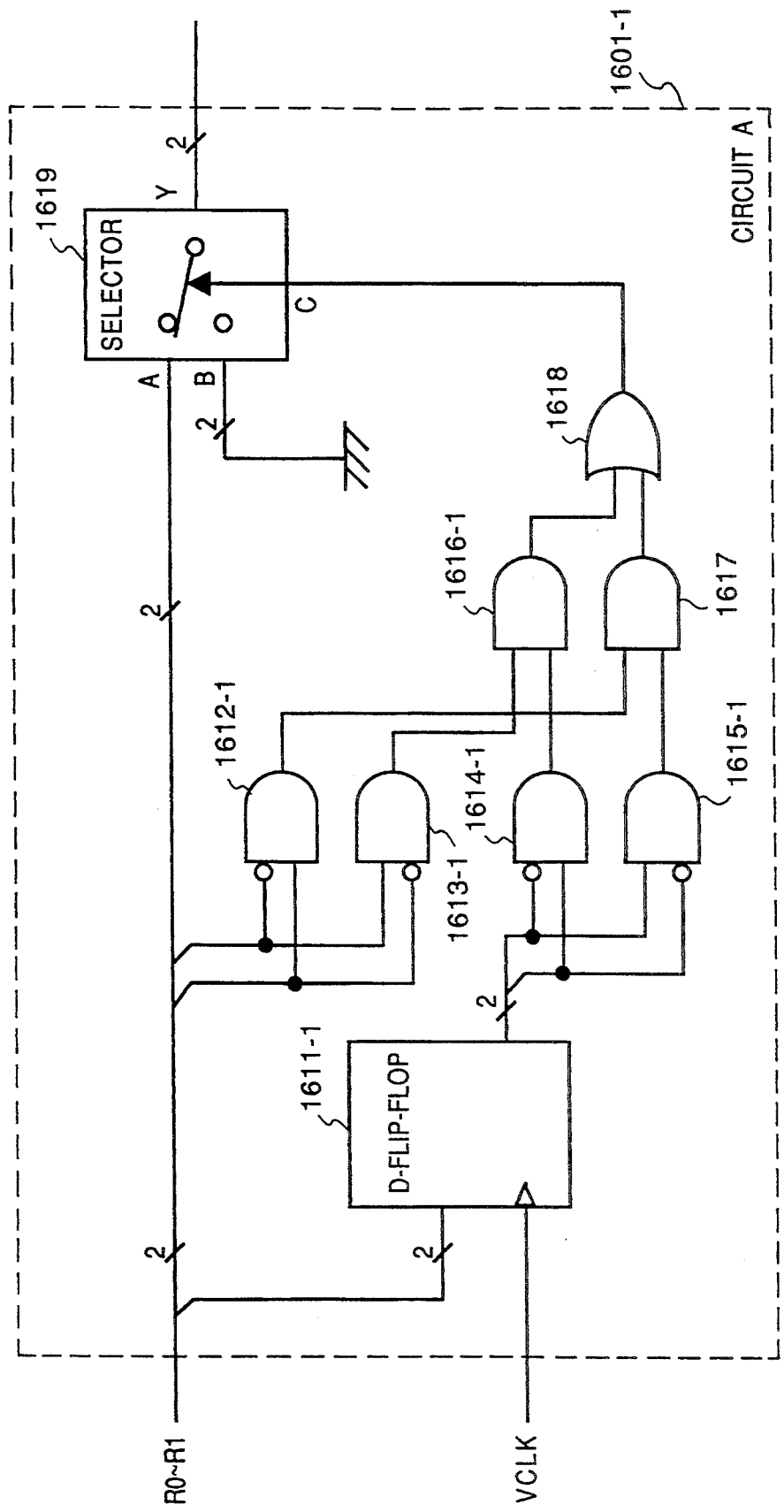

FIG. 34 is a block diagram showing the configuration of the PWM growth-direction decision unit in this embodiment, and FIG. 35 is a block diagram showing the configuration of a circuit A within the PWM growth-direction decision unit. Circuit components in these Figures identical with those of the PWM growth-direction decision unit and circuit A of the first embodiment (see FIGS. 8 and 9) are designated by like reference numerals.

Shown in FIG. 34 are a line memory 1602, a selector 1603 and a circuit (A) 1601-1. Further, Y0 is the Q0 output of the sub-scanning counter 207-1, and the two bits R0, R1 are the outputs of the random-number generating circuit 209.

In the printer according to this embodiment, growth direction is also selected and decided every pixel of 300 dpi from patterns similar to those shown in FIG. 11. At this time the pixel to the left of the pixel to be printed (namely the pixel of interest) is monitored, and it is so arranged that mutually adjacent pixels will not contact

[in the order of pattern (C) and pattern (B)]. In order to realize this, the pattern select signal is transmitted by the PWM growth-direction decision unit 208-1.

The circuit A (1601-1) performs the following operation in units of 600 dpi:

Specifically, the output Q (the data indicative of the pixel to the left of the pixel of interest) from a D-type flip-flop 1611-1 and the output R from the random-number generating circuit are monitored by AND gates 1612-1~1617 and OR gate 1618. When the order of the (C) pattern and (B) pattern does not hold, the select signal to a selector 1619 becomes logical "1" and the two bits from the random-number generating circuit 209 are transmitted intact as the pattern-select signal. When the order does hold, the selector 1619 selects the terminal B and transmits the two bits (0,0) of the circuit ground level.

Since the data of pattern (A), namely the central-growth pattern shown in FIG. 11, has been stored in the bank area indicated by addresses A10, A9 when bits (A10, A9) of the density-pattern generating table 205 are (0,0), and the pattern (A) is selected. In other words, when the order of the (C) pattern and (B) pattern is achieved, the central growth (A) pattern is forcibly adopted no matter what pattern is indicated by the pixel of interest.

Figure 36:
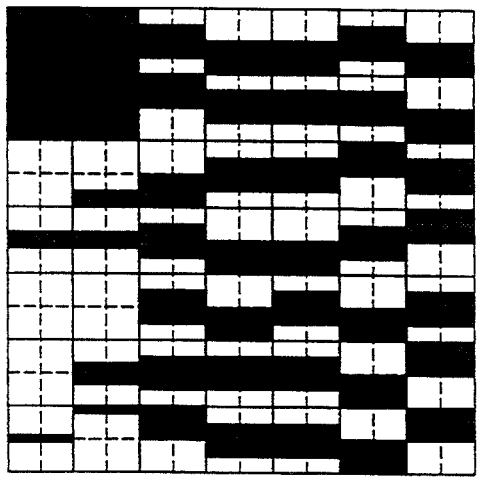

Since growth is in units of 300 dpi even in the printer according to this embodiment, the odd-numbered lines in 600 dpi units must have a growth direction that is the same as that of the even-numbered lines. Accordingly, as shown in FIG. 34, the output of the circuit A (1601-1) is transmitted simultaneously to the selector 1603 and line memory 1602 and the outputs of the circuit A and line memory are sent to the selector 1603. The selector 1603 selects the output of the circuit A when Y0 (the signal whose frequency is half that of the horizontal synchronizing signal) is logical "1" and the output of the line memory 1602 when Y0 is logical "0". As a result, the final output of the PWM growth-direction decision unit 208-1 is growth in units of 300 dpi and a growth pattern of the kind shown in FIG. 36 is realized overall.

In accordance with this embodiment, as described above, the construction of the data generating unit is simplified and, moreover, a plurality of density growth patterns are generated randomly so that printing is performed in such a manner that mutually adjacent pixels do not become joined, as a result of which linear growth is obtained in which the growth direction of PWM fluctuates in a random manner. This makes it possible to obtain a half-tone image without conspicuous density irregularity.

Further, since processing that does not actually reduce resolution is executed, a high-quality image can be obtained without sacrificing the sharpness of character images.

<Modification 1>

A first modification of the second embodiment will now be described.

Figure 37:
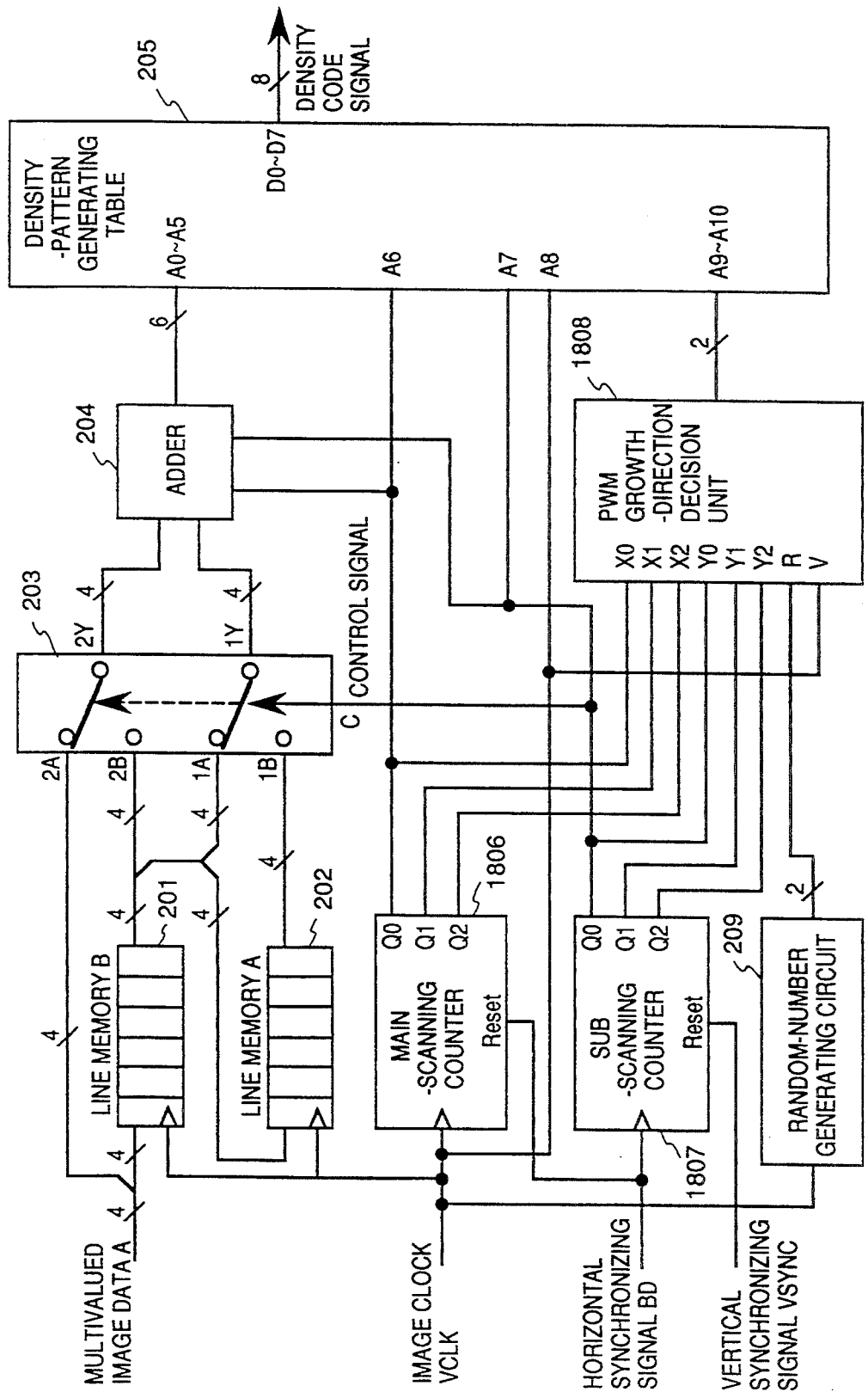

FIG. 37 illustrates a modification of the data generating unit in the printer (the construction of which is the same as that in the second embodiment) according to this modification. Components identical with those in the data generating unit shown in FIG. 33 are designated by like reference numerals and need not be described again.

The inputs to a main-scanning counter 1806 and sub-scanning counter 1807 are the image clock and the horizontal synchronizing signal, and the outputs of each counter are Q0, Q1, Q2, which are signals obtained by frequency division by two, four and eight, respectively. The inputs to a PWM growth-direction decision unit 1808 are the image clock VCLK, the three bits from the main-scanning counter 1806, the three bits from the sub-scanning counter 1807 and two bits from the random-number generating circuit 209.

Figure 38:
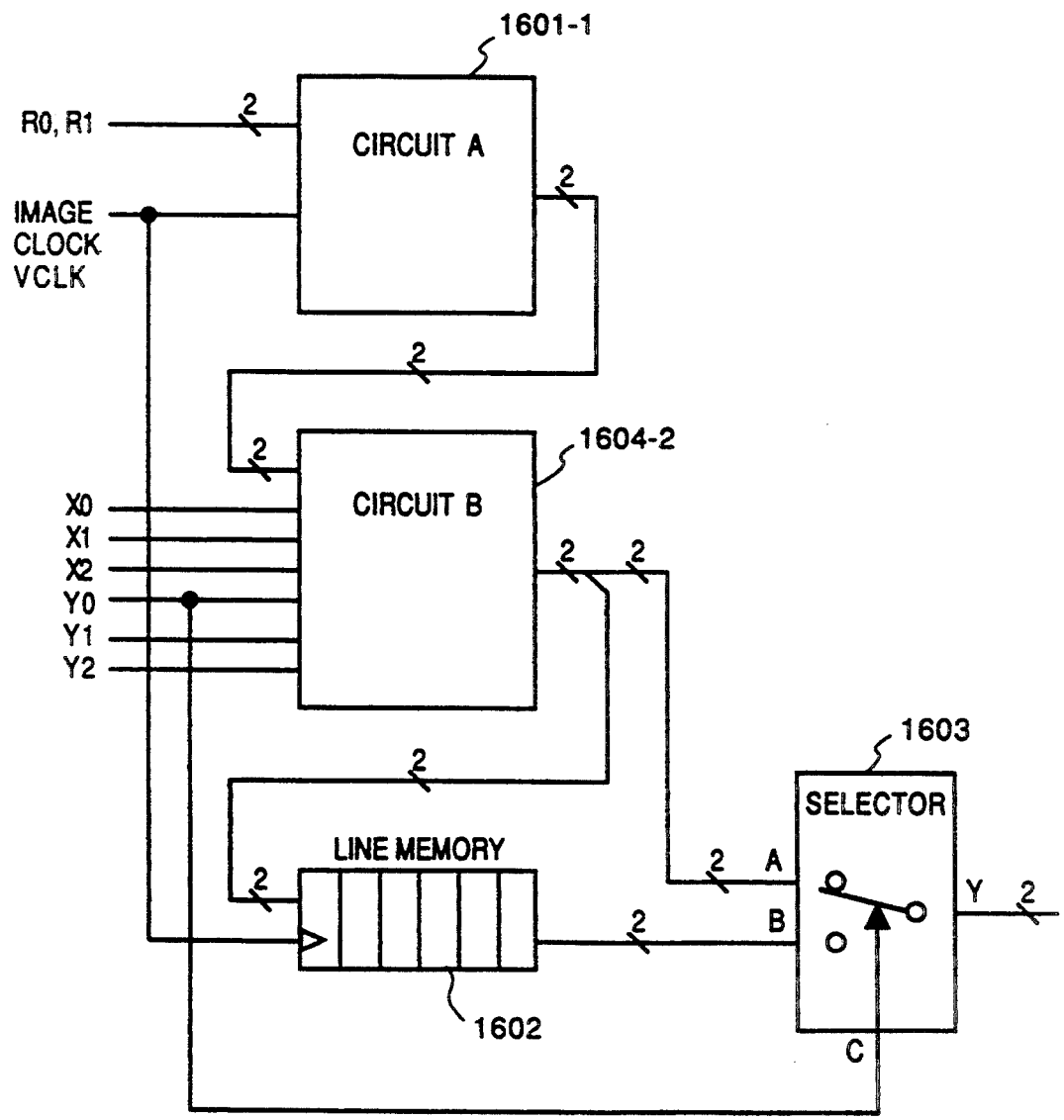
Figure 39:
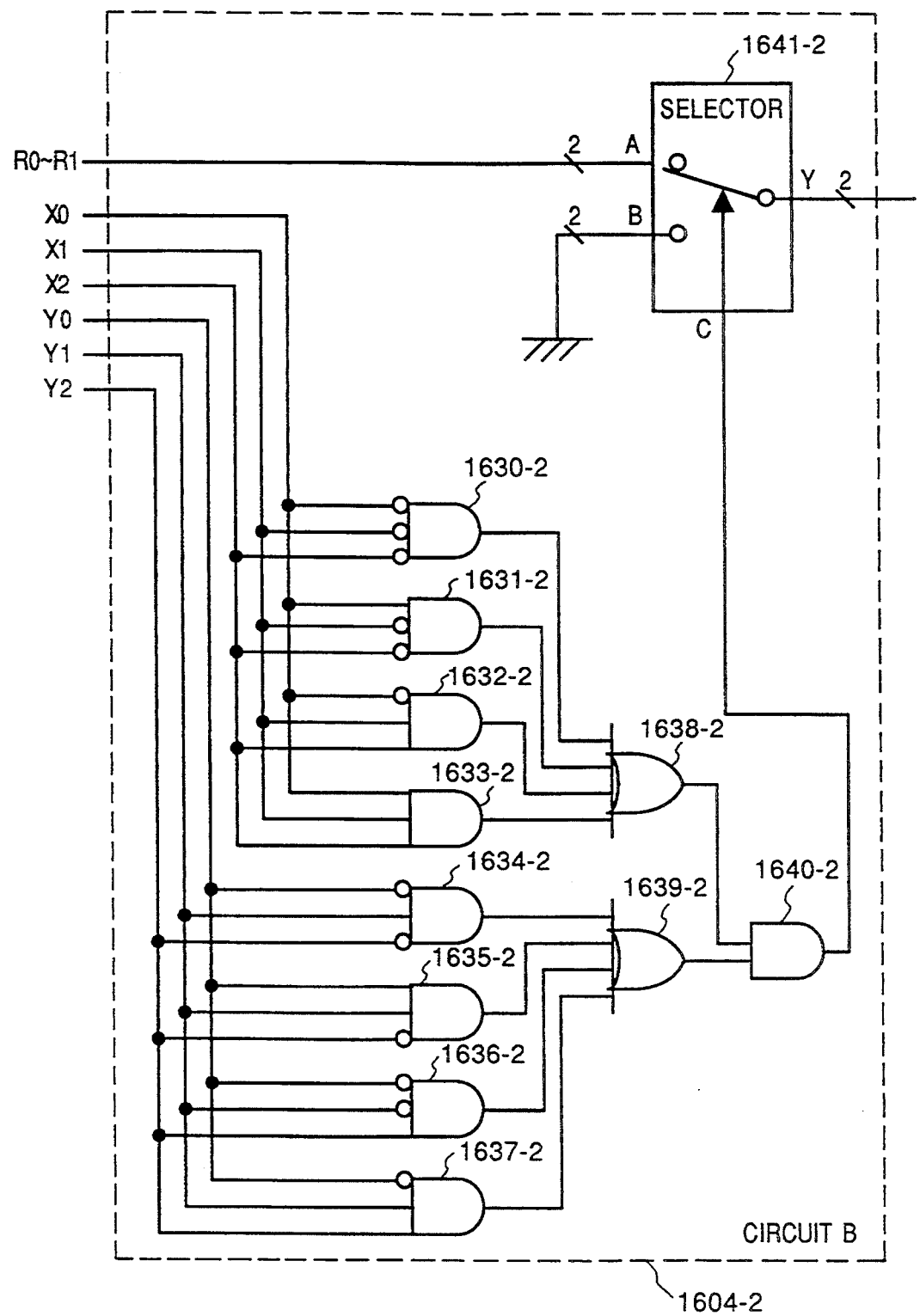

FIG. 38 is a block diagram illustrating the internal configuration of the PWM growth-direction decision unit 1808 of FIG. 37, and FIG. 39 is a block diagram showing the internal configuration of a circuit B 1604-2 in FIG. 38.

As shown in FIG. 39, X0~X2 respectively denote the outputs Q0~Q2 from the main-scanning counter 1806, and Y0~Y2 respectively denote the outputs Q0~Q2 from the sub-scanning counter 1807. The two bits R0, R1 are the outputs from the random-number generating circuit 209. The circuit B is provided with a random-growth portion of the kind shown in FIG. 40, in which a total of 16 dots, namely four dots in the main-scanning direction × four dots in the sub-scanning direction, serve as one unit, where the dots are in units of 300 dpi.

The pattern-select signal from the PWM growth-direction decision unit 1808 operates under conditions the same as those of the PWM growth-direction decision unit in the first embodiment. The circuit B performs the operation, described below, in units of 600 dpi.

When relationships similar to those in the first embodiment are established by AND gates 1630-2~1637-2, OR gates 1638-2, 1639-2 and AND gate 1640-2, the select signal applied to a selector 1641-2 becomes logical "1" and two bits from the random-number generating circuit 209 are transmitted intact as the pattern-select signal. When the above-mentioned relationships do not hold, the selector 1641-2 selects the B side and two bits (0,0) at the circuit ground level are transmitted. Since the data of pattern (A), namely the central-growth pattern shown in FIG. 11, has been stored in the bank area indicated by addresses A10, A9 when bits (A10, A9) of the density-pattern generating table 205 are (0,0), and the pattern (A) is selected.

In the printer of this modification, growth is in units of 300 dpi and therefore the odd-numbered lines in 600 dpi units must have a growth direction that is the same as that of the even-numbered lines. Accordingly, as shown in FIG. 38, the output of the circuit B 1604-2 is transmitted simultaneously to the selector 1603 and line memory 1602 and the outputs of the circuit B and line memory 1602 are sent to the selector 1603. The selector 1603 selects the output of the circuit B when Y0 (the signal whose frequency is half that of the horizontal synchronizing signal) is logical "1" and the output of the line memory 1602 when Y0 is logical "0". As a result, the final output of the PWM growth-direction decision unit 1808 is growth in units of 300 dpi and a growth pattern of the kind shown in FIG. 12 is realized overall.

Figure 41:
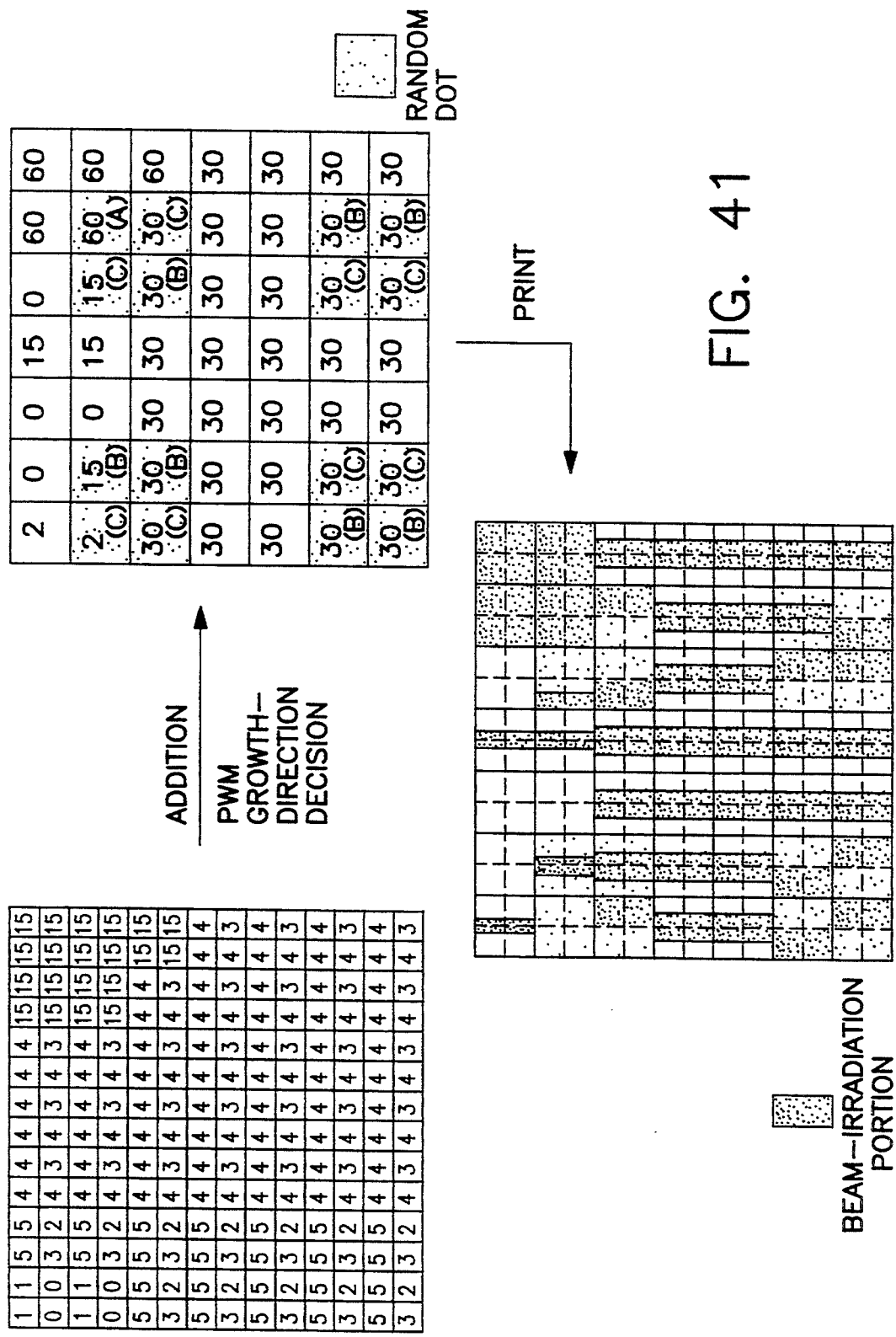

FIG. 41 illustrates the process through which 600 dpi four-bit multivalued image data sent from the printer controller is converted into 300 dpi six-bit multivalued data by the addition operation, the PWM growth direction is decided and printing is carried out. As will be evident from FIG. 41, a random dot that is not the ordinary 300-line central growth appears at a certain fixed interval. Though this pattern is similar to that of the second embodiment, the percentage of the central-growth pattern [pattern (A)] is higher. As a result, the image coarseness that is peculiar to random growth is reduced and it is possible to obtain a half-tone image, of improved stability and higher tonality, in which there is no conspicuous image density irregularity caused by an irregularity in the speed of the paper conveyance system and drive system of the photosensitive drum in the printer.

<Modification 2>

A second modification of the second embodiment will now be described.

Figure 42:
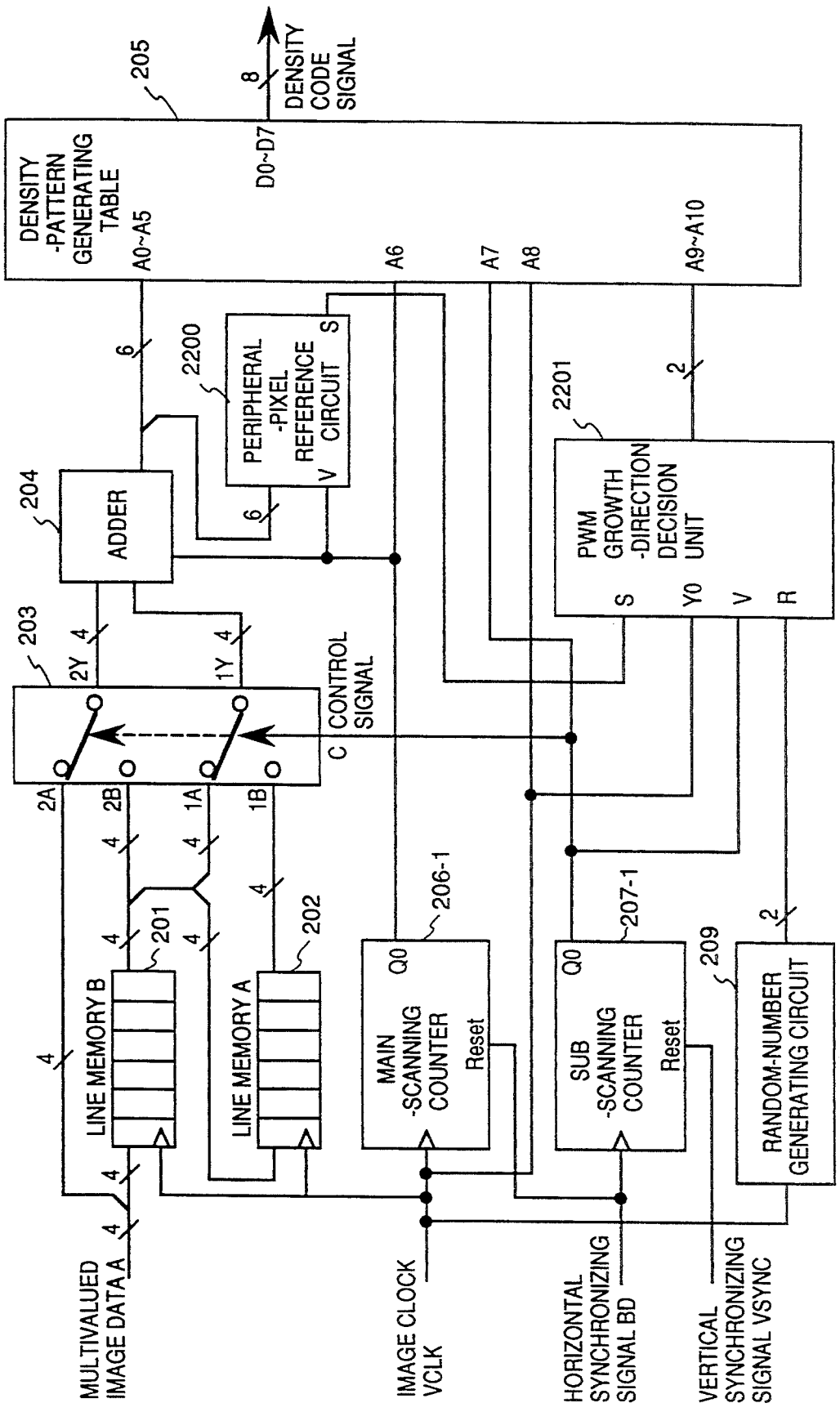

This modification represents a change in the configuration of the data generating unit 104 in the printer of the second embodiment. FIG. 42 is a block diagram showing the data generating unit according to this modification. Components identical with those in the data generating unit of the second embodiment shown in FIG. 33 are designated by like reference numerals.

The arrangement of FIG. 42 includes a peripheral-pixel reference circuit 2200 whose inputs are the image clock VCLK and six bits of the multivalued image data from the adder 204. The density of the pixel of interest shown in FIG. 46 and the densities of the peripheral pixels (eight pixels) of the pixel of interest are compared. When a density difference exceeds a certain fixed value, the reference circuit 2000 sends its output S (one bit) to logical "1" and transmits this signal to a PWM growth-direction decision unit 2201. When the output signal S is "1", the PWM growth-direction decision unit 2201 adopts the pattern (A) of FIG. 11 in the first embodiment as the signal that designates the PWM growth direction.

The inputs to the PWM growth-direction decision unit 2201 are the image clock VCLK, one bit from a sub-scanning counter 207-1, two bits from the random-number generating circuit 209 and one bit from the peripheral-pixel reference circuit 2200, as shown in FIG. 42. The decision unit 2201 outputs the two-bit pattern-select signal for selecting one pattern from the three patterns (A) through (C) shown in FIG. 11.

Figure 43:
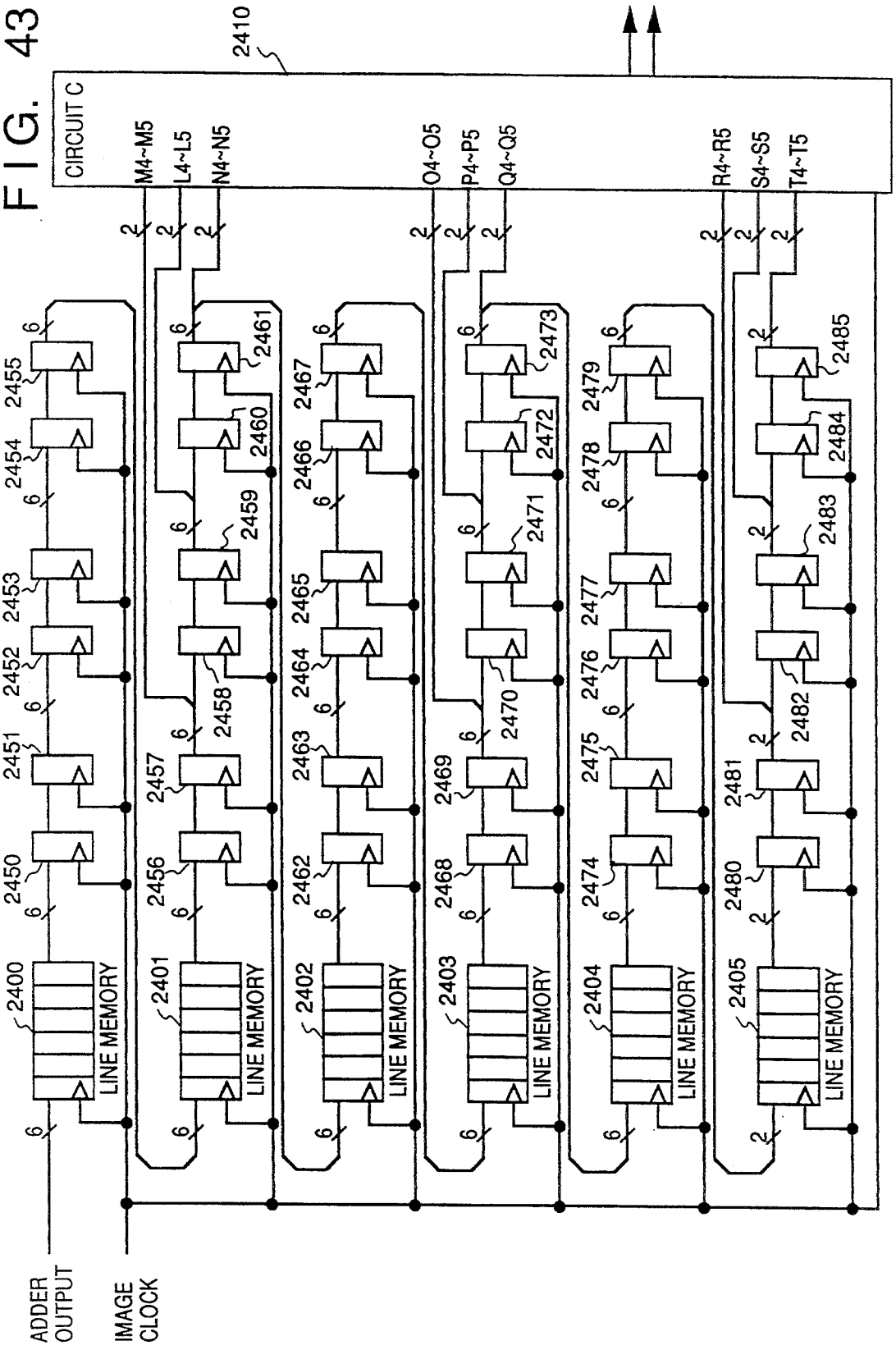
Figure 45:
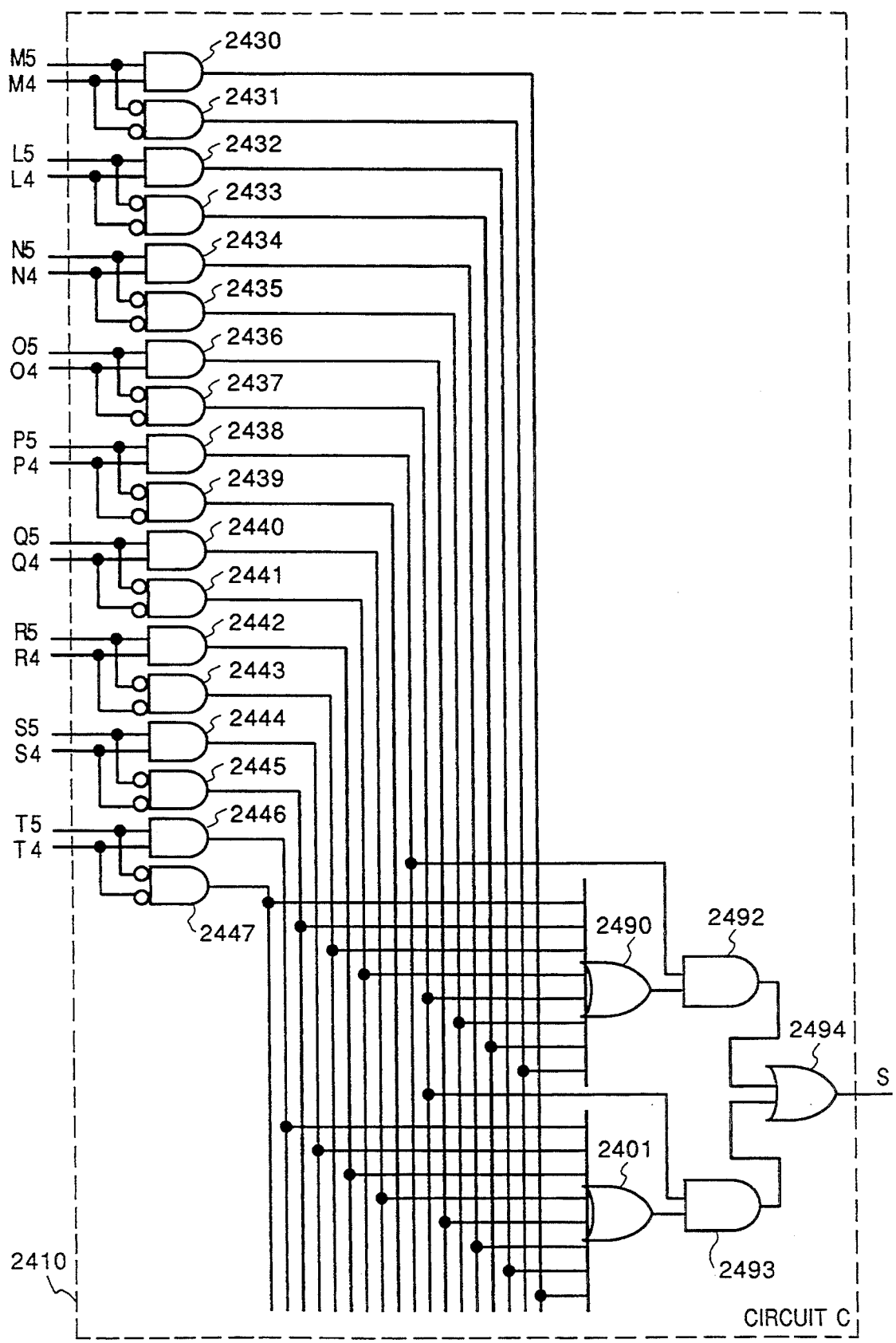

FIG. 43 is a block diagram showing the circuit configuration of the peripheral-pixel reference circuit. As shown in FIG. 43, this circuit includes line memories 2400~2405, latches 2450~2485 and a circuit C2410, the details of which are illustrated in FIG. 45. In the peripheral-pixel reference circuit, the six-bit signal from the adder 204 is stored successively in the line memories. When a total of six lines of data are stored, the two higher order bits of a total of nine pixels comprising the pixel of interest and the pixels surrounding it are taken from this stored data and transmitted to the circuit C2410. With regard to the six-bit multivalued image signal from the adder, the data is transmitted in dot units of 600 dpi, as shown in FIG. 7 of the first embodiment, but the same data is transmitted in units of two dots.

Further, data is transmitted in units of one line at 600 dpi in the sub-scanning direction, but the same data is transmitted in units of two lines. In accordance with this circuit arrangement, eight pixels peripheral to the pixel of interest shown in FIG. 46 are capable of being referred to in the circuit C. Reference is made to the two higher order bits of the multivalued data of each pixel and the features of the density of the pixel of interest are detected.

For example, the following results are obtained when the two higher order bits PS, P4 of the multivalued data of the pixel of interest are as indicated:

a) the adder output is 110000[B]~11110[B], i.e., 48~60 tones, if PS, P4 are (1,1);
b) the adder output is 100000[B]~101111[B], i.e., 32~47 tones, if P5, P4 are (1,0);
c) the adder output is 010000[B]~011111[B], i.e., 16~31 tones, if P5, P4 are (0,1); and
d) the adder output is 000000[B]~001111[B], i.e., 0~15 tones, if P5, P4 are (0,0).

If the difference in density between the pixel of interest and any one of the eight peripheral pixels exceeds the fixed value, then the output signal S is made logical "1".

Figure 44:
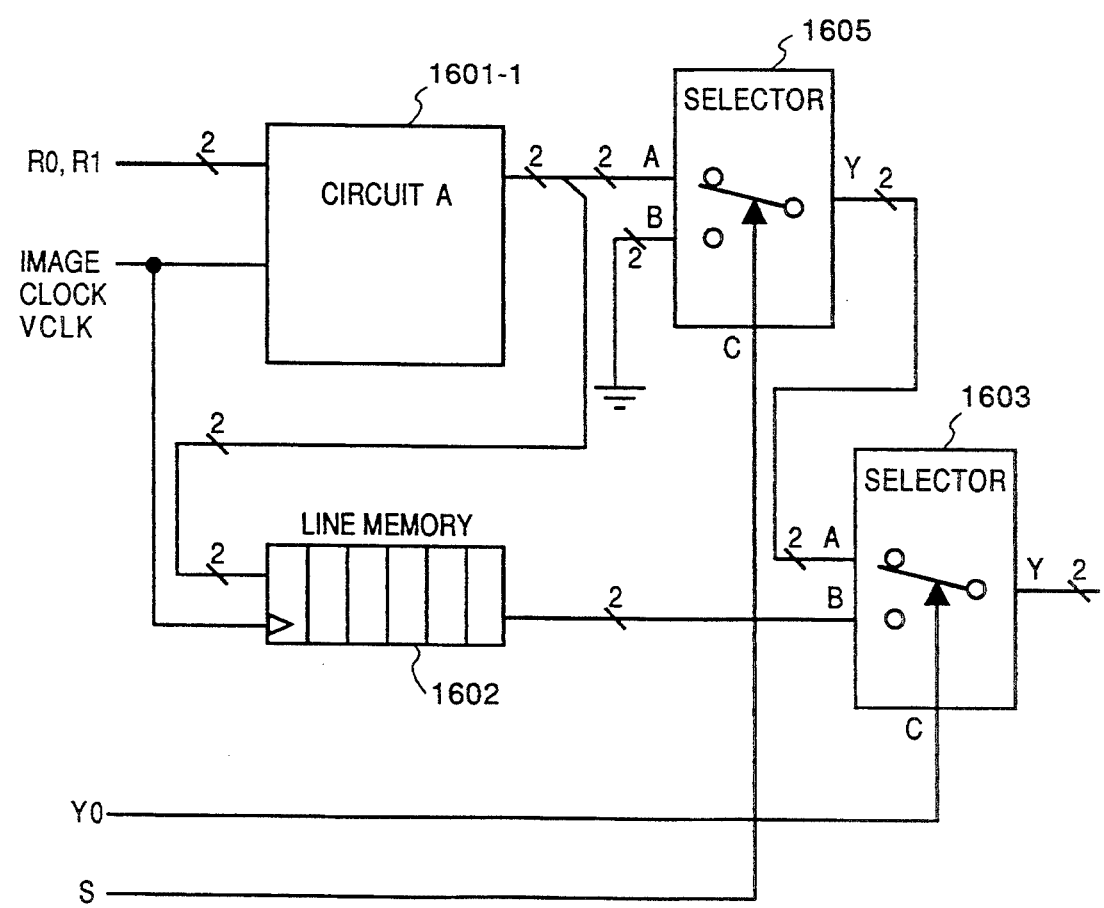

FIG. 44 is a block diagram showing the configuration of the PWM growth-direction decision unit 2201 according to this modification. Numeral 1602 in FIG. 44 denotes a line memory, and numerals 1603, 1605 denotes selectors. The construction of circuit A1601-1 is identical with that of the circuit A shown in FIG. 35.

In this modification, growth direction [specifically in the order of pattern (C) and pattern (B)] is selected and decided every pixel of 300 dpi from the patterns (A) through (C), shown in FIG. 11, in such a manner that mutually adjacent pixels will not contact, just as in the second embodiment. At such time the one-bit input from the peripheral-pixel reference circuit 2200 is adopted as the switch signal of the selector 1605 in PWM growth-direction decision unit 2201, whereby a changeover is effected between the two bits from the circuit A and the two-bit signal of ground level.

In this modification, growth is in units of 300 dpi and therefore the odd-numbered lines in 600 dpi units must have a growth direction that is the same as that of the even-numbered lines. As shown in FIG. 44, the output of the circuit A1601-1 is transmitted simultaneously to the selector 1605 and line memory 1602 and the outputs of the circuit A and line memory 1602 are sent to the selector 1603. The selector 1603 selects the output of the circuit A when Y0 (the signal whose frequency is half that of the horizontal synchronizing signal) is logical "1" and the output of the line memory 1602 when Y0 is logical "0". As a result, the final output of the PWM growth-direction decision unit 2201 is growth in units of 300 dpi and a growth pattern of the kind shown in FIG. 36 is realized overall.

FIG. 47 illustrates the process through which 600 dpi four-bit multivalued image data sent from the printer controller is converted into 300 dpi six-bit multivalued data by the addition operation, the PWM growth direction is decided and printing is carried out. As will be evident from FIG. 47, randomly fluctuating linear growth of pixels is obtained, and portions are provided in which adjacent pixels approach each other in an irregular manner. Thus, an effect similar to that obtained by reducing resolution is achieved. This makes it possible to obtain a half-tone image without conspicuous density irregularity.

Furthermore, since fluctuation is controlled upon recognizing a steep density gradient, the edges of character images and the like are printed more sharply.

[Third Embodiment]

A third embodiment according to the present invention will now be described. Here a case will be described in which the laser-beam printer according to the first embodiment is an LED printer.

Figure 48:
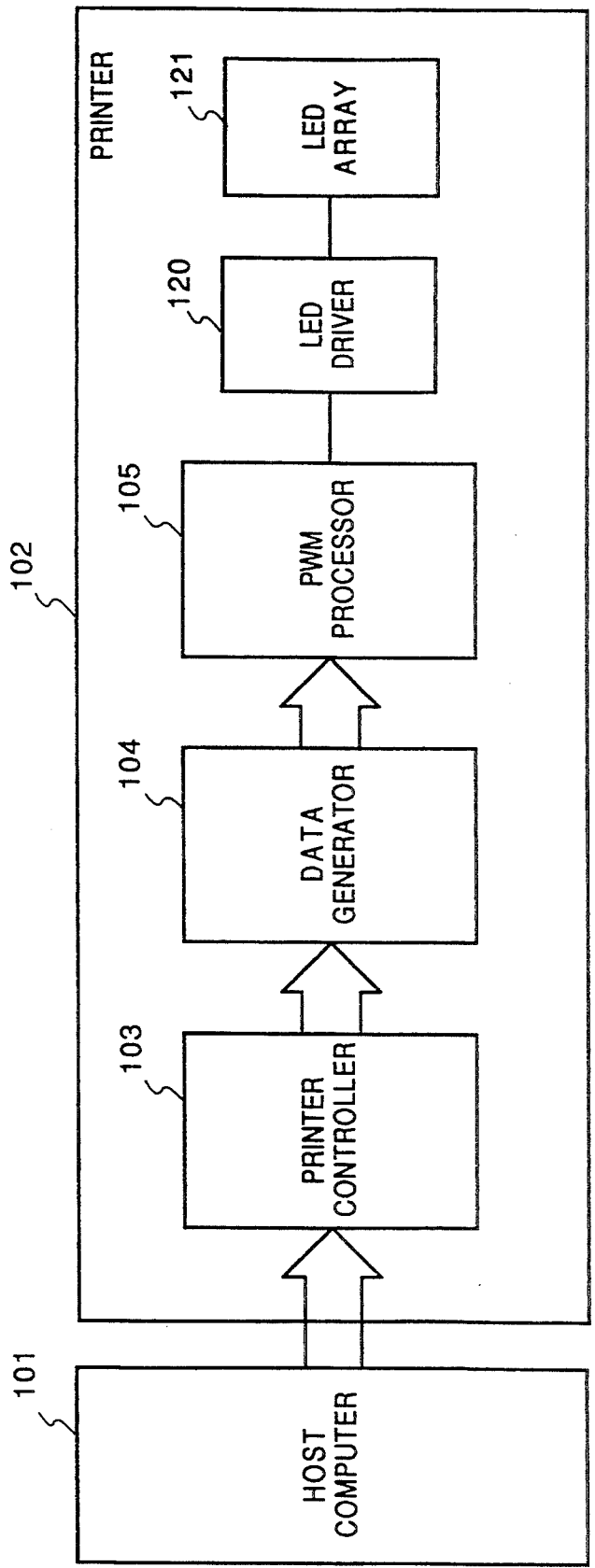

FIG. 48 is a block diagram showing the overall configuration of an LED printer when the laser-beam printer of the first embodiment is made an LED printer. Further, components in FIG. 48 identical with those in the laser-beam printer of the first embodiment shown in FIG. 1 are designated by like reference numerals and need not be described again.

An LED driver 120 shown in FIG. 48 will now be described in detail.

FIG. 49 is a block diagram illustrating the configuration of the LED driver 120 and of an LED array 121 in this embodiment. In FIG. 49, numeral 402 denotes an LED array formed by arraying chips 403-1 through 403-n, each of which includes 128 LED's 415, in a single row. The LED's 415 formed on these chips are connected to a driver 404 by signal lines $D_0 \sim D_{127}$ arranged in the form of a matrix. A selector 405 connected in parallel with the driver 404 drives the driver 404 based upon 128 items of data from one latch circuit among latch circuits 1~8 (reference numerals 406~409 in FIG. 49).

The signal output by the PWM processor is accepted in an eight-bit shift register 414 in response to the signal 8VCLK, which has a frequency eight times that of the image clock. The eight-bit shift register converts the VDO signal into an eight-bit parallel signal, and each of eight shift registers 1~8 (reference numerals 410~413 in FIG. 49) accepts the VDO signal, which has been split into eight parts by the image clock VCLK. When the 128-bit data enters each shift register, the data is latched in the latches 1~8 by a timing signal.

When a decoder 401 outputs common signals COM1~COMn, the selector 405 is changed over by a control signal at fixed times, which are obtained by splitting, into eight parts, the time during which the common signal is ON, and the selector 405 successively transmits the data of latches 1~8 to the driver 404, whereby PWM is performed by data obtained by splitting one dot of 600 dpi into eight parts.

FIG. 50 is a block diagram illustrating the construction of a data generating unit in the LED printer according to the third embodiment. Components in FIG. 50 identical with those in the data generating unit of the first embodiment are designated by like reference numerals and need not be described again.

In FIG. 50, the inputs to the PWM growth-direction decision unit 208, described below, are the image clock VCLK, one bit from the sub-scanning clock 207 and the two-bit signal from the random-number generating circuit 209. The decision unit 208 outputs a two-bit pattern-select signal for selecting one of three patterns (A) through (C) shown in FIG. 51.

Figure 52:
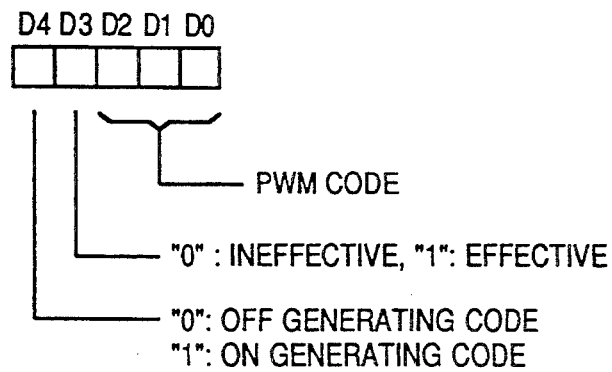

The density-pattern generating table 205 outputs a five-bit density code signal $D_0 \sim D_4$ based upon a look-up table having an address map shown in FIG. 52. Here also the density code generated by the density-pattern generating table 205 takes into consideration a correction of the γ characteristic of the printer. The ON- and OFF-generation codes also are similar to those in the first embodiment.

In this embodiment, one dot is subjected to PWM in units of ⅛ by $D_0 \sim D_2$ from the density code signal $D_0 \sim D_4$.

The PWM processor according to this embodiment will now be described.

Figure 53:
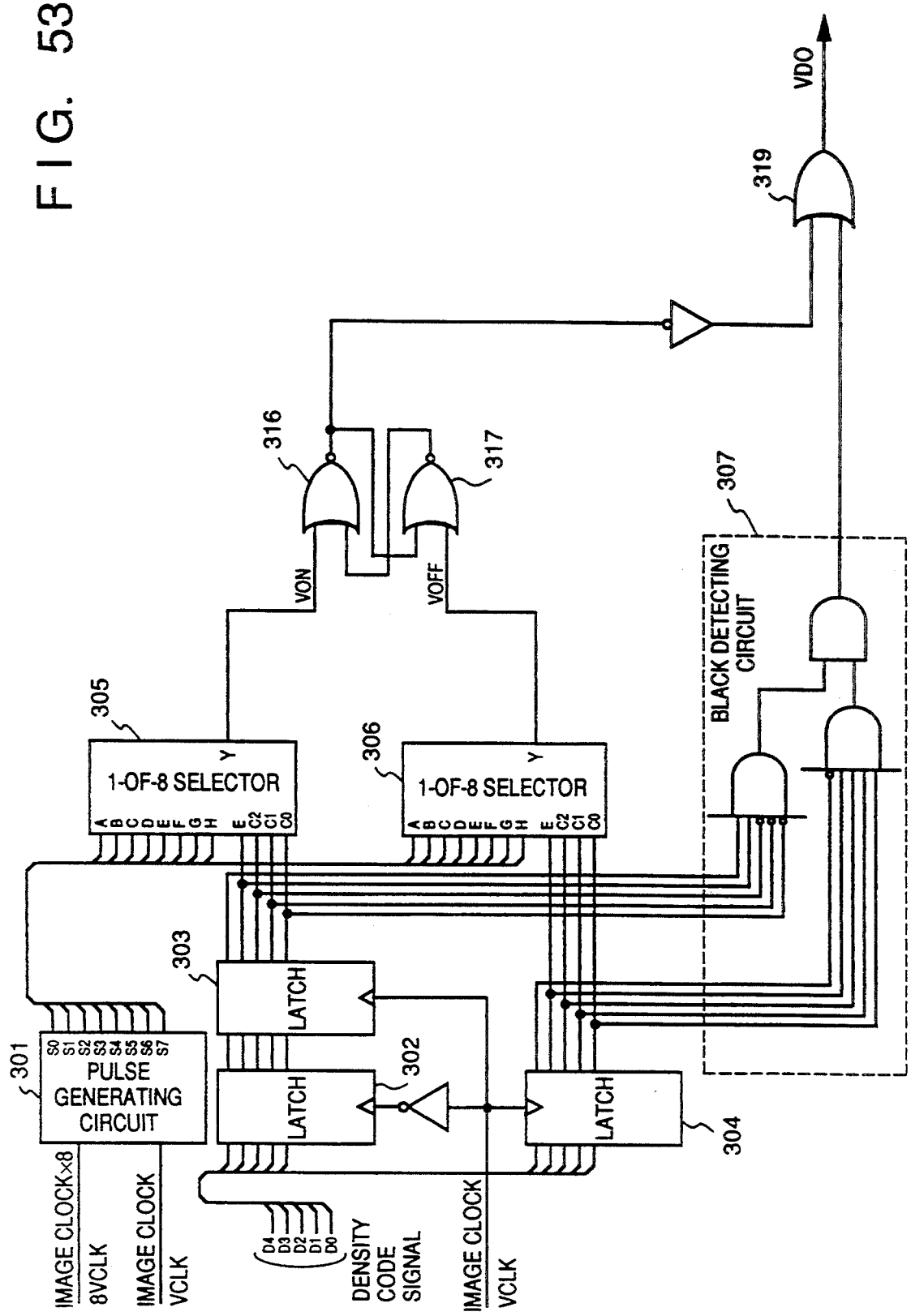

FIG. 53 is a block diagram showing the configuration of the PWM processor in this embodiment. Components in FIG. 53 identical with those in the PWM processor of the first embodiment shown in FIG. 13 are designated by like reference numerals and need not be described again.

The pulse generating circuit 301 in the PWM processor of FIG. 53 generates eight pulses $S_0 \sim S_7$. The selectors 305, 306 decide to select and output, or to disable, one pulse from among the pulses $S_0 \sim S_7$ based upon $D_0 \sim D_3$ in the density code $D_0 \sim D_4$ output by the data generator 104. The select logic of the selector 305, 306 is similar to the logic in the first embodiment illustrated in FIG. 15.

Since the construction of the PWM growth-direction decision unit and the construction of the circuit A within the PWM growth-direction decision unit of this embodiment are similar to those of the PWM growth-direction decision unit and circuit A (see FIGS. 34 and 35) in the second embodiment, these need not be described again.

In the printer of this embodiment, direction of growth is selected and decided every pixel of 300 dpi from the patterns shown in FIG. 51. At this time the pixel to the left of the pixel to be printed (namely the pixel of interest) is monitored, and it is so arranged that mutually adjacent pixels will not contact [in the order of pattern (C) and pattern (B)]. In order to realize this, the pattern select signal is transmitted by the PWM growth-direction decision unit 208.

More specifically, in the circuit A illustrated in FIG. 35, the output Q (the data indicative of the pixel to the left of the pixel of interest) from the D-type flip-flop 1611-1 and the output R from the random-number generating circuit are monitored by the AND gates 1612-1~1617 and OR gate 1618. When the order of the (C) pattern and (B) pattern does not hold, the select signal to the selector 1619 becomes logical "1" and the two bits from the random-number generating circuit 209 are transmitted intact as the pattern-select signal. When the order does hold, the selector 1619 selects the terminal B and transmits the two bits (0,0) of the circuit ground level.

Since the data of pattern (A), namely the central-growth pattern shown in FIG. 11, has been stored in the bank from (0,0) indicated by addresses A10, A9 of the density-pattern generating table 205, central growth is the result in case of patterns other than the above-mentioned. In other words, when the order of the (C) pattern and (B) pattern is achieved, the central growth (A) pattern is forcibly adopted no matter what pattern is indicated by the pixel of interest.

Figure 54:
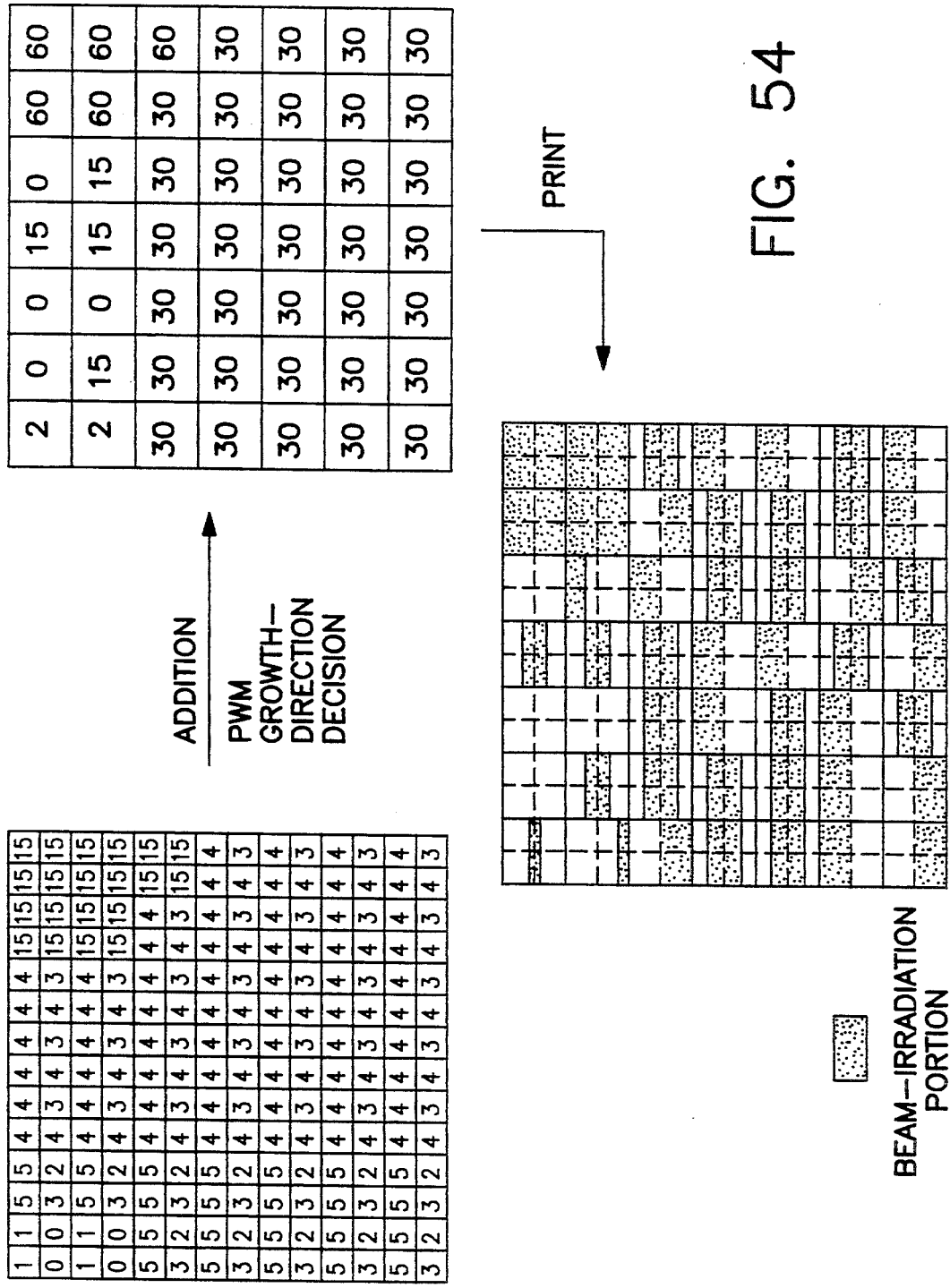

Since growth is in units of 300 dpi even in the printer according to this embodiment, the odd-numbered lines in 600 dpi units must have a growth direction that is the same as that of the even-numbered lines. Accordingly, the output of the circuit A is transmitted simultaneously to the selector 1603 and line memory 1602 and the outputs of the circuit A and line memory are sent to the selector 1603. The selector 1603 selects the output of the circuit A when Y0 (the signal whose frequency is half that of the horizontal synchronizing signal) is logical "1" and the output of the line memory 1602 when Y0 is logical "0". As a result, the final output of the PWM growth-direction decision unit 208 is growth in units of 300 dpi and a growth pattern of the kind shown in FIG. 54 is realized overall.

In accordance with this embodiment, as described above, a plurality of density growth patterns are generated randomly so that printing is performed in such a manner that mutually adjacent pixels do not become joined, as a result of which a slight fluctuation is produced in the linear growth of PWM and a portion is provided in which adjacent pixels approach each other irregularly. This produces an effect equivalent to a reduction in resolution and makes it possible to reduce printing density irregularity caused by pitch irregularity in the printer.

Further, since resolution is not actually reduced, a high-quality image can be obtained without sacrificing the sharpness of character images.

<Modification>

The construction of the data generating unit of the LED printer shown in FIG. 50 may be changed as described below to provide a modification of the third embodiment.

Figure 55:
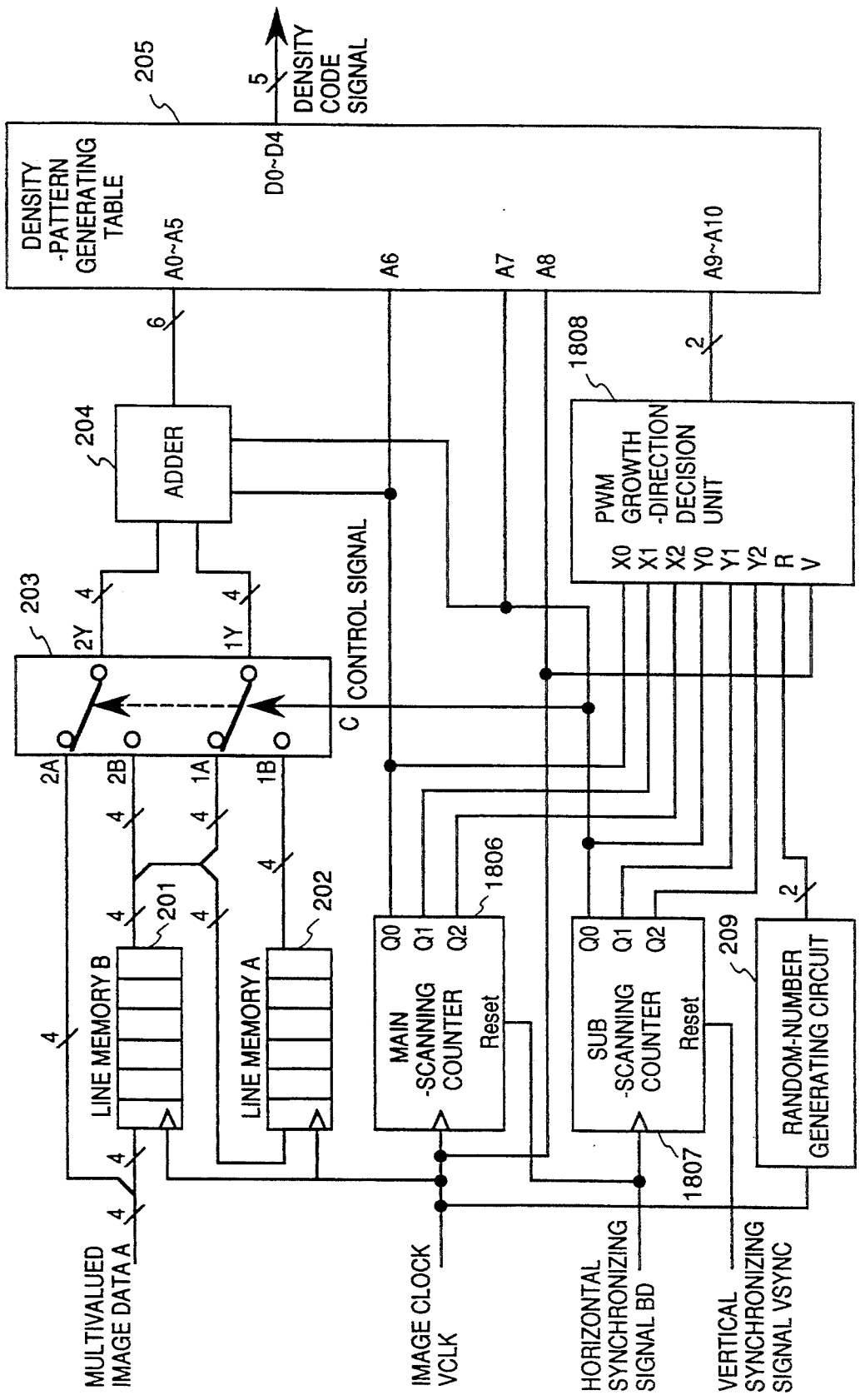
FIGS. 55 through 58 are diagrams for describing a modification of the third embodiment.

Specifically, as shown in FIG. 55, the data generating unit may be constructed so as to be identical with that of the second modification of the second embodiment shown in FIG. 37. In FIG. 55, the inputs to the main-scanning counter 1806 and sub-scanning counter 1807 are the image clock and the horizontal synchronizing signal, and the outputs of each counter are Q0, Q1, Q2, which are signals obtained by frequency division by two, four and eight, respectively. The inputs to a PWM growth-direction decision unit 1808 are the image clock VCLK, the three bits from the main-scanning counter 1806, the three bits from the sub-scanning counter 1807 and two bits from the random-number generating circuit 209.

Since the construction and operation of the PWM growth-direction decision unit 1808 are identical with those of the PWM growth-direction decision unit in the first modification of the second embodiment (see FIGS. 38 and 39, a description and illustration thereof are deleted.

Figure 56A:
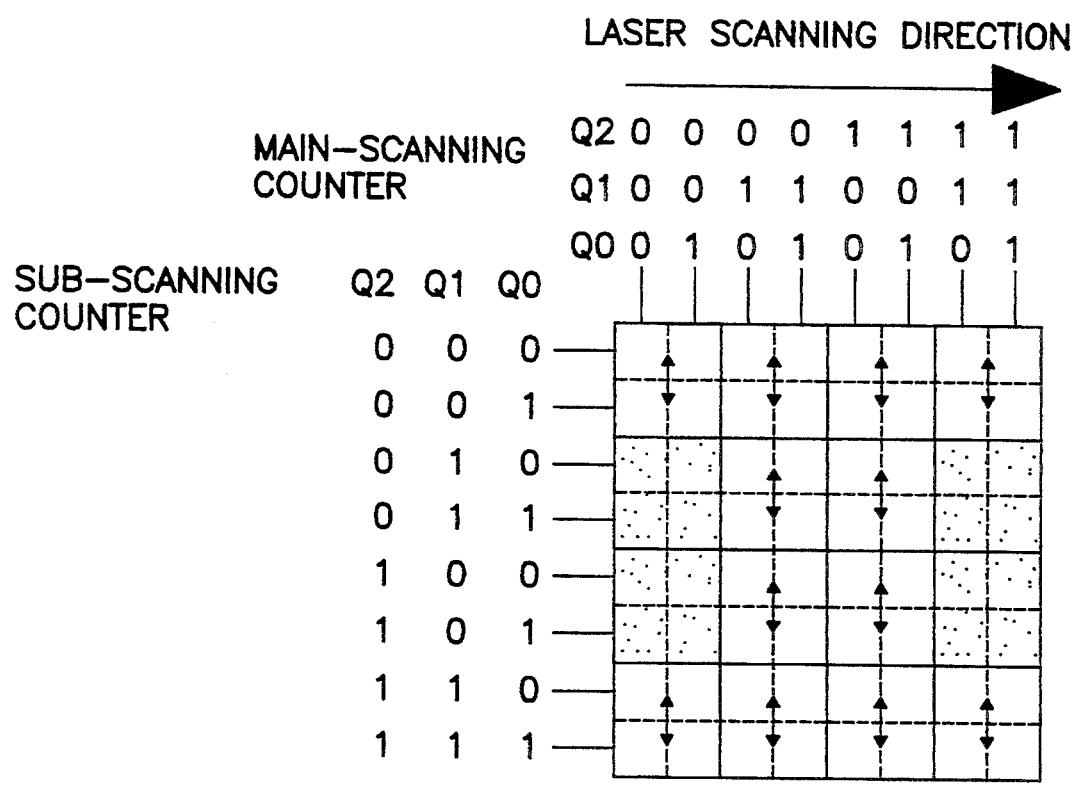
Figure 56B:
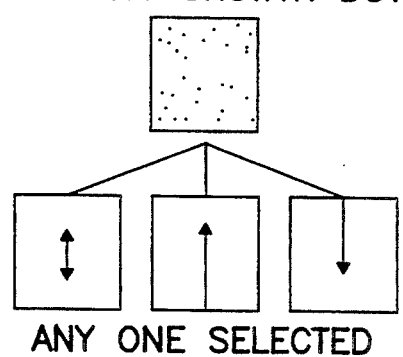

A random-growth portion of the kind shown in FIG. 56 is provided, in which a total of 16 dots, namely four dots in the main-scanning direction×four dots in the sub-scanning direction, are treated as an aggregate, with the dots being in units of 300 dpi. A pattern-select signal for realizing this is transmitted by the PWM growth-direction decision unit. This operation is the same as that performed by the PWM growth-direction decision unit in the first embodiment.

Figure 57:
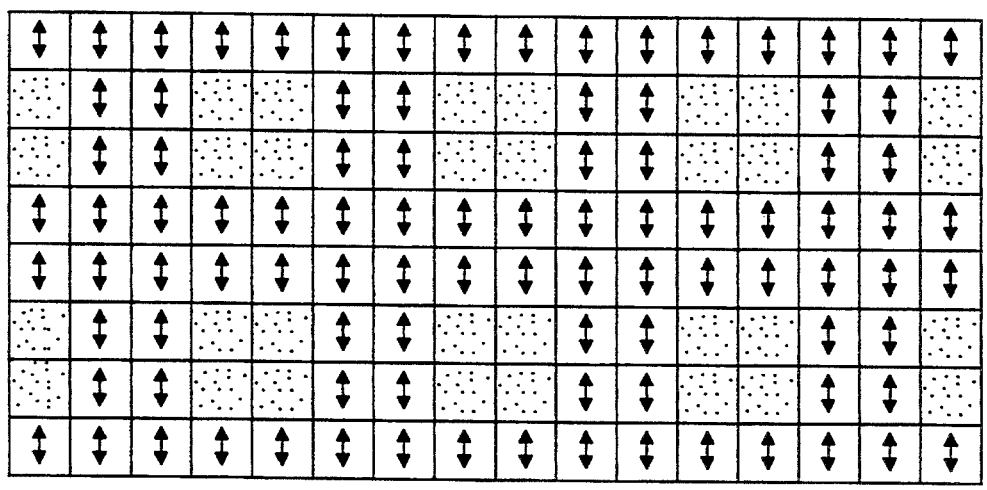

Here the final output of the PWM growth-direction decision unit is growth in units of 300 dpi, and a growth pattern shown in FIG. 57 is realized overall.

Figure 58:
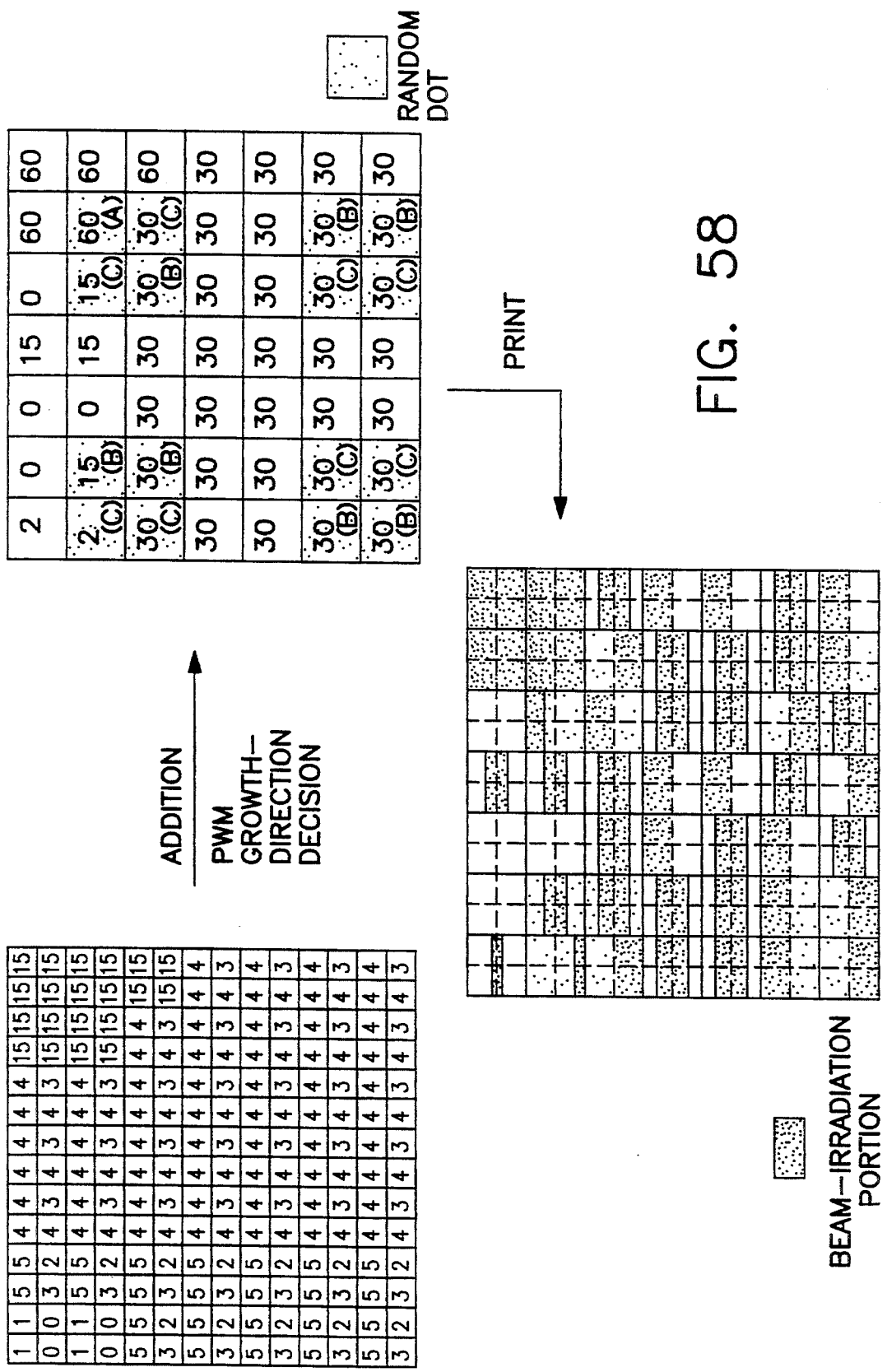

FIG. 58 illustrates the process through which 600 dpi four-bit multivalued image data sent from the printer controller is converted into 300 dpi six-bit multivalued data by the addition operation, the PWM growth direction is decided and printing is carried out. As will be evident from FIG. 58, a pattern that is not the ordinary 300-line central growth appears at a certain fixed interval. However, the percentage of central growth is higher. As a result, the image coarseness that is peculiar to random growth is reduced and it is possible to obtain a half-tone image, of improved stability and higher tonality, in which there is no conspicuous image density irregularity caused by an irregularity in the speeds of, the paper conveyance system and drive system of the photosensitive drum in the printer or by a variance in the LED spacing within the LED array.

[Fourth Embodiment]

A fourth embodiment of the present invention will now be described.

Figure 59:
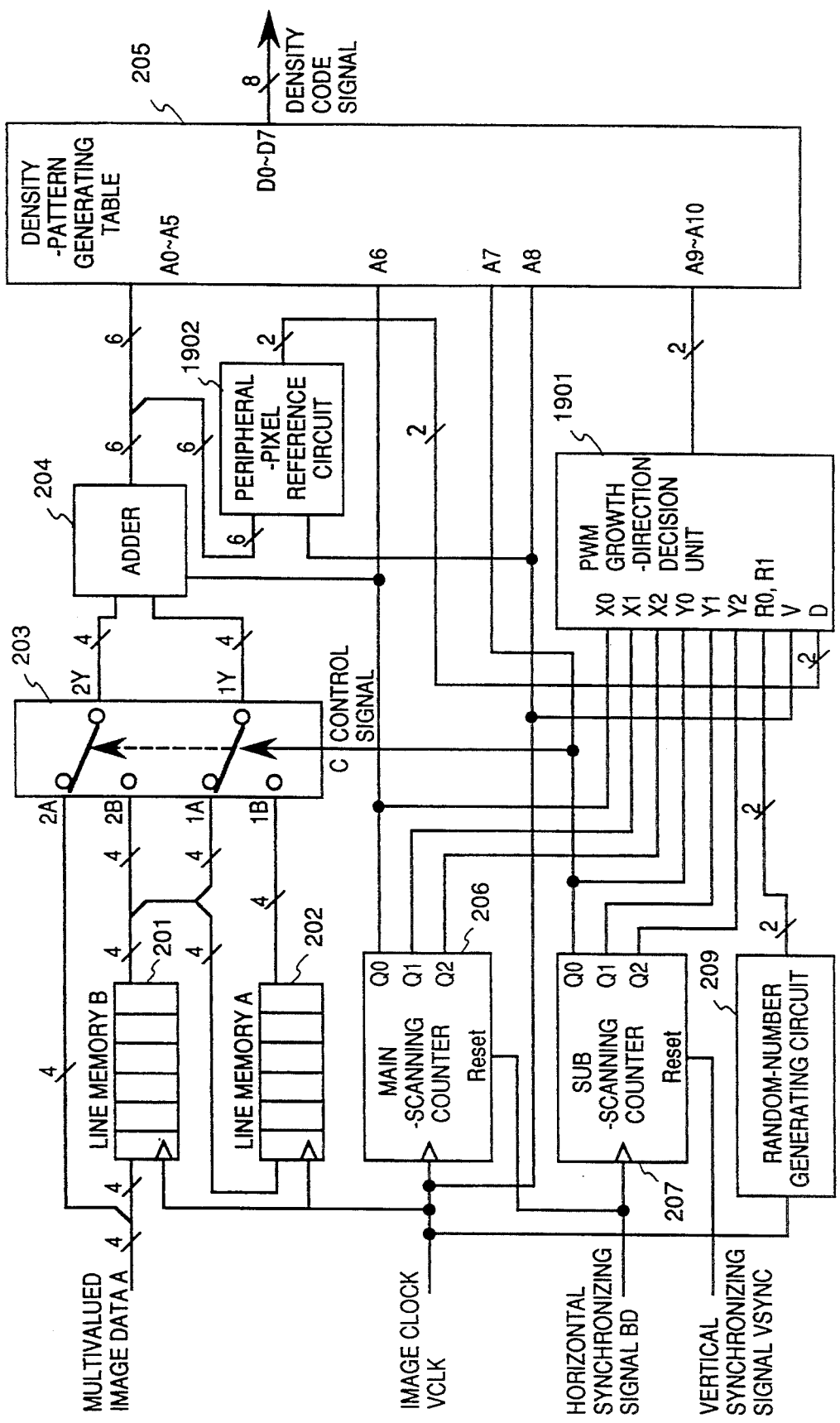

FIG. 59 illustrates the configuration of the data generating unit 104 in the printer according to a fourth embodiment of the present invention. The PWM processor of the printer in this embodiment has the same construction and operation as those of the PWM processor according to the first embodiment.

The data generating unit 104 of this embodiment shown in FIG. 59 also operates in accordance with the time chart associated with the data generating unit according to the first embodiment shown in FIG. 3.

The arrangement shown in FIG. 2 includes the line memory (B) 201, the line memory (A) 202, the selector 203, the adder 204, a PWM growth-direction decision unit 1901, a peripheral-pixel reference circuit 1902, the random-number generating circuit 209, the main- and sub-scanning counters 206, 207, respectively, each of which is constituted by a frequency divider, and the density-pattern generating circuit 205. The main-scanning counter 206 and the sub-scanning counter 207 respectively receive an image clock and a horizontal synchronizing signal as input signals and the output signals Q0, Q1, Q2 obtained by frequency division by two, four and eight, respectively. The image synchronizing clock is input to the random-number generating circuit 209, which outputs a two-bit random number (0[H]~3[H]).

The inputs to the peripheral-pixel reference circuit 1902 are the image clock VCLK and six bits of the multivalued image data from the adder 204, as illustrated in FIG. 59. As shown in FIG. 60, the densities of the peripheral pixels (eight pixels) of the pixel of interest are averaged and the two higher order bits of the average value are sent to the PWM growth-direction decision unit 1901. The inputs to the PWM growth-direction decision unit 1901 are three bits from the main-scanning counter 206, three bits from the sub-scanning counter 207, two bits signal from the random-number generating circuit 209 and the two-bit signal from the peripheral-pixel reference circuit 1902. As the earlier embodiments, the decision unit 1901 outputs a two-bit pattern-select signal for selecting one of the three patterns (A) through (C) shown in FIG. 11. The operation of the other components constructing the data generating unit is the same as in the first embodiment.

In this embodiment, a method similar to that of the first embodiment is employed in which, on the basis of the average value of the pixels peripheral to the pixel of interest, the influence of random numbers is reduced at low density and increased at high density to decide the influence of the random numbers in dependence upon density.

Figure 61:
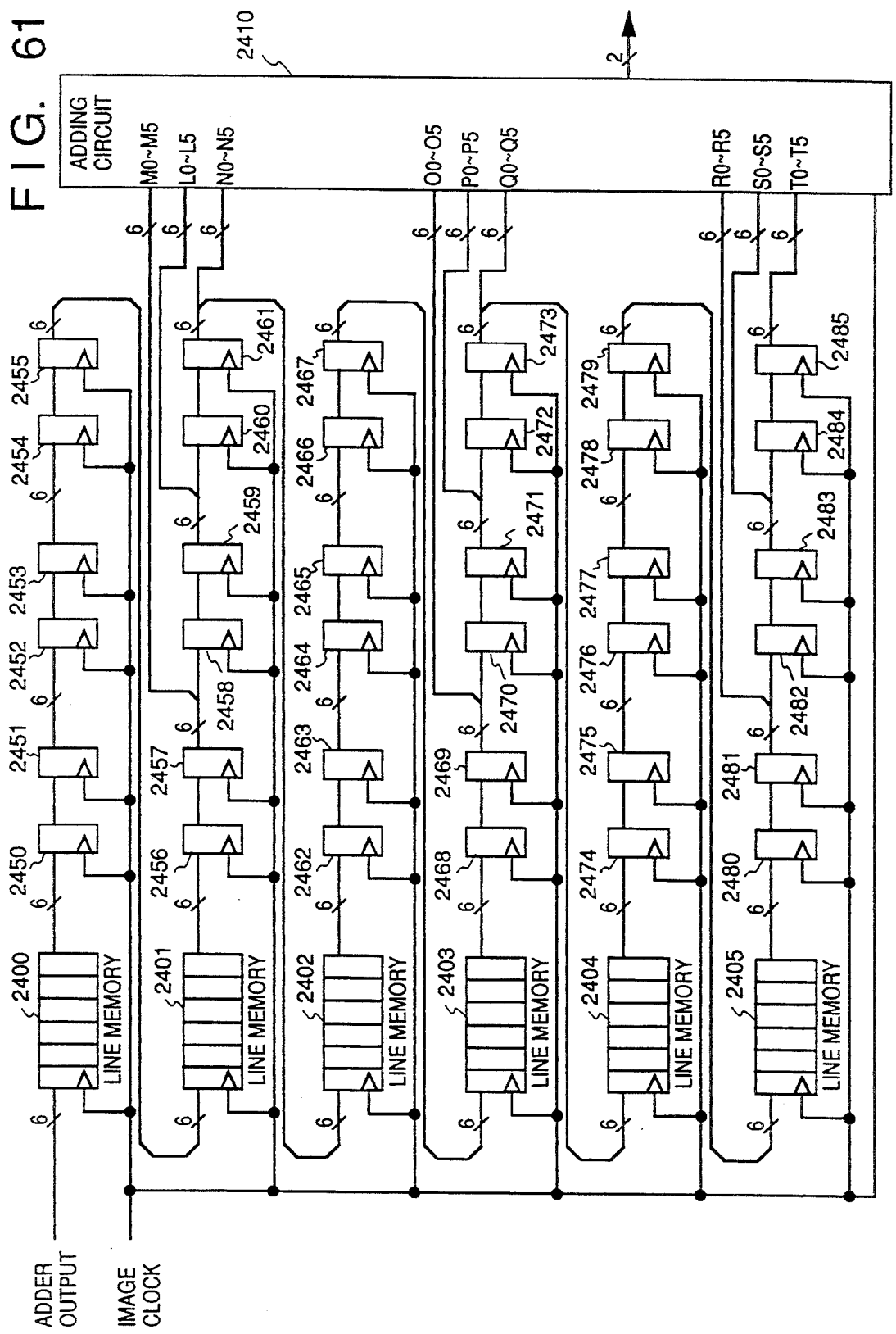

FIG. 61 is a block diagram showing the circuit configuration of the peripheral-pixel reference circuit 1902. As shown in FIG. 61, this circuit includes the line memories 2400~2405, the latches 2450~2485 and the adding circuit 2410. In this circuit, the six-bit signal from the adder 204 is stored successively in the line memories. When a total of six lines of data are stored, the peripheral pixels of the pixel of interest, namely a total of eight pixels of data, are sent to the adding circuit 2410.

With regard to the six-bit signal from the adder, the data is transmitted in dot units of 600 dpi, as shown in FIG. 7 of the first embodiment, but the same data is transmitted in units of two dots. In accordance with this circuit arrangement, eight pixels peripheral to the pixel of interest are capable of being referred to in the circuit 2410, as shown in FIG. 60. The adding circuit 2410 adds the multivalued image data of each pixel to obtain nine-bit data, and the two higher order bits of data are sent to the PWM growth-direction decision unit 1901, whereby two higher order bits of the average value of the eight pixels peripheral to the pixel of interest are output.

In this embodiment, the average value of the eight pixels peripheral to the pixel of interest is used. However, the average value may be that of nine pixels inclusive of the pixel of interest.

Figure 62:
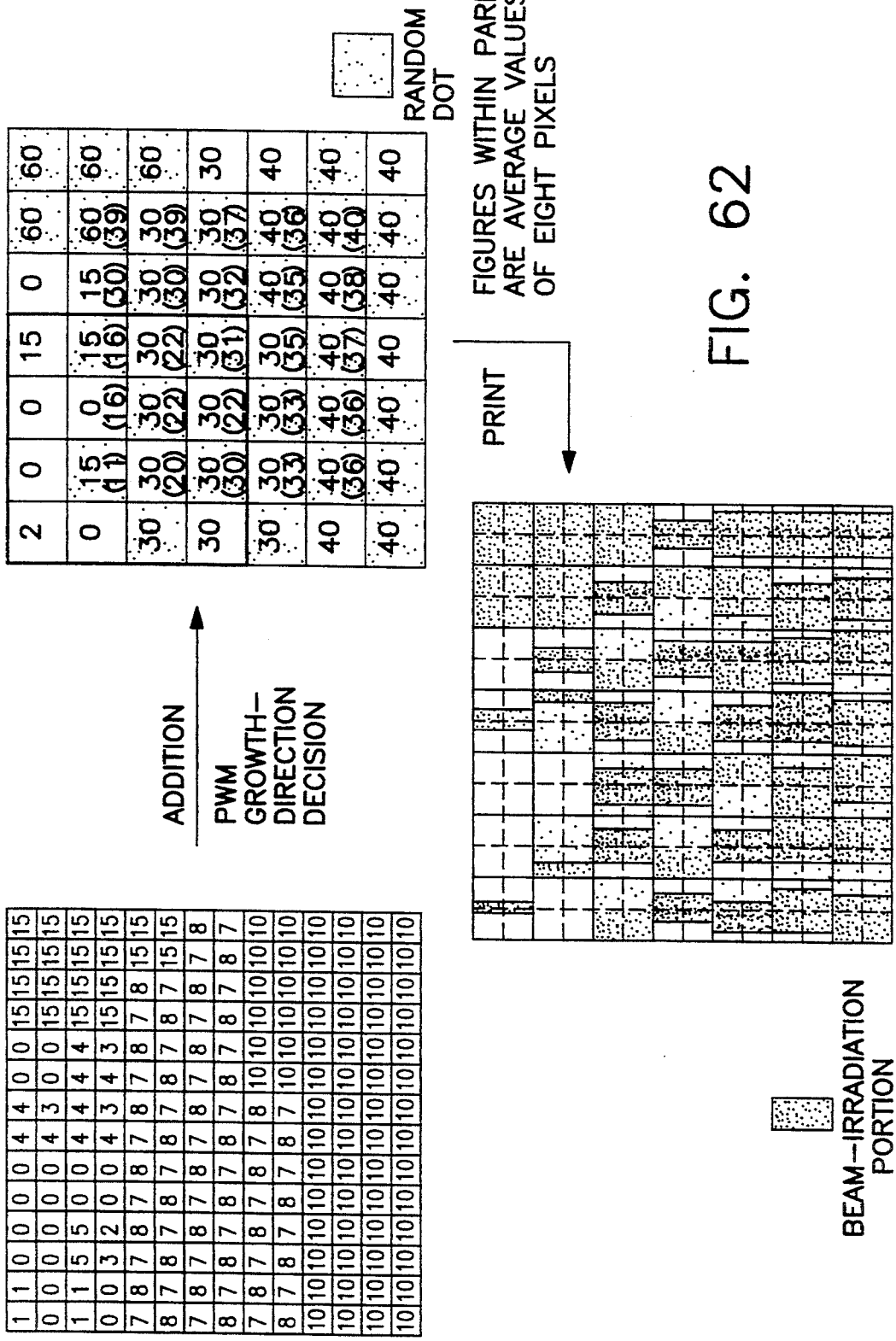

FIG. 62 illustrates the process through which 600 dpi four-bit multivalued image data sent from the printer controller is converted into 300 dpi six-bit multivalued data by the addition operation, the PWM growth direction is decided and printing is carried out. As will be evident from FIG. 41, a random dot that is not the ordinary 300-line central growth appears at a certain fixed interval. The ratio of the total that this dot occupies is small at low density and large at high density.

Thus, a plurality of density growth patterns are randomly generated or a selected pixel and a pixel that grows according to a predetermined growth pattern are mixed and the distribution thereof is changed in dependence upon the result of monitoring the density of printed pixels or pixels in the vicinity thereof. As a result, the higher the density (at high density, the influence of pitch irregularity is comparatively conspicuous but the characteristic coarseness of an image caused by random numbers is not prominent), the greater the influence of random numbers is made. At low density, where the influence of pitch irregularity is comparatively inconspicuous but the characteristic coarseness of an image caused by random numbers is readily noticeable, the influence of random numbers is diminished. Thus, a portion in which adjacent pixels approach each other in an irregular manner is provided. As a consequence, a half-tone image having high tonality can be obtained without conspicuous density irregularity of the image caused by an irregularity in the speeds of the paper conveyance system and drive system of the photosensitive drum in the printer.

Further, since resolution is not actually reduced, a high-quality image can be obtained without sacrificing the sharpness of character images.

Furthermore, since the average is taken of densities of pixels peripheral to the pixel of interest, there is less susceptibility to the influence of noise on pixel data in an image.

<Modification>

A modification of the fourth embodiment will now be described.

Figure 63:
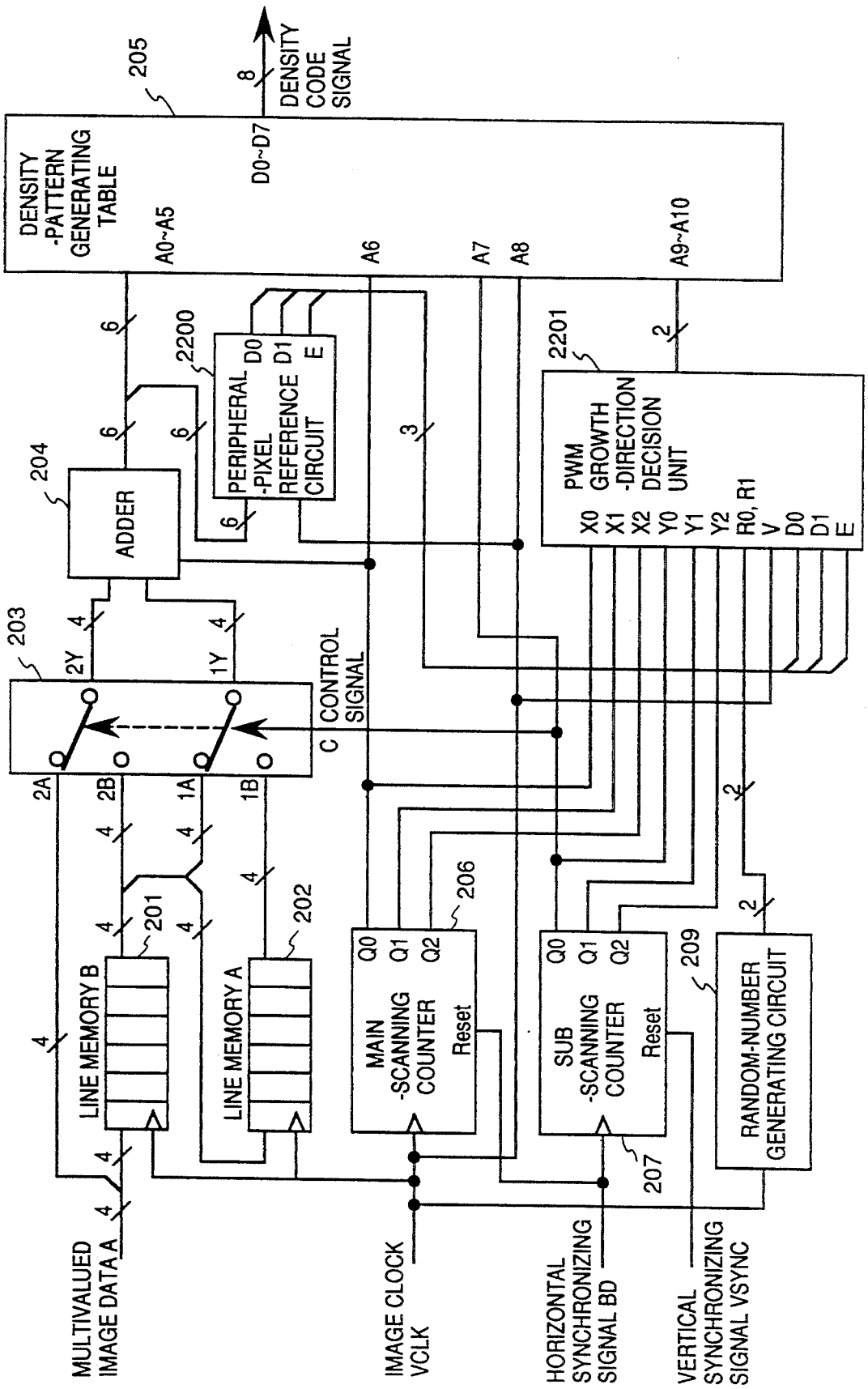
FIGS. 63 through 68 are diagrams for describing a modification of the fourth embodiment.

The construction of the data generating unit 104 in the fourth embodiment is changed to provide a modification of the fourth embodiment. FIG. 63 is a block diagram showing the data generating unit of this modification. Components identical with those of the data generating unit according to the fourth embodiment shown in FIG. 59 are designated by like reference numerals.

The inputs to the peripheral-pixel reference circuit 2200 are the image clock VCLK and six bits of the multivalued image data from the adder 204. As in the foregoing embodiment, the densities of the peripheral pixels (eight pixels) of the pixel of interest shown in FIG. 60 are averaged and the two higher order bits of the average value are sent to the PWM growth-direction decision unit 2201.

The density of the pixel of interest shown in FIG. 60 and the densities of the peripheral pixels (eight pixels) of the pixel of interest are compared. When a density difference exceeds a certain fixed value, the reference circuit 2200 sends its one-bit output E to logical "1" and sends this signal to the PWM growth-direction decision unit 2201 When the signal E is "1", the PWM growth-direction decision unit 2201 adopts the pattern (A) of FIG. 11 as the signal that designates the PWM growth direction.

The inputs to the PWM growth-direction decision unit 2201 are the image clock VCLK, three bits from the main-scanning counter 206, three bits from the sub-scanning counter 207, two bits from the random-number generating circuit 209 and three bits (D0, D1, E) from the peripheral-pixel reference circuit 2200, as shown in FIG. 63. The decision unit 2201 outputs the two-bit pattern-select signal for selecting one pattern from the three patterns (A) through (C) shown in FIG. 11. This operation is similar to that of the fourth embodiment.

Figure 64:
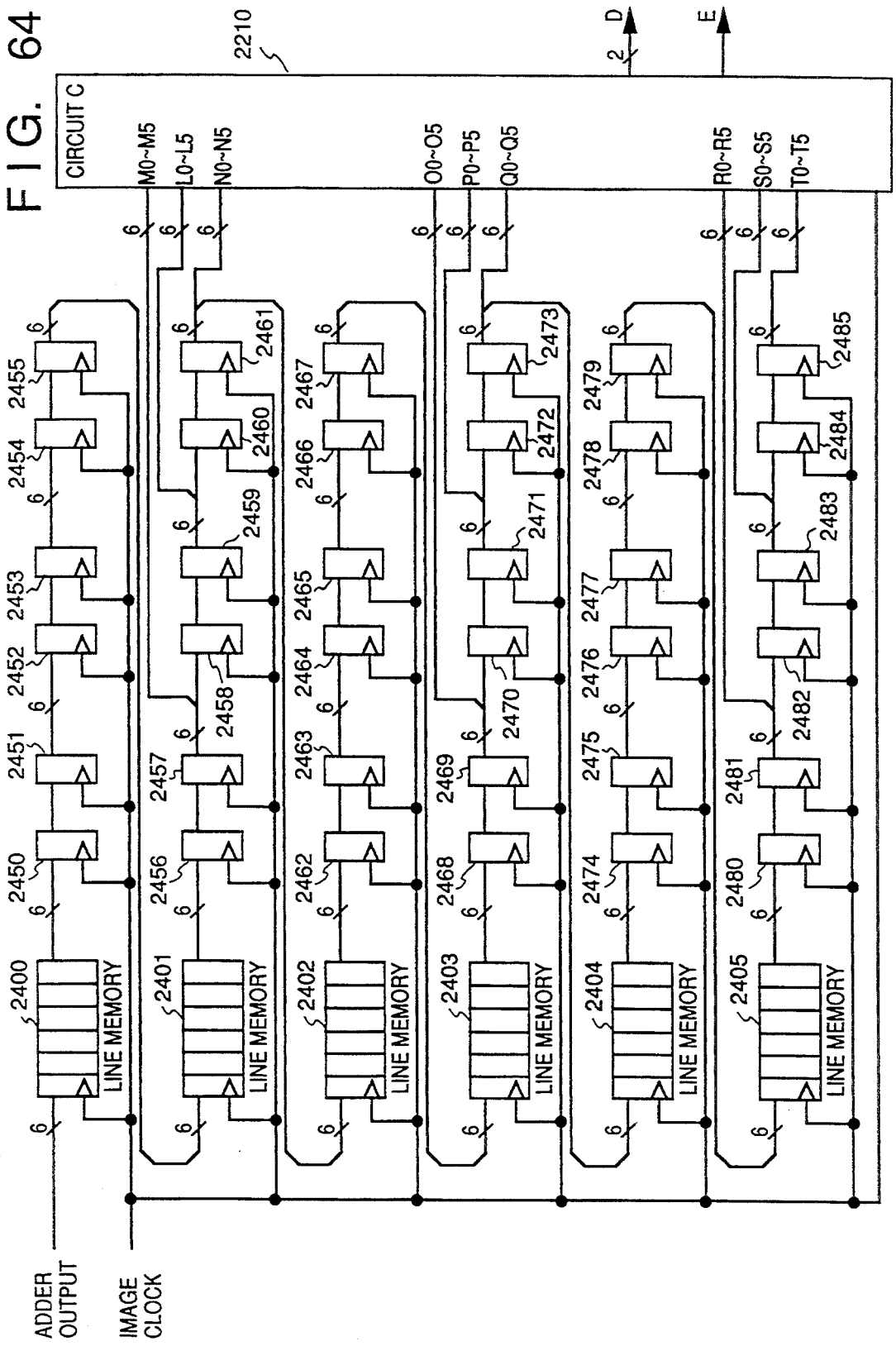

FIG. 64 is a block diagram showing the circuit configuration of the peripheral-pixel reference circuit according to this modification. The difference shown in FIG. 64 and the peripheral-pixel reference circuit in the foregoing embodiment differ in the configuration of the adding circuit. In the circuit shown in FIG. 64, the six-bit signal from the adder 204 is stored successively in the line memories. When a total of six lines of data are stored, the two higher order bits of a total of nine pixels comprising the pixel of interest and the pixels surrounding it are taken from this stored data and transmitted to the circuit C2410. With regard to the six-bit multivalued image signal from the adder, the data is transmitted in dot units of 600 dpi, as shown in FIG. 7, but the same data is transmitted in units of two dots.

Further, data is transmitted in units of one line at 600 dpi in the sub-scanning direction, but the same data is transmitted in units of two lines. In accordance with this circuit arrangement, eight pixels peripheral to the pixel of interest shown in FIG. 60 are capable of being referred to in the circuit C.

Figure 65:
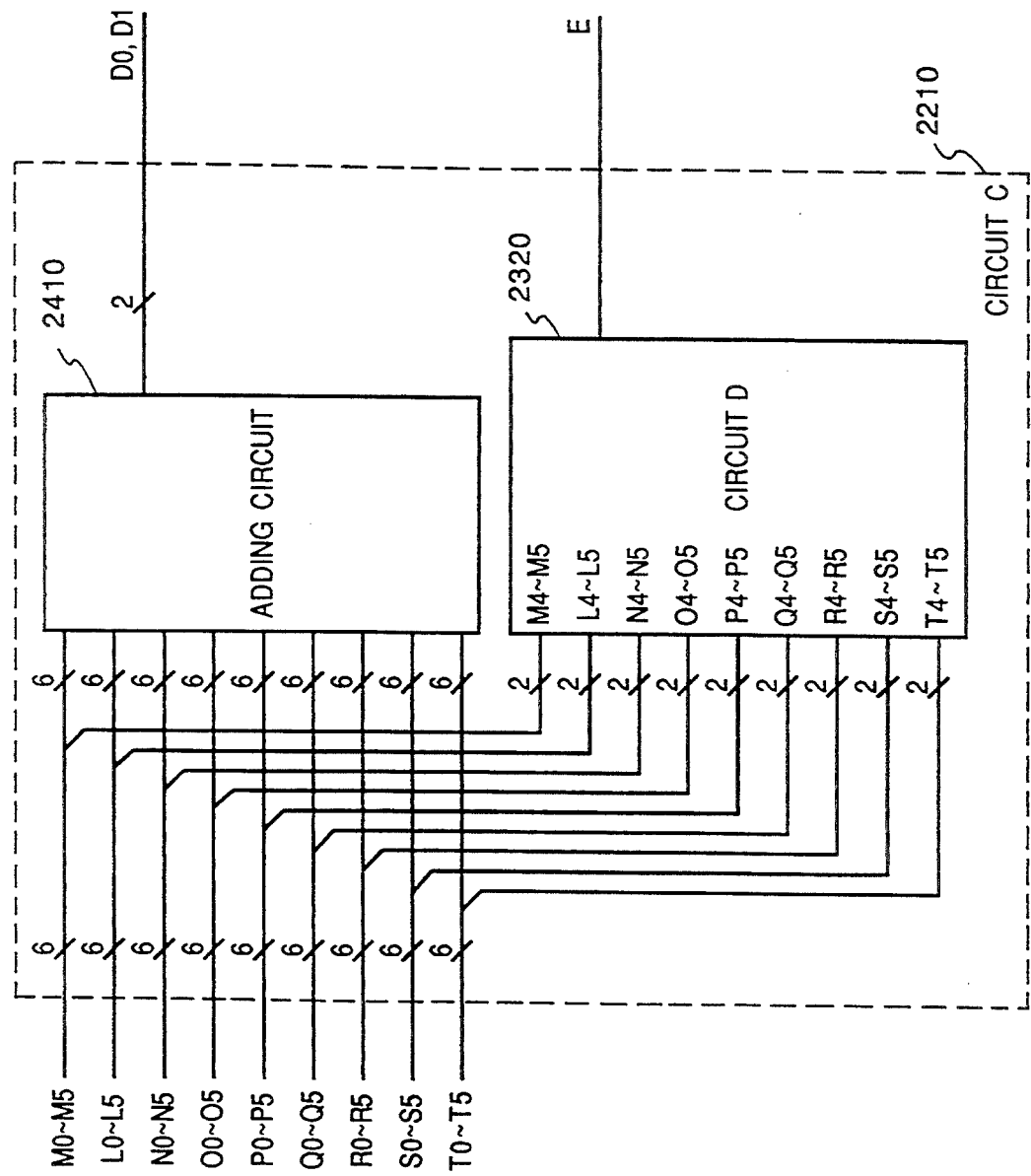

FIG. 65 is a block diagram showing the construction of circuit C. It will be appreciated that each item of six-bit input data is sent to the adding circuit 2410 as is, and that the two higher order bits of each item of data are transmitted to a circuit D 2320.

Figure 66:
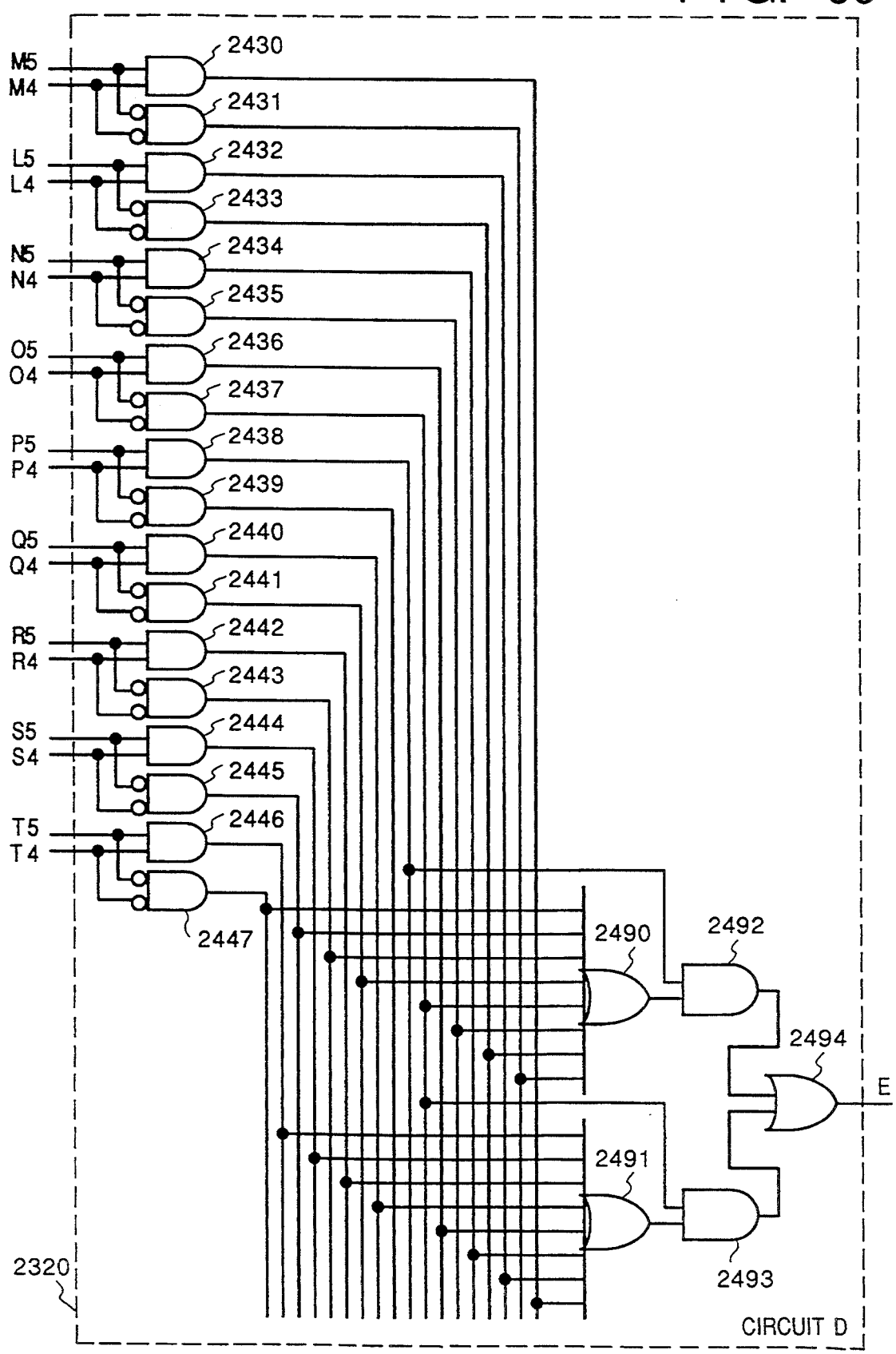

FIG. 66 is a block diagram showing the configuration of the circuit D. The circuit D includes AND gates 2430~2447, 2492, 2493 and OR gates 2490, 2491, 2494. The circuit D refers to the two higher order bits of the multivalued data of each pixel and detects the characterizing feature of the density of the pixel of interest. For example, the following results are obtained when the two higher order bits P5, P4 of the multivalued data of the pixel of interest are as indicated:

a) the adder output is 110000[B]~111100[B], i.e., 48~60 tones, if P5, P4 are (1,1);

b) the adder output is 100000[B]~101111[B], i.e., 32~47 tones, if P5, P4 are (1,0);

c) the adder output is 010000[B]~011111[B], i.e., 16~31 tones, if P5, P4 are (0,1); and d) the adder output is 000000[B]~001111[B],i.e., 0~15 tones, if P5, P4 are (0,0).

If the difference in density between the pixel of interest and any one of the eight peripheral pixels exceeds the fixed value, then the output signal E is made logical "1".

Figure 67:
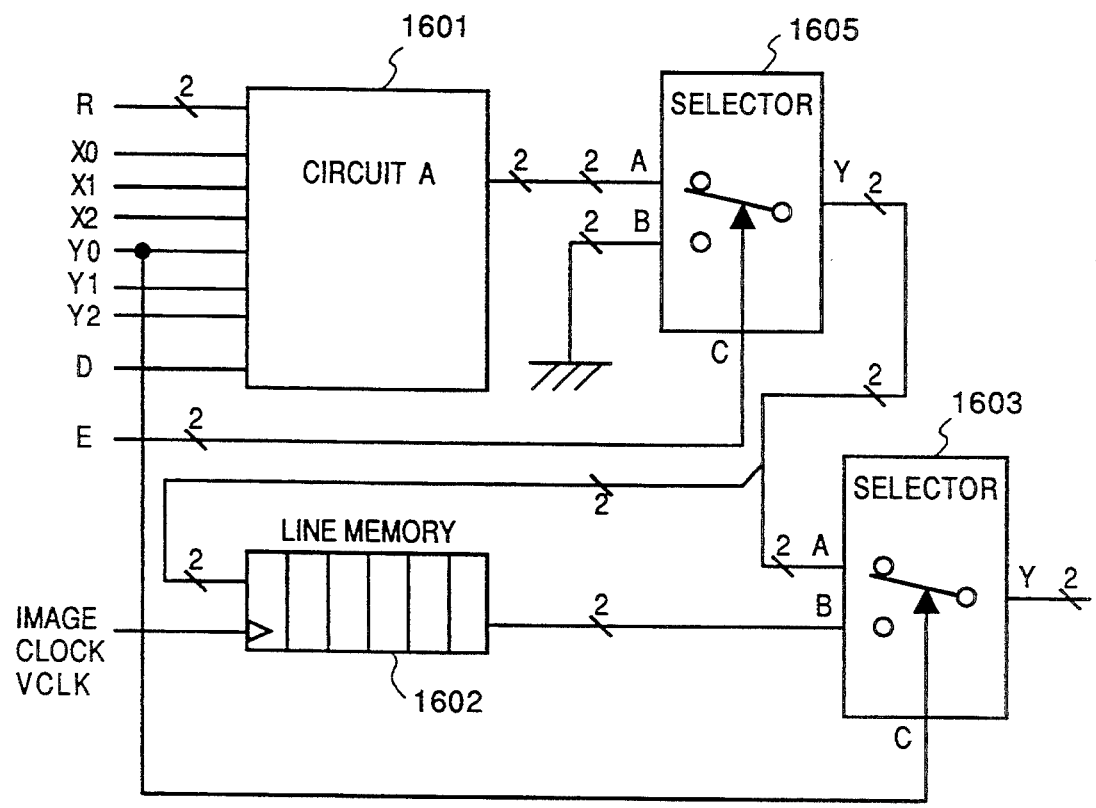

FIG. 67 is a block diagram showing the configuration of the PWM growth-direction decision unit according to this modification. Numeral 1602 in FIG. 67 denotes a line memory, and numerals 1603, 1605 denotes selectors. The construction of circuit A1601-1 is identical with that of the circuit A according to the first modification of the first embodiment shown in FIG.

In this modification, a method similar to that of the fourth embodiment is employed in which the influence of random numbers is reduced at low density and increased at high density to decide the influence of the random numbers in dependence upon density. If the density difference between the pixel of interest and the pixels surrounding it exceeds the fixed value, here all other conditions are ignored and the (A) pattern of central growth is adopted.

More specifically, in the PWM growth-direction decision unit, the one-bit input from the peripheral-pixel reference circuit 2200 is adopted as a switch signal for the selector 1605, whereby a changeover is effected between the two-bit signal from the circuit A1601 and the two-bit signal of circuit ground level. Since the data of pattern (A), namely the central-growth pattern shown in FIG. 11, has been stored in the bank area indicated by addresses A10, A9 when bits (A10, A9) of the density-pattern generating table 205 are (0,0), and the pattern (A) is selected.

Figure 68:
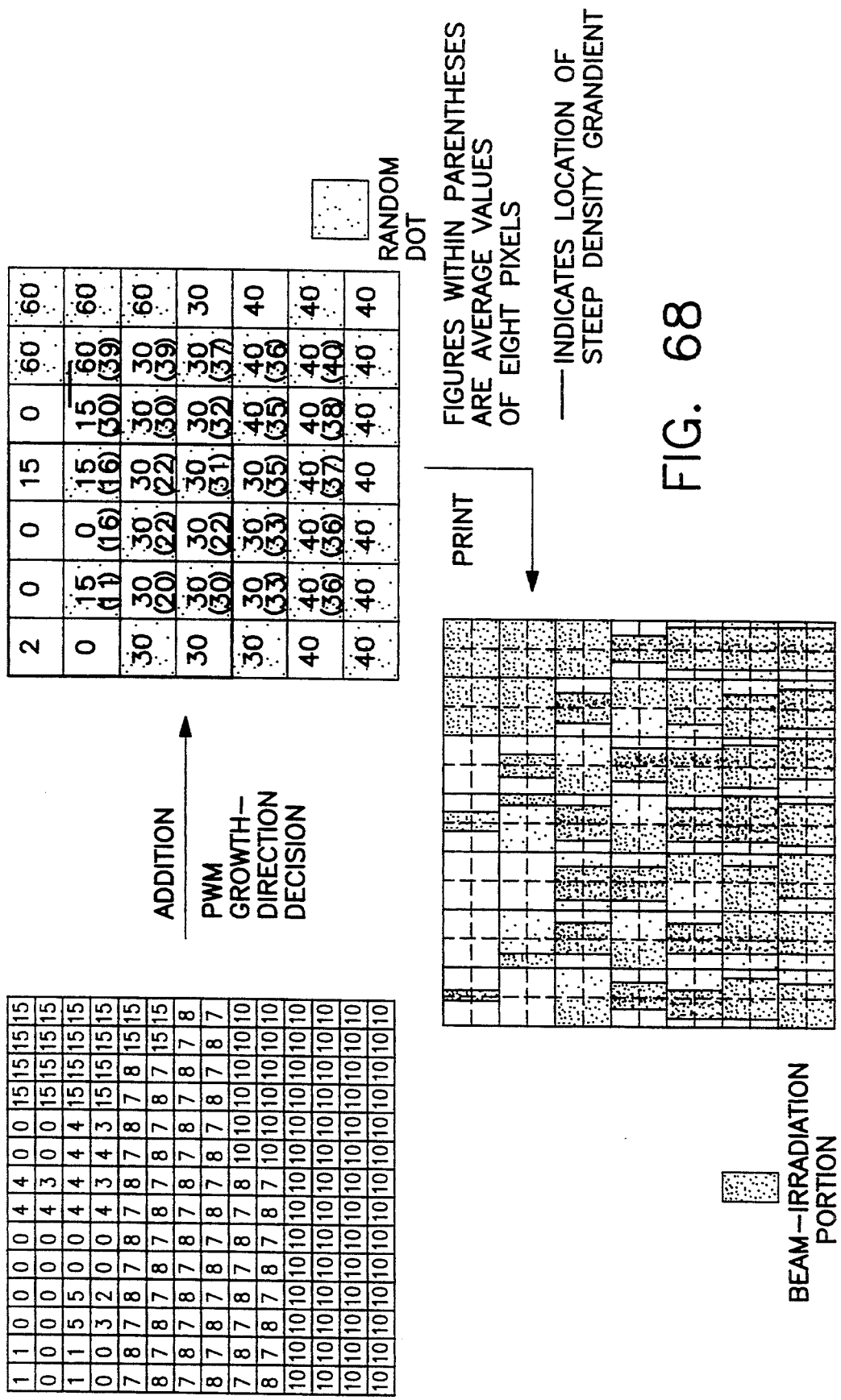
Figure 69A:
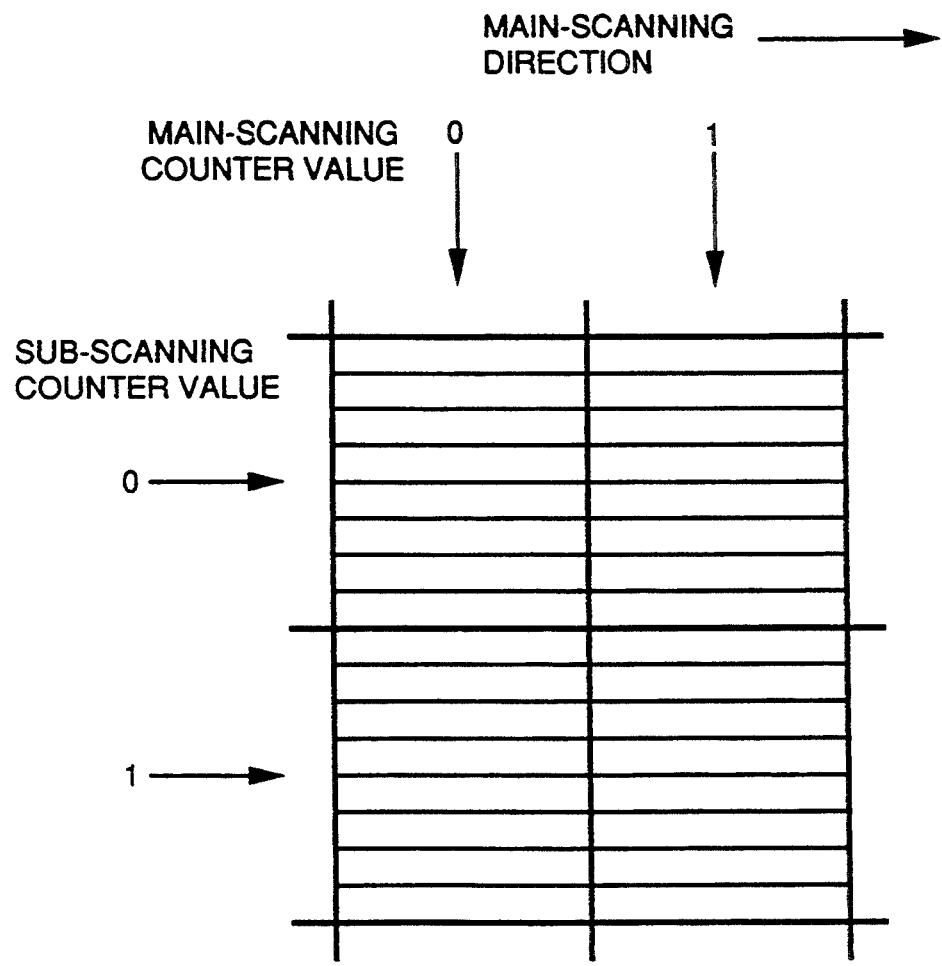
FIG. 69 is a diagram for describing a method of printing multivalued data by a conventional printer.
Figure 69B:
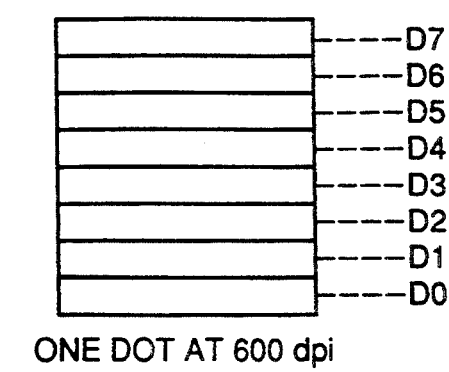
Figure 70:
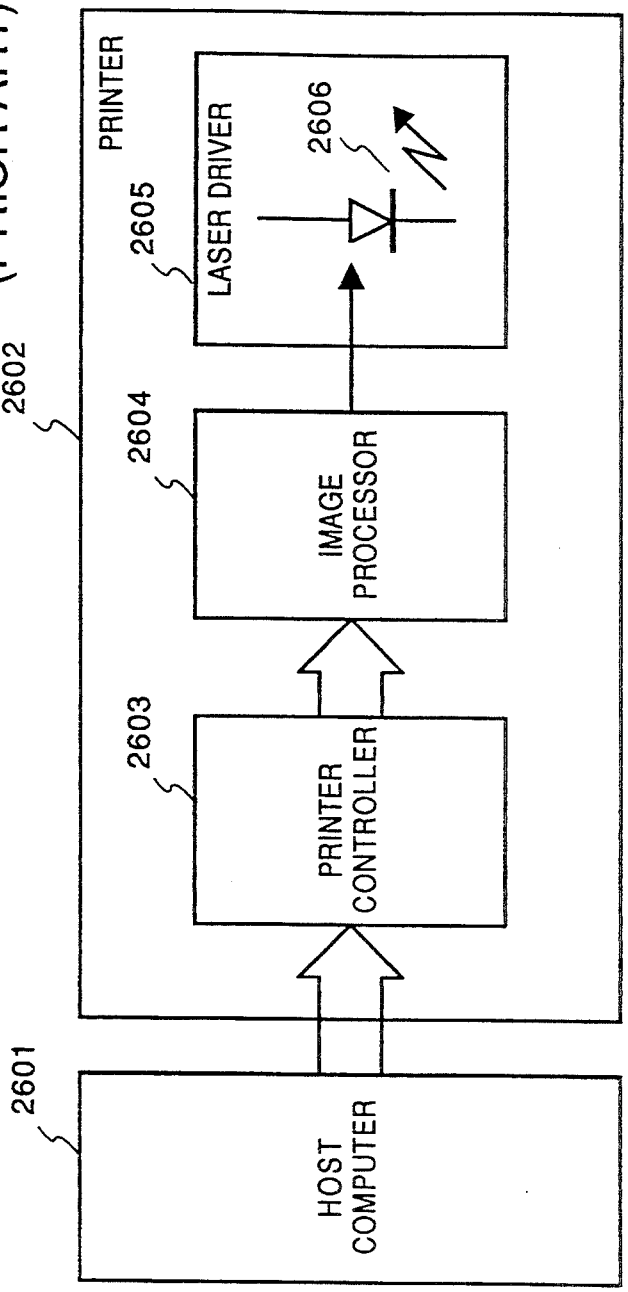
FIG. 70 is a block diagram showing the configuration of a conventional laser-beam printer.
Figure 71:
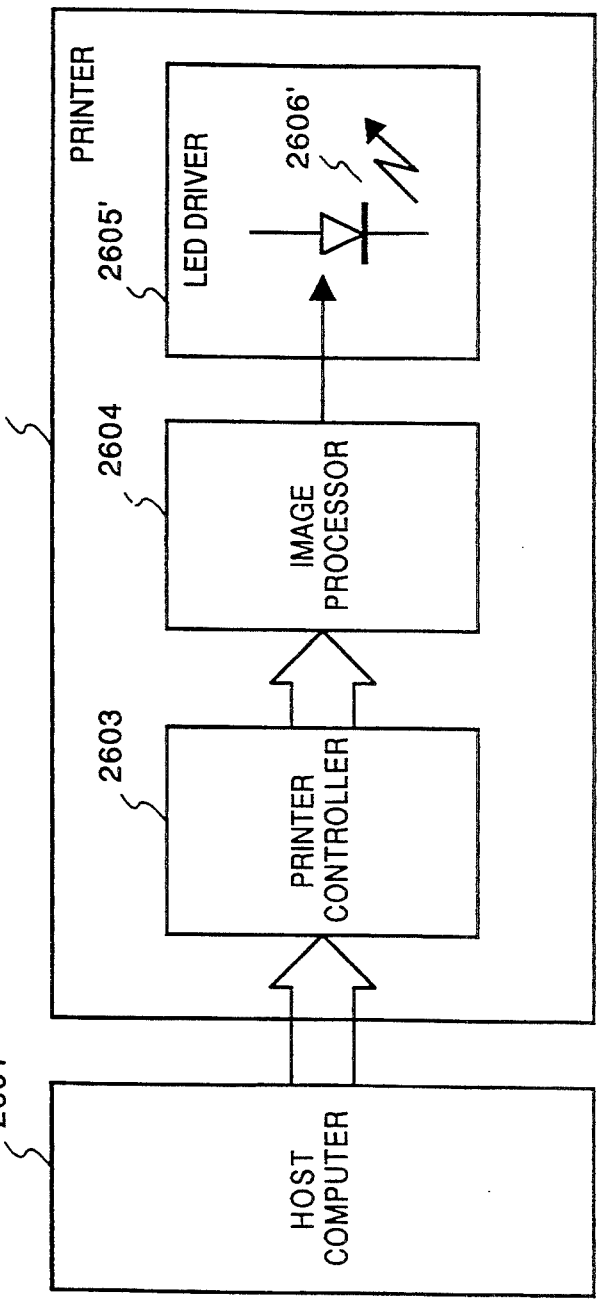
FIG. 71 is a block diagram showing the configuration of a conventional LED beam printer.
Figure 72:
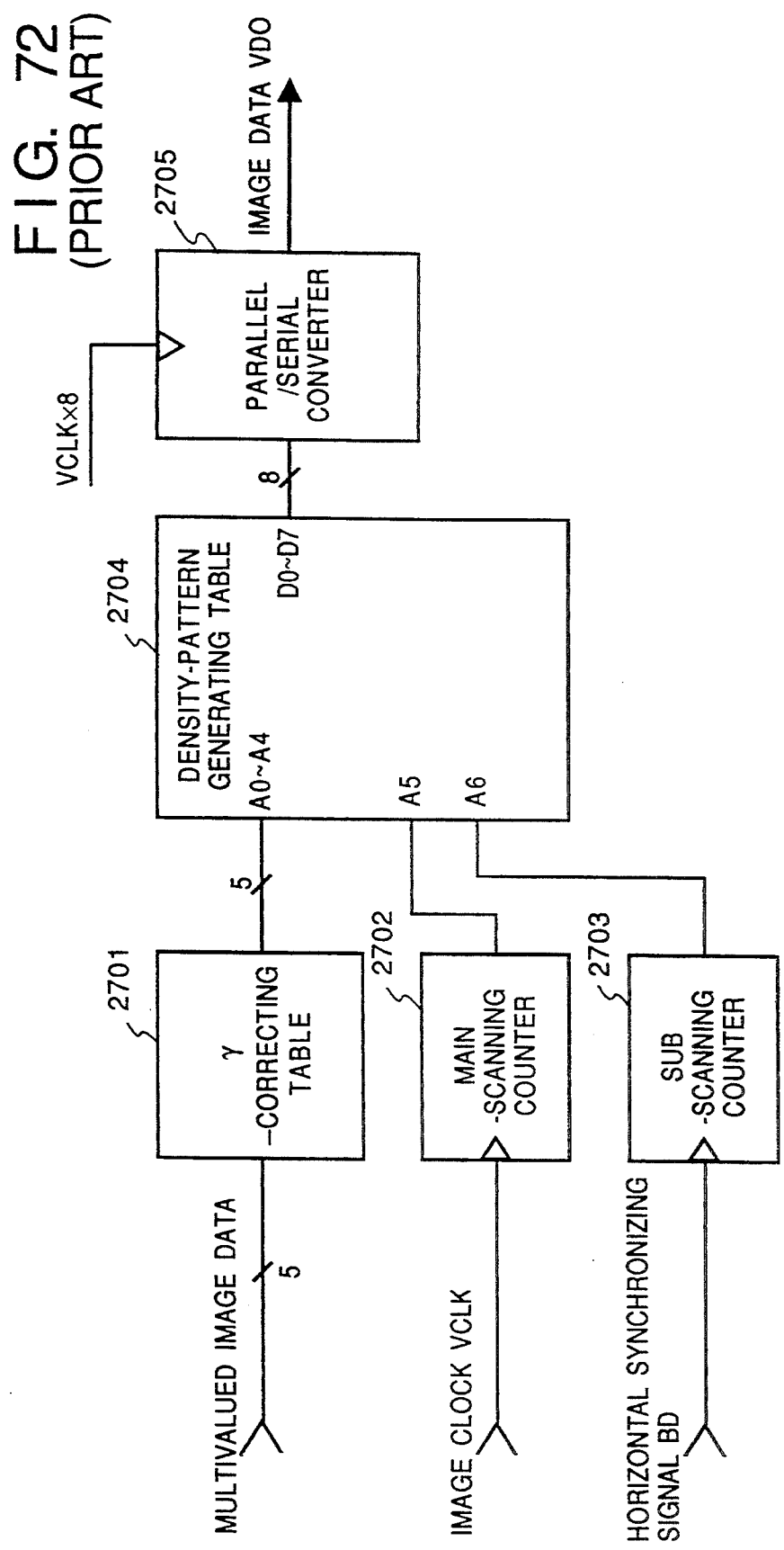
FIG. 72 is a block diagram showing the configuration of the image processor of a printer for printing a halftone image according to the prior art.
Figure 73:
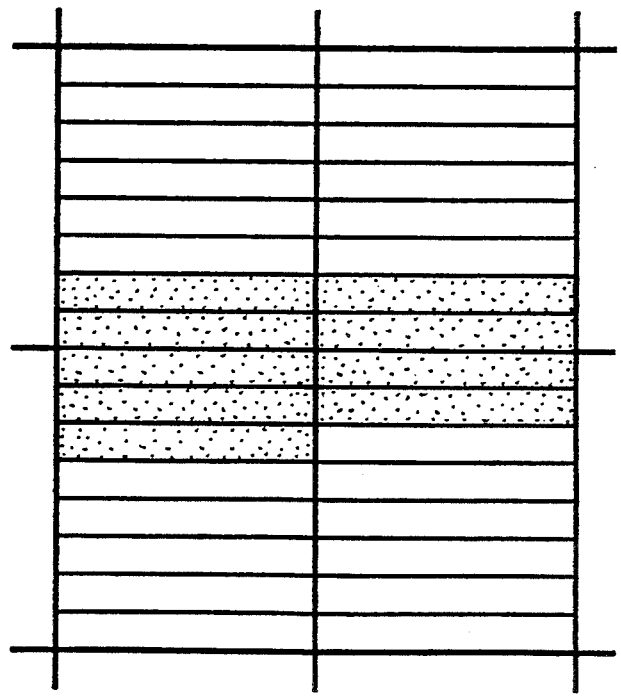
FIG. 73 is a diagram showing an example of a density pattern in a conventional printer.
Figure 74:
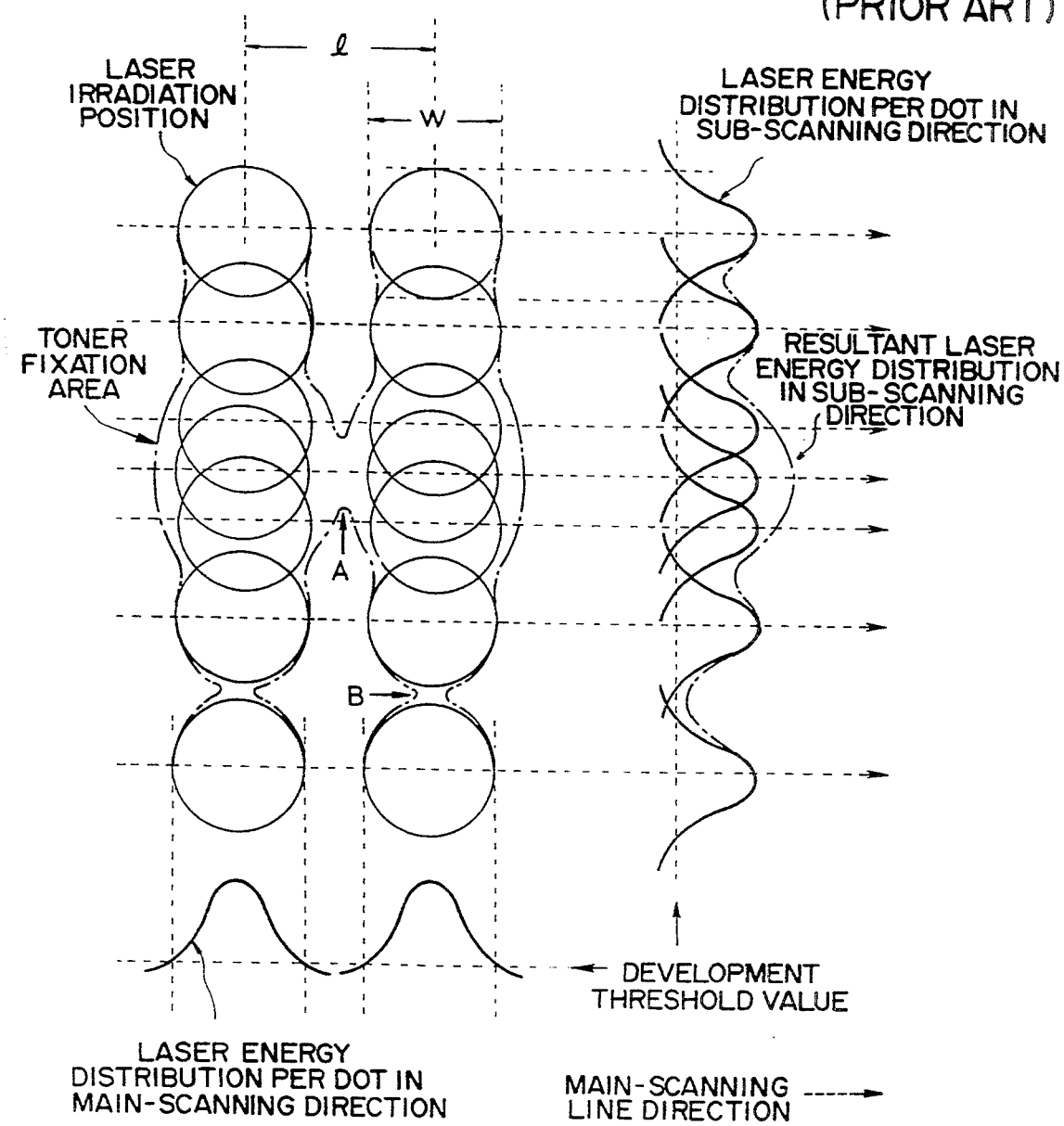
FIG. 74 is a diagram showing a printing state based upon PWM laser irradiation in a conventional printer.
Figure 75:
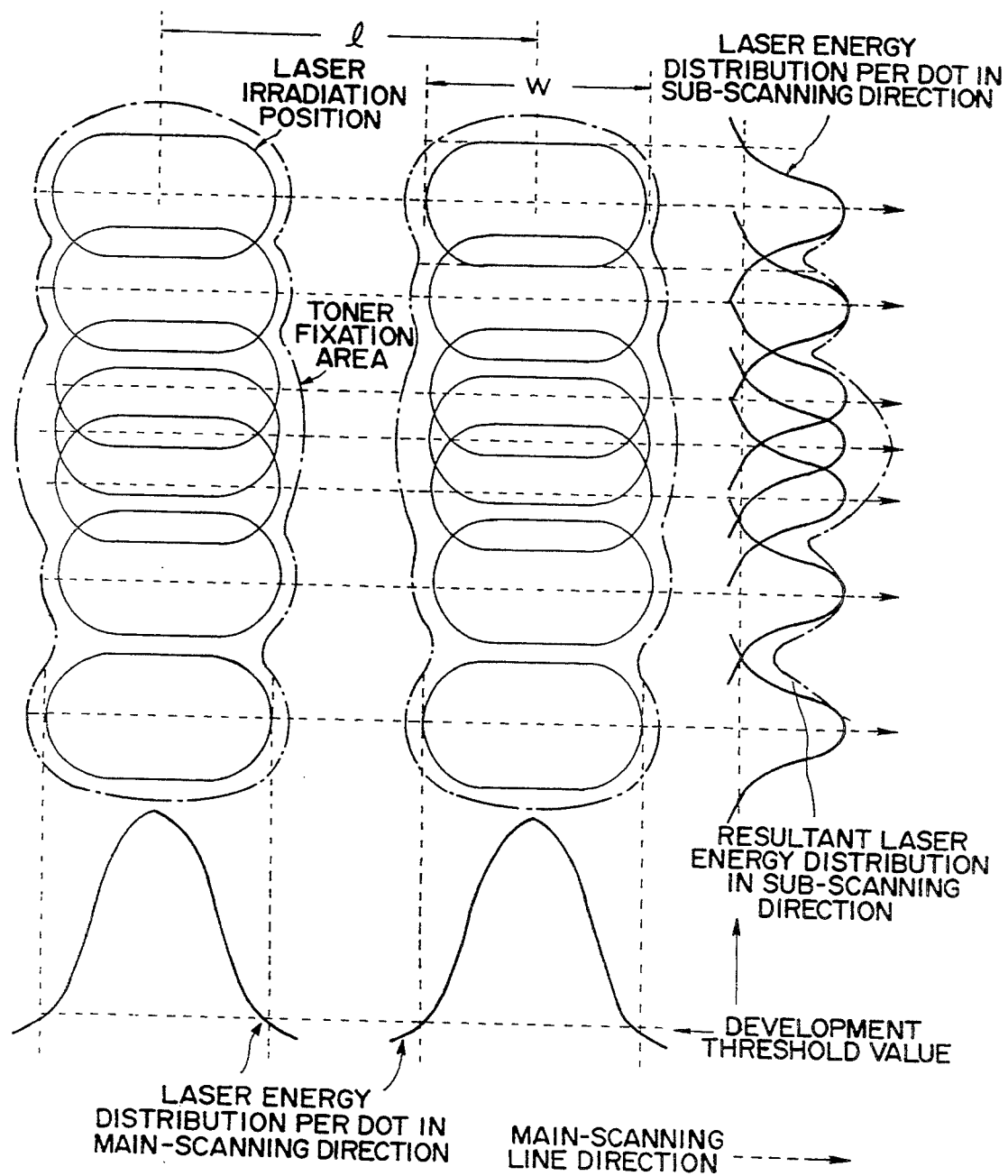
FIG. 75 is a diagram showing a printing state based upon PWM laser irradiation in a conventional printer.

Since growth is in units of 300 dpi even in this modification, the odd-numbered lines in 600 dpi units must have a growth direction that is the same as that of the even-numbered lines. As shown in FIG. 67, the output of the circuit A1601 is transmitted simultaneously to the selector 1603 and line memory 1602 and the outputs of the circuit A and line memory are sent to the selector 1603. The selector 1603 selects the output of the circuit A when Y0 (the signal whose frequency is half that of the horizontal synchronizing signal) is logical "1" and the output of the line memory 1602 when Y0 is logical "0". As a result, the final output of the PWM growth-direction decision unit 208 is growth in units of 300 dpi and a growth pattern of the kind shown in FIG. 68 is realized overall.

Thus, in accordance with this modification, the effects of the foregoing embodiments are supplemented by an effect in which the influence of random numbers is controlled upon recognizing a steep density gradient, as a result of which the edges of character images and the like are printed more sharply.

The present invention can be applied to a system constituted by a plurality of devices or to an apparatus comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus for performing area modulation of a black area of a pixel, which is an aggregate of subdivisions obtained by subdivision based upon multivalued dot information, forming an electrostatic latent image on a recording medium by deflecting a light beam using a signal obtained by the area modulation, and developing the electrostatic latent image, comprising:

pattern generating means for generating density patterns that possess a plurality of different growth directions;

information generating means for generating information for the purpose of changing the growth direction of the density patterns; and changeover means for changing over the information;

recording of an image being performed by a density pattern having a growth direction based upon the information changed over by said changeover means, wherein said information generating means includes:

means for generating a first growth-direction designating signal based upon a growth direction within an aggregate area of a predetermined pixel; and means for generating a second growth-direction designating signal based upon a random signal.

2. The apparatus according to claim 1, wherein said changeover means changes over said information based upon the first growth-direction designating signal.

3. The apparatus according to claim 2, wherein said changeover means changes over said information in such a manner that printing is performed at a uniform density even if the scanning line interval of said medium is non-uniform.

4. An image forming apparatus for performing area modulation of a black area of a pixel, which is an aggregate of subdivisions obtained by subdivision based upon multivalued dot information, forming an electrostatic latent image on a recording medium by deflecting a light beam using a signal obtained by the area modulation, and developing the electrostatic latent image, comprising:

pattern generating means for generating density patterns that possess a plurality of different growth directions;

information generating means for generating information for the purpose of changing the growth direction of the density patterns;

means for sensing image forming density indicated by the multivalued dot information; and selecting means for selecting one of said plurality of density patterns based upon the image forming density, wherein said information generating means includes:

means for generating a first growth-direction designating signal based upon a predetermined signal; and means for generating a second growth-direction designating signal based upon a random signal.

5. The apparatus according to claim 4, wherein said selecting means selects one of said plurality of density patterns based upon an image forming density within a predetermined aggregate area.

6. The apparatus according to claim 4, wherein said selecting means selects one of said plurality of density patterns based upon features of said multivalued dot information within a predetermined area.

7. The apparatus according to claim 4, wherein said selecting means selects one of said plurality of density patterns in such a manner that half-tone printing is performed at a Uniform density even if the scanning line interval of said medium is non-uniform.

8. An image forming apparatus for performing area modulation of a black area of a pixel, which is an aggregate of subdivisions obtained by subdivision based upon multivalued dot information, forming an electrostatic latent image on a recording medium by deflecting a light beam using a signal obtained by the area modulation, and developing the electrostatic latent image, comprising:

pattern generating means for generating density patterns that possess a plurality of different growth directions;

information generating means for generating information for the purpose of changing the growth direction of the density patterns;

means for storing growth direction of a pixel after printing and recording by a specific pixel; and selecting means for selecting one of said plurality of density patterns based upon the growth direction, wherein said information generating means includes:

means for generating a first growth-direction designating signal based upon a predetermined signal;

means for generating a second growth-direction designating signal based upon a random signal.

9. The apparatus according to claim 8, wherein said information generating means includes:

means for generating a first growth-direction designating signal based upon a growth direction within an aggregate area of a predetermined pixel; and means for generating a second growth-direction designating signal based upon a random signal.

10. The apparatus according to claim 8, wherein said selecting means selects one of said plurality of density patterns based upon features of said multivalued dot information within a predetermined area.

11. The apparatus according to claim 8, wherein said selecting means selects one of said plurality of density patterns in such a manner that half-tone printing is performed at a uniform density even if the scanning line interval of said medium is non-uniform.

12. The apparatus according to claim 8, wherein said selecting means selects a density pattern in such a manner that printing subdivisions of the specific pixel and a pixel adjacent to the specific pixel will not contact each other.

13. An image processing apparatus comprising:
input means for inputting image data;
density pattern generating means for generating a density pattern corresponding to a level of the image data input by said input means; and
control means for controlling growth direction of the density pattern generated by said density pattern generating means,
wherein said control means includes:
first means for generating a density pattern in a prescribed direction; and
second means for generating a density pattern in a direction based on a random signal.

14. The apparatus according to claim 13, wherein said first means generates the density pattern in a direction from the center to the left-hand side and from the center to the right-hand side in a prescribed block.

15. The apparatus according to claim 13, further comprising discriminating means for discriminating a density of an image,
wherein, in a region which is discriminated by said discriminating means to have a high density of an image, said control means enables said second means, at a frequency greater than said first means, to generate the density pattern.

16. The apparatus according to claim 13, further comprising calculating means for calculating an average value of input image data associated with a plurality of pixels,
wherein, in a region which has a high average value calculated by said calculating means, said control means enables said second means, at a frequency greater than said first means, to generate the density pattern.

17. The apparatus according to claim 13, further comprising means for modulating an optical beam based on the density pattern generated by said density pattern generating means and for forming a visual image in an electro-photographic method using said modulated optical beam.

18. An image processing apparatus comprising:
input means for inputting image data;
density pattern generating means for generating a density pattern corresponding to a level of the image data input by said input means; and
random signal generating means for generating a random signal,
wherein said density pattern generating means changes growth direction of the density pattern in accordance with the random signal generated by said random signal generating means.

19. The image processing apparatus according to claim 18, wherein, when the growth direction of the density pattern of neighboring pixels in accordance with the random signal is predetermined, said density pattern generating means designates growth direction of the density pattern of a pixel of interest to be the predetermined direction, regardless of the direction determined in accordance with the random signal.

20. The apparatus according to claim 18, wherein, when a difference in density between said pixel of interest and said neighboring pixels is larger than a prescribed value, said density pattern generating means designates growth direction of the density pattern of the pixel of interest to be a predetermined direction, regardless of the direction determined in accordance with the random signal.

21. The apparatus according to claim 18, further comprising means for modulating an optical beam based on the density pattern generated by said density pattern generating means and for forming a visual image in an electro-photographic method using said modulated optical beam.

22. An image processing method comprising the steps of:
(a) inputting image data;
(b) generating a density pattern corresponding to a level of the image data input at step (a); and
(c) controlling a growth direction of the density pattern generated at step (b),
wherein step (c) includes the steps of:
(d) generating a density pattern in a prescribed direction; and
(e) generating a density pattern in a direction based on a random signal.

23. An image processing method comprising the steps of:
(a) inputting image data;
(b) generating a density pattern corresponding to a level of the image data input at step (a); and
(c) generating a random signal,
wherein a growth direction of the density pattern is changed at step (b) in accordance with the random signal generated at step.

* * * * *

UNITED STATES PATENT AND TRADEMARK OFFICE
CERTIFICATE OF CORRECTION

PATENT NO. : 5,446,550
DATED : August 29, 1995
INVENTOR(S) : Shinichiro Maekawa, et al.

It is certified that error appears in the above-indentified patent and that said Letters Patent is hereby corrected as shown below:

COLUMN 2

Line 65, "changes" should read --change--.

COLUMN 3

Line 54, "present-invention;" should read --present invention;--.

COLUMN 8

Line 25, "0N" should read --ON--;

Line 28, "an din" should read --and in--; and

Line 51, "outputted" should read --output--.

COLUMN 9

Line 1, "0N" should read --ON--; and

Line 27, "it" should read --is--.

COLUMN 10

Line 10, "25)" should read --line 25--.

COLUMN 11

Line 36, "PS," should read --P5,--;

Line 40, "PS," should read --P5,--; and

Line 42, "PS," should read --P5,--

UNITED STATES PATENT AND TRADEMARK OFFICE
CERTIFICATE OF CORRECTION

PATENT NO. : 5,446,550
DATED : August 29, 1995
INVENTOR(S) : Shinichiro Maekawa, et al It is certified that error appears in the above-indentified patent and that said Letters Patent is hereby corrected as shown below:

COLUMN 12

Line 1, "coarse" should read --coarseness--.

COLUMN 13

Line 5, "has" should read --that--.

COLUMN 16

Line 24, "of300" should read --of 300--.

COLUMN 17

Line 67, "PS," should read --P5,--.

COLUMN 18

Line 1, "11110[B]," should read --111100[B],--;

Line 2, "PS," should read --P5,--; and

Line 16, "notes" should read --note--.

COLUMN 24

Line 56, "PS," should read --P5,--; and

Line 60, "PS," should read --P5,--.

COLUMN 25

Line 2, "FIG." should read --FIG. 22--.

UNITED STATES PATENT AND TRADEMARK OFFICE
CERTIFICATE OF CORRECTION

PATENT NO. : 5,446,550
DATED : August 29, 1995
INVENTOR(S) : Shinichiro Maekawa, et al It is certified that error appears in the above-indentified patent and that said Letters Patent is hereby corrected as shown below:

<u>COLUMN 26</u>

Line 14, "claim 2," should read --claim 1,--; and

Line 56, "Uniform" should read --uniform--.

<u>COLUMN 28</u>

Line 64, "step." should read --step (c).---.

Signed and Sealed this

Twenty-seventh Day of February, 1996

Attest:

BRUCE LEHMAN

Attesting Officer      Commissioner of Patents and Trademarks